US012578838B2

(12) United States Patent
Xiong et al.

(10) Patent No.: US 12,578,838 B2
(45) Date of Patent: Mar. 17, 2026

(54) DISPLAY METHOD AND ELECTRONIC DEVICE

(71) Applicant: HONOR DEVICE CO., LTD., Shenzhen (CN)

(72) Inventors: Mian Xiong, Shenzhen (CN); Shiyan Ren, Shenzhen (CN); Haijun Feng, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 50 days.

(21) Appl. No.: 18/837,972

(22) PCT Filed: Apr. 20, 2023

(86) PCT No.: PCT/CN2023/089579
§ 371 (c)(1),
(2) Date: Aug. 13, 2024

(87) PCT Pub. No.: WO2024/011987
PCT Pub. Date: Jan. 18, 2024

(65) Prior Publication Data
US 2025/0138699 A1 May 1, 2025

(30) Foreign Application Priority Data

Jul. 12, 2022    (CN) ......................... 202210815868.1

(51) Int. Cl.
G06F 3/04817        (2022.01)
H04M 1/72469        (2021.01)
G06F 3/04847        (2022.01)

(52) U.S. Cl.
CPC .... G06F 3/04817 (2013.01); H04M 1/72469 (2021.01); G06F 3/04847 (2013.01); G06F 2203/04806 (2013.01)

(58) Field of Classification Search
CPC ............. G06F 3/04817; G06F 3/04847; G06F 3/04845; G06F 2203/04806; H04M 1/72469
See application file for complete search history.

(56) References Cited

U.S. PATENT DOCUMENTS 5,977,974 A * 11/1999 Hatori ................... G06F 3/0481
715/866
2009/0007017 A1* 1/2009 Anzures .............. G06F 3/04883
715/835

(Continued)

FOREIGN PATENT DOCUMENTS

CN        103577068 A        2/2014
CN        108694006 A        10/2018

(Continued)

OTHER PUBLICATIONS

Anonymous: "iOS 7—Transition design—Entering the home screen (YouTube video)", Sep. 24, 2013 (Sep. 24, 2013),XP093268904,Retrieved from the Internet:URL:https://www.youtube.com/shorts/1BXCluo38Y4, 2 pages.

(Continued)

*Primary Examiner* — Christopher E Leiby

(57) ABSTRACT

Embodiments of this application disclose a display method and an electronic device. A specific solution is as follows: The electronic device receives a first operation performed by a user to trigger the electronic device to display a first interface, where the first interface is an interface corresponding to a first application, and the first interface includes a plurality of elements; in response to the first operation, the electronic device determines a reference element from the plurality of elements and a reference point, where the reference element is an element with a smallest area in the plurality of elements, and the reference point is a center of an element circle established by the electronic device; the (Continued)

electronic device determines a plurality of element circles based on the reference element and the reference point; and the electronic device separately displays the plurality of element circles based on a first interval time.

12 Claims, 32 Drawing Sheets

(56) References Cited

U.S. PATENT DOCUMENTS

| | | | | |
|---|---|---|---|---|
| 2010/0306702 A1* | 12/2010 | Warner | ................. | G06F 3/0482 |
| | | | | 715/834 |
| 2013/0244574 A1* | 9/2013 | Okuno | ................. | G06F 3/0488 |
| | | | | 455/26.1 |
| 2015/0186017 A1* | 7/2015 | Lee | .................... | G06F 3/04817 |
| | | | | 715/771 |
| 2015/0378593 A1* | 12/2015 | Zhang | ................ | G06F 3/04883 |
| | | | | 715/768 |
| 2016/0034127 A1* | 2/2016 | Seo | ........................ | G06F 3/0486 |
| | | | | 715/769 |
| 2022/0214865 A1* | 7/2022 | Henry | ................... | G06F 3/0488 |
| 2022/0326839 A1* | 10/2022 | Song | ........................ | G06F 9/451 |
| 2024/0201839 A1* | 6/2024 | Bian | ................... | G06F 3/04842 |
| 2024/0231586 A1* | 7/2024 | Bian | ..................... | G06F 3/0483 |

FOREIGN PATENT DOCUMENTS

| | | |
|---|---|---|
| CN | 109271073 A | 1/2019 |
| CN | 110362369 A | 10/2019 |
| CN | 111176504 A | 5/2020 |
| CN | 113552987 A | 10/2021 |
| CN | 307266653 S | 4/2022 |

OTHER PUBLICATIONS

Anonymous: "iOS 7—Transition design—Entering the home screen (screenshots)",Sep. 24, 2013 (Sep. 24, 2013),XP093266970,Retrieved from the Internet:URL:https://www.youtube.com/shorts/1BXCluo38Y4, 9 pages.

* cited by examiner

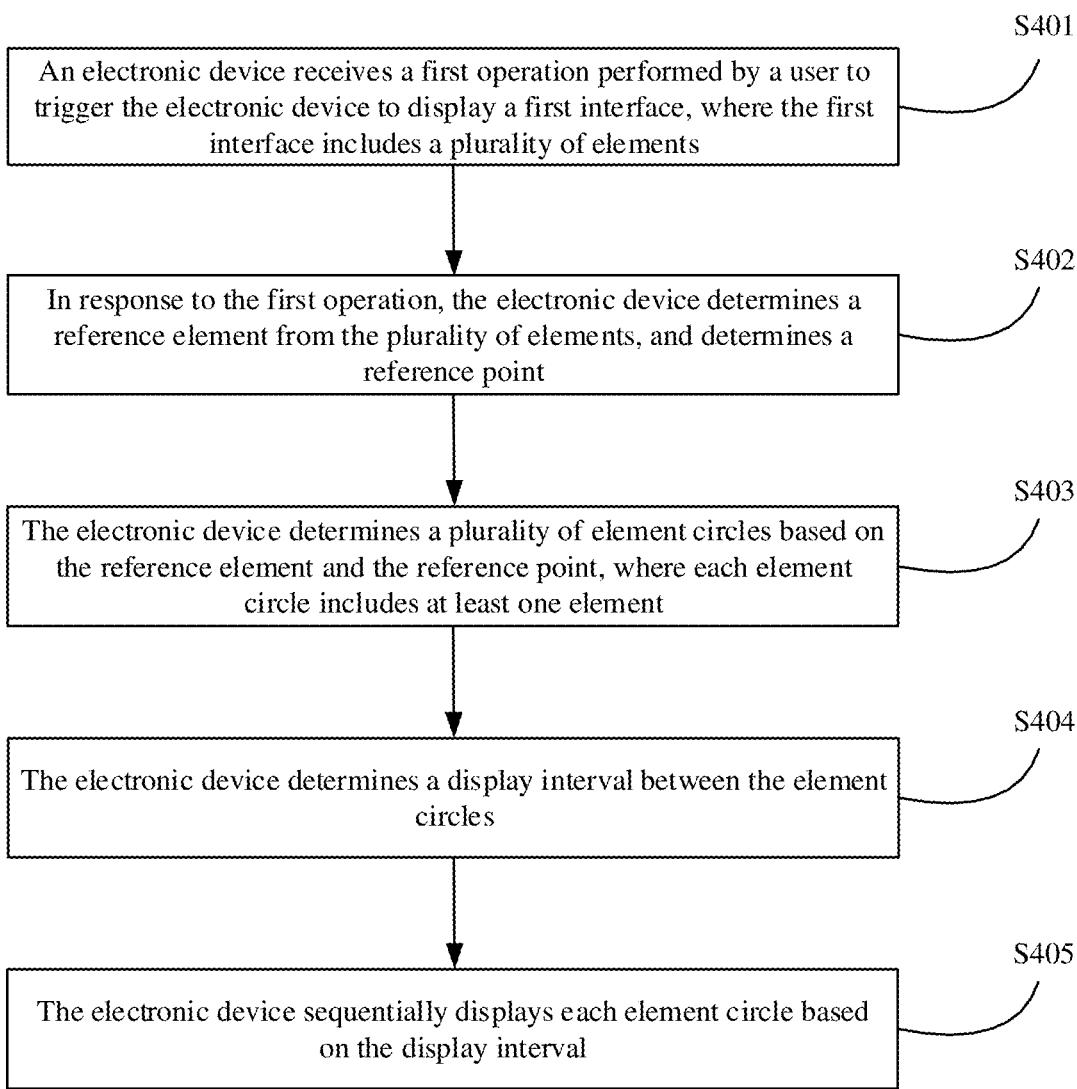

S401

An electronic device receives a first operation performed by a user to trigger the electronic device to display a first interface, where the first interface includes a plurality of elements

S402

In response to the first operation, the electronic device determines a reference element from the plurality of elements, and determines a reference point

S403

The electronic device determines a plurality of element circles based on the reference element and the reference point, where each element circle includes at least one element

S404

The electronic device determines a display interval between the element circles

S405

The electronic device sequentially displays each element circle based on the display interval

FIG. 4

CONT. FROM FIG. 11A

TO FIG. 11C

CONT.
FROM

TO

CONT. FROM FIG. 11D

CONT.
FROM

DISPLAY METHOD AND ELECTRONIC DEVICE

CROSS-REFERENCE TO RELATED APPLICATIONS

This application is a national stage of International Application No. PCT/CN2023/089579, filed on Apr. 20, 2023, which claims priority to Chinese Patent Application No. 202210815868.1, filed on Jul. 12, 2022, both of which are incorporated herein by reference in their entireties.

TECHNICAL FIELD

This application relates to the field of electronic technologies, and in particular, to a display method and an electronic device.

BACKGROUND

Currently, an interface of an electronic device, for example, a mobile phone, may simultaneously display a plurality of elements (for example, a plurality of application icons) in a rectangle-grid arrangement manner. For example, the mobile phone may include a plurality of applications, a home screen of the mobile phone may include a plurality of application icons, and a user may open different applications by using different application icons.

However, when the plurality of elements are simultaneously displayed on the interface of the electronic device in the rectangle-grid arrangement manner, the plurality of elements simultaneously enter the interface of the electronic device. For example, when the mobile phone enters the home screen, for example, when the mobile phone enters the home screen after unlocking, the plurality of application icons included in the home screen of the mobile phone simultaneously enter the home screen of the mobile phone, that is, the home screen of the mobile phone simultaneously displays the plurality of application icons included in the home screen. In this case, a process in which the electronic device displays the plurality of application icons is single, and user experience is poor.

SUMMARY

Embodiments of this application provide a display method and an electronic device. Therefore, when the electronic device, for example, a mobile phone, enters a home screen, a process in which the electronic device displays a plurality of application icons can be optimized, thereby improving user experience.

According to a first aspect, an embodiment of this application provides a display method. The display method is applied to an electronic device, and the electronic device may include a first application. The display method may include: The electronic device receives a first operation performed by a user to trigger the electronic device to display a first interface, where the first interface is an interface corresponding to the first application, and the first interface includes a plurality of elements; in response to the first operation, the electronic device determines a reference element from the plurality of elements and a reference point, where the reference element is an element with a smallest area in the plurality of elements, and the reference point is a center of an element circle established by the electronic device; the electronic device determines a plurality of element circles based on the reference element and the reference point, where each element circle includes at least one element; and the electronic device separately displays the plurality of element circles based on a first interval time.

Based on the display method according to the first aspect, when the electronic device displays the plurality of elements included in the first interface, the electronic device may classify the plurality of elements into different element circles. The electronic device may simultaneously display a plurality of elements included in a same element circle, and display different element circles at an interval of the first interval time. Therefore, the electronic device can display the plurality of elements circle by circle when displaying the plurality of elements included in the first interface, thereby increasing transition animation effects and improving user experience.

With reference to the first aspect, in a possible implementation, the plurality of element circles may include a first element circle and a second element circle, the first element circle may include at least one first element, and the second element circle may include at least one second element. That the electronic device separately displays the plurality of element circles based on a first interval time may include: The electronic device displays the first element; and the electronic device displays the second element after the first interval time.

Based on this possible implementation, when the electronic device displays the first element circle and the second element circle, the electronic device may simultaneously display a plurality of first elements corresponding to the first element circle. After displaying the plurality of first elements corresponding to the first element circle, the electronic device may display a plurality of second elements corresponding to the second element circle at an interval of the first interval time. Therefore, the electronic device can display the plurality of elements circle by circle when displaying the plurality of elements included in the first interface, thereby increasing transition animation effects and improving user experience.

With reference to the first aspect, in a possible implementation, that the electronic device displays the first element may include: The electronic device scales up the first element based on a first scale-up factor, and the electronic device displays the first element obtained after scaling up. That the electronic device displays the second element after the first interval time may include: The electronic device scales up the second element based on the first scale-up factor and scales up the first element based on a second scale-up factor, and the electronic device simultaneously displays the second element scaled up based on the first scale-up factor and the first element scaled up based on the second scale-up factor, where the first scale-up factor is greater than the second scale-up factor.

Based on this possible implementation, when the electronic device simultaneously displays the plurality of first elements corresponding to the first element circle, the electronic device may scale up the first elements for display; after scaling up and displaying the plurality of first elements corresponding to the first element circle, the electronic device may display, at an interval of the first interval time, the plurality of second elements that are scaled up and that correspond to the second element circle, and correspondingly scale down the first elements for display. Therefore, the electronic device can scale and display the plurality of elements circle by circle when displaying the plurality of elements included in the first interface, thereby increasing transition animation effects and improving user experience.

With reference to the first aspect, in a possible implementation, after the electronic device simultaneously displays the second element scaled up based on the first scale-up factor and the first element scaled up based on the second scale-up factor, the display method may further include: After the first interval time, the electronic device scales up the second element based on the second scale-up factor, and the electronic device simultaneously displays the second element scaled up based on the second scale-up factor and the first element scaled up based on the second scale-up factor.

Based on this possible implementation, after the electronic device scales up and displays the plurality of second elements corresponding to the second element circle, the electronic device may scale down the second elements for display. Therefore, the electronic device can scale and display the plurality of elements circle by circle when displaying the plurality of elements included in the first interface, thereby increasing transition animation effects and improving user experience.

With reference to the first aspect, in a possible implementation, a range of the first element circle may be less than a range of the second element circle.

Based on this possible implementation, the electronic device may classify the plurality of elements included in the first interface into element circles with different ranges. In this case, the electronic device may simultaneously display a plurality of elements included in a same element circle, and display different element circles at an interval of the first interval time. Therefore, the electronic device can display the plurality of elements circle by circle when displaying the plurality of elements included in the first interface, thereby increasing transition animation effects and improving user experience.

With reference to the first aspect, in a possible implementation, the reference element may be rectangular. That the electronic device determines a plurality of element circles based on the reference element and the reference point may include: The electronic device determines a length and a width of the reference element; and the electronic device determines the first element circle and the second element circle based on the length and the width of the reference element by using the reference point as a center, where a length of the first element circle is N times the length of the reference element, a width of the first element circle is N times the width of the reference element, N is an integer greater than or equal to 1, a length of the second element circle is M times the length of the reference element, a width of the second element circle is M times the width of the reference element, and M is an integer greater than N.

Based on this possible implementation, the electronic device may classify, based on the length and the width of the reference element and the reference point, the plurality of elements included in the first interface into element circles with different ranges. In this case, the electronic device may simultaneously display a plurality of elements included in a same element circle, and display different element circles at an interval of the first interval time. Therefore, the electronic device can display the plurality of elements circle by circle when displaying the plurality of elements included in the first interface, thereby increasing transition animation effects and improving user experience.

With reference to the first aspect, in a possible implementation, the first element may be an element in the range of the first element circle, and the second element is an element in the range of the second element circle; and when a third element is both an element in the range of the first element circle and an element in the range of the second element circle, the third element is the first element, and the third element is any element included in the first interface.

Based on this possible implementation, when the third element is both the element in the range of the first element circle and the element in the range of the second element circle, the electronic device may determine that the third element is the first element, that is, the third element is an element corresponding to the first element circle, so that the plurality of elements included in the first interface can be classified into element circles with different ranges.

With reference to the first aspect, in a possible implementation, the elements included in the first interface may be application icons, images, or notes.

Based on this possible implementation, when the electronic device displays a plurality of application icons, a plurality of images, or a plurality of notes, the electronic device may classify the plurality of application icons, the plurality of images, or the plurality of notes into different element circles. The electronic device may simultaneously display application icons, images, or notes included in a same element circle, and display different element circles at an interval of the first interval time. Therefore, the electronic device can display the plurality of elements circle by circle when displaying the plurality of elements included in the first interface, thereby increasing transition animation effects and improving user experience.

According to a second aspect, an embodiment of this application provides a display apparatus. The display apparatus may be applied to an electronic device to implement the method in the first aspect. Functions of the display apparatus may be implemented by hardware or may be implemented by corresponding software executed by hardware. The hardware or the software includes one or more modules corresponding to the foregoing functions, for example, a receiving module, a determining module, and a display module.

The receiving module may be configured to receive a first operation performed by a user to trigger the electronic device to display a first interface, where the first interface is an interface corresponding to a first application, and the first interface includes a plurality of elements.

The determining module may be configured to: in response to the first operation, determine a reference element from the plurality of elements and a reference point, where the reference element is an element with a smallest area in the plurality of elements, and the reference point is a center of an element circle established by the electronic device.

The determining module may be further configured to determine a plurality of element circles based on the reference element and the reference point, where each element circle includes at least one element.

The display module may be configured to separately display the plurality of element circles based on a first interval time.

With reference to the second aspect, in a possible implementation, the display module may be further configured to display a first element.

The display module may be further configured to display a second element after the first interval time.

With reference to the second aspect, in a possible implementation, the display apparatus may further include a scale-up module.

The scale-up module may be configured to scale up the first element based on a first scale-up factor.

The display module may be configured to display the first element obtained after scaling up.

The scale-up module may be further configured to scale up the second element based on the first scale-up factor, and scale up the first element based on a second scale-up factor.

The display module may be further configured to simultaneously display the second element scaled up based on the first scale-up factor and the first element scaled up based on the second scale-up factor, where the first scale-up factor is greater than the second scale-up factor.

With reference to the second aspect, in a possible implementation, the scale-up module may be further configured to scale-up the second element based on the second scale-up factor after the first interval time.

The display module may be further configured to simultaneously display the second element scaled up based on the second scale-up factor and the first element scaled up based on the second scale-up factor.

With reference to the second aspect, in a possible implementation, a range of the first element circle is less than a range of the second element circle.

With reference to the second aspect, in a possible implementation, the determining module may be further configured to determine a length and a width of the first element.

The determining module may be further configured to determine the first element circle and the second element circle based on the length and the width of the reference element by using the reference point as a center, where a length of the first element circle is N times the length of the reference element, a width of the first element circle is N times the width of the reference element, N is an integer greater than or equal to 1, a length of the second element circle is M times the length of the reference element, a width of the second element circle is M times the width of the reference element, and M is an integer greater than N.

With reference to the second aspect, in a possible implementation, the first element is an element in the range of the first element circle, and the second element is an element in the range of the second element circle; and when a third element is both an element in the range of the first element circle and an element in the range of the second element circle, the third element is the first element, and the third element is any element included in the first interface.

With reference to the second aspect, in a possible implementation, the elements included in the first interface are application icons, images, or notes.

According to a third aspect, a display device is provided. The display device has functions of implementing the method according to the first aspect. The functions may be implemented by using hardware, or may be implemented by executing corresponding software by hardware. The hardware or software includes one or more modules corresponding to the functions.

According to a fourth aspect, a display device is provided. The display device includes a processor and a memory. The memory is configured to store computer-executable instructions. When the display device runs, the processor executes the computer-executable instructions stored in the memory, to enable the display device to perform the display method according to any item of the first aspect.

According to a fifth aspect, a display device is provided. The display device includes a processor. The processor is configured to: couple to a memory, and after reading instructions in the memory, perform the display method according to any item of the first aspect based on the instructions.

According to a sixth aspect, an embodiment of this application provides a computer-readable storage medium, where the computer-readable storage medium stores computer program instructions. When the computer program instructions are executed by an electronic device, the electronic device is enabled to implement the display method according to any one of the first aspect or the possible implementations of the first aspect.

According to a seventh aspect, an embodiment of this application provides a computer program product. The computer program product includes computer-readable code. When the computer-readable code is run in an electronic device, the electronic device is enabled to implement the display method according to any one of the first aspect or the possible implementations of the first aspect.

According to an eighth aspect, an apparatus (for example, the apparatus may be a chip system) is provided. The apparatus includes a processor, configured to support an electronic device in implementing a function in the first aspect. In a possible design, the apparatus further includes a memory. The memory is configured to store program instructions and data that are necessary for the electronic device. When the apparatus is a chip system, the apparatus may include a chip, or may include a chip and another discrete device.

It should be understood that, for beneficial effects of the second aspect to the eighth aspect, refer to related descriptions in the first aspect. Details are not described herein again.

BRIEF DESCRIPTION OF DRAWINGS

FIG. 4 is a schematic flowchart 1 of a display method according to an embodiment of this application;

DESCRIPTION OF EMBODIMENTS

Figure 1:
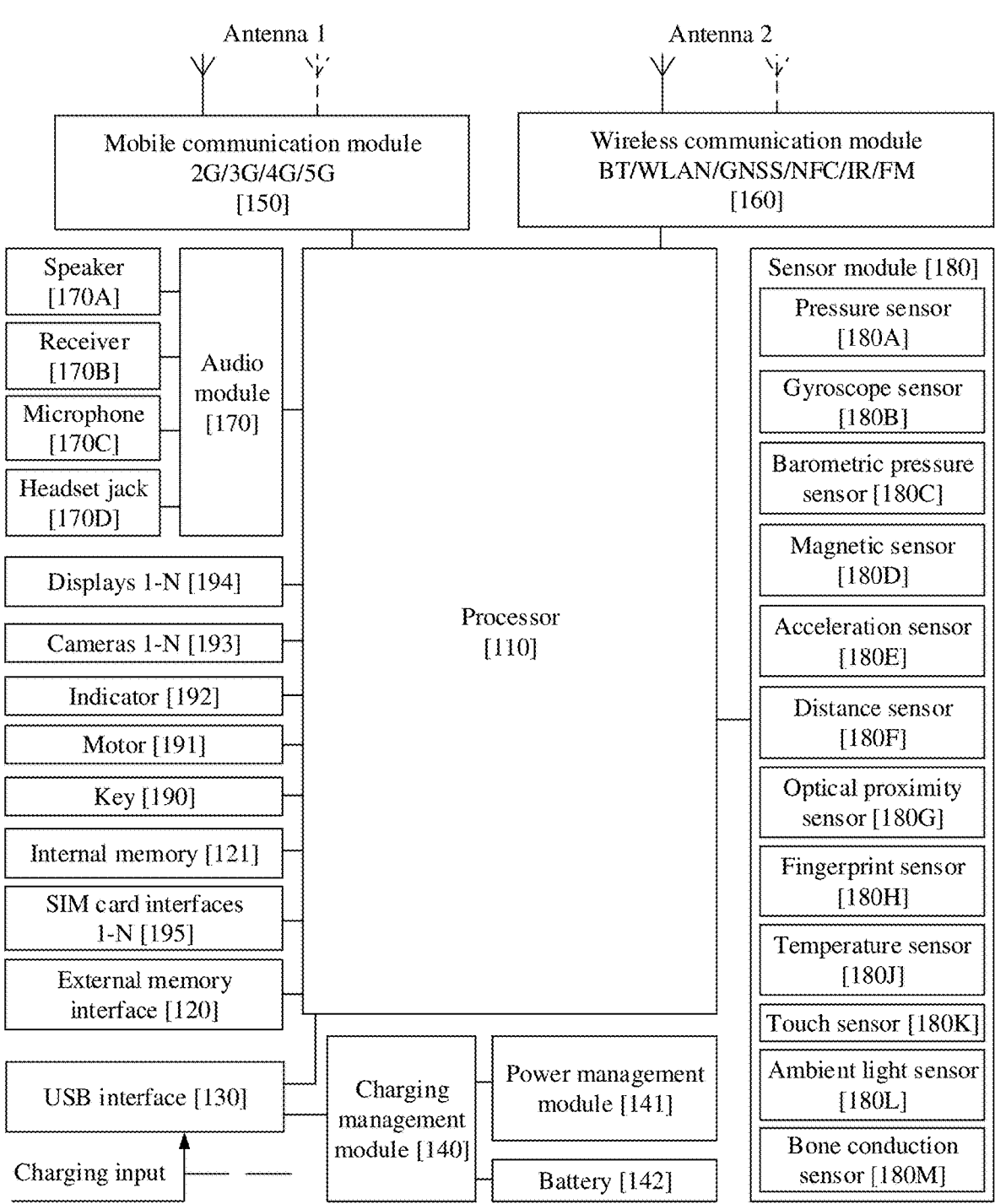
FIG. 1 is a schematic diagram of a hardware structure of an electronic device according to an embodiment of this application.

The following clearly and completely describes the technical solutions in embodiments of this application with reference to the accompanying drawings in embodiments of this application. Clearly, the described embodiments are merely some rather than all of embodiments of this application. Based on embodiments of this application, all other embodiments obtained by a person of ordinary skill in the art without creative efforts fall within the protection scope of this application.

Terms "first" and "second" are merely used for description purposes, and shall not be understood as indicating or implying relative importance or implicitly indicating a quantity of technical features indicated. Therefore, a feature defined as "first" or "second" may explicitly or implicitly include one or more of the features. In the description of this application, unless otherwise stated, "a plurality of" means two or more.

With widespread popularity of electronic devices such as a mobile phone, a quantity of applications (application, APP) in major application markets is also explosively increased. Increasingly more applications are installed on the electronic devices such as the mobile phone, and functions of the electronic devices are gradually improved.

A plurality of elements, for example, application icons, images, or notes, may be simultaneously displayed on an interface of the electronic device. When the plurality of elements are simultaneously displayed on the interface of the electronic device, the electronic device may display a plurality of application icons in a rectangle-grid arrangement manner, for example, each rectangular grid may correspond to an icon of one application. For example, the mobile phone may include a plurality of applications, and a home screen of the mobile phone may include a plurality of application icons, that is, a plurality of elements. The user may open different applications by using different application icons. When the mobile phone displays the plurality of application icons included in the home screen, the mobile phone may display the plurality of application icons in the rectangle-grid arrangement manner, that is, each rectangular grid may correspond to an icon of one application.

For another example, when a Gallery application in the mobile phone is opened, a plurality of images, that is, a plurality of elements, included in the Gallery application may be simultaneously displayed on an interface of the mobile phone. When the mobile phone displays the plurality of images included in the Gallery application, the mobile phone may display the plurality of images in the rectangle-grid arrangement manner, that is, each rectangular grid may correspond to one image.

For another example, when a Notepad application in the mobile phone is opened, a plurality of notes, that is, a plurality of elements, included in the Notepad application may be simultaneously displayed on the interface of the mobile phone. When the mobile phone displays the plurality of notes included in the Notepad application, the mobile phone may display the plurality of notes in the rectangle-grid arrangement manner, that is, each rectangular grid may correspond to one note.

When the electronic device enters a rectangle-grid arrangement scenario, that is, when the plurality of elements are simultaneously displayed on the interface of the electronic device in the rectangle-grid arrangement manner, the plurality of elements simultaneously enter the interface of the electronic device, that is, the interface of the electronic device simultaneously displays the plurality of elements, that is, the plurality of elements collectively enter the interface of the electronic device. For example, when the mobile phone enters the home screen, for example, when the mobile phone enters the home screen through unlocking, the plurality of application icons included in the home screen of the mobile phone simultaneously enter the home screen, that is, the mobile phone simultaneously displays the plurality of application icons included in the home screen, that is, the plurality of application icons collectively enter the home screen of the mobile phone.

For another example, when the Gallery application in the mobile phone is opened, the plurality of images included in the Gallery application simultaneously enter, that is, the mobile phone simultaneously displays the plurality of images included in the Gallery application, that is, the plurality of images collectively enter the interface corresponding to the Gallery application.

For another example, when the Notepad application in the mobile phone is opened, the plurality of notes included in the Notepad application simultaneously enter, that is, the mobile phone simultaneously displays the notes included in the Notepad application, that is, the plurality of notes collectively enter the interface corresponding to the Notepad application.

That the electronic device enters a rectangle-grid arrangement scenario may also be referred to as transition of the electronic device, that is, switching from one scenario to another scenario, or switching from one display interface to another display interface. When the electronic device enters the rectangle-grid arrangement scenario, the interface of the electronic device simultaneously displays the plurality of elements corresponding to the rectangle-grid arrangement scenario, which leads to a lack of a transition animation effect. In this case, the electronic device stiffly enters the rectangle-grid arrangement scenario.

For the foregoing problem, an embodiment of this application provides a display method, applied to an electronic device. In the method, when the electronic device simultaneously displays a plurality of elements (for example, application icons), the electronic device may classify the plurality of elements into different element circles. The electronic device may simultaneously display a plurality of elements included in a same element circle, and separately display different element circles (that is, display different element circles at a time interval), so that the electronic device can display the plurality of elements circle by circle when simultaneously displaying the plurality of elements, thereby increasing transition animation effects. Therefore, the electronic device is enabled to more vividly enter a rectangle-grid arrangement scenario, that is, more vividly display the plurality of elements simultaneously, thereby improving user experience.

The following describes the display method provided in embodiments of this application.

The display method provided in embodiments of this application may be applied to an electronic device. In some embodiments, the electronic device may be an electronic device having an NFC function, for example, a mobile phone, a tablet computer, a handheld computer, a personal computer (personal computer, PC), a cellular phone, a personal digital assistant (personal digital assistant, PDA), or a wearable device. A specific form of the electronic device is not limited herein in embodiments of this application.

For example, the electronic device is a mobile phone. FIG. 1 is a schematic diagram of a structure of an electronic device according to an embodiment of this application.

As shown in FIG. 1, the electronic device may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not specifically limit the electronic device. In some other embodiments, the electronic device may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device. The controller may generate an operation control signal based on instruction operation code and a timing signal, to complete control of instruction fetching and instruction execution.

A memory may be further disposed in the processor 110, and is configured to store instructions and data. In some embodiments, the memory in the processor 110 is a cache. The memory may store instructions or data recently used or cyclically used by the processor 110. If the processor 110 needs to use the instructions or the data again, the processor 110 may directly invoke the instructions or the data from the memory. This avoids repeated access and reduces waiting time of the processor 110, thereby improving efficiency of a system.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution applied to the electronic device, including 2G/3G/4G/5G and the like. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering or amplification on the received electromagnetic wave, and transmit a processed electromagnetic wave to the modem processor for demodulation. The mobile communication module 150 may further amplify a signal obtained after modulation by the modem processor, and convert, by using the antenna 1, an amplified signal into an electromagnetic wave for radiation. In some embodiments, at least some functional modules in the mobile communication module 150 may be disposed in the processor 110. In some embodiments, at least some functional modules in the mobile communication module 150 may be disposed in a same device as at least some modules in the processor 110.

The wireless communication module 160 may provide a wireless communication solution that is applied to the electronic device, including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more devices integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the to-be-sent signal, and convert, by using the antenna 2, the to-be-sent signal into an electromagnetic wave for radiation.

In some embodiments, the antenna 1 and the mobile communication module 150 in the electronic device are coupled, and the antenna 2 and the wireless communication module 160 are coupled, so that the electronic device can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like.

The electronic device implements a display function by using the GPU, the display 194, the application processor, and the like. The GPU is a microprocessor for image processing and is connected to the display 194 and the application processor. The GPU is configured to perform mathematical and geometric calculation, and is configured to render graphics. The processor 110 may include one or more GPUs, and the one or more GPUs execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light-emitting diode or an active-matrix organic light-emitting diode (active-matrix organic light emitting diode, AMOLED), a flexible light-emitting diode (flex light-emitting diode, FLED), a Miniled, a MicroLed, a Micro-oLed, or a quantum dot light-emitting diode (quantum dot light emitting diodes, QLED). In some embodiments, the electronic device may include one or N displays 194, where N is a positive integer greater than 1.

In embodiments of this application, the display 194 may be configured to display an interface of the electronic device.

The electronic device may implement a shooting function by using the ISP, the camera 193, the video codec, the GPU, the display 194, the application processor, and the like. In some embodiments, the electronic device may include one or N cameras 193, where N is a positive integer greater than 1.

The internal memory 121 may be configured to store computer-executable program code, and the executable program code includes instructions. The processor 110 runs the instructions stored in the internal memory 121, to perform various function applications and data processing of the electronic device. The internal memory 121 may include a program storage area and a data storage area. The program storage area may store an operating system, an application required by at least one function (for example, a sound playback function or an image playback function), and the like. The data storage area may store data (for example, audio data and a phone book) and the like created during use of the electronic device. In addition, the internal memory 121 may include a high-speed random access memory, and may further include a non-volatile memory, for example, at least one magnetic disk storage device, a flash memory device, or a universal flash storage (universal flash storage, UFS).

The acceleration sensor 180E may periodically collect acceleration data of the electronic device at a specific frequency. For example, acceleration of the electronic device in various directions (which are usually an X-axis direction, a Y-axis direction, and a Z-axis direction) may be collected.

Certainly, it can be understood that FIG. 1 is merely an example for description that is used when a form of the electronic device is a mobile phone. If the electronic device is in another device form, for example, a tablet computer, a handheld computer, a PC, a PDA, or a wearable device (for example, a smartwatch or a smart band), the structure of the electronic device may include fewer structures than those shown in FIG. 1 or may include more structures than those shown in FIG. 1. This is not limited herein.

It may be understood that a function of the electronic device usually needs to be implemented based on cooperation of software in addition to support of hardware.

A software system of the electronic device may use a layered architecture, an event-driven architecture, a micro-kernel architecture, a microservice architecture, or a cloud architecture. In this embodiment of this application, an Android® system with the layered architecture is used as an example to describe a software structure of the electronic device.

Figure 2:
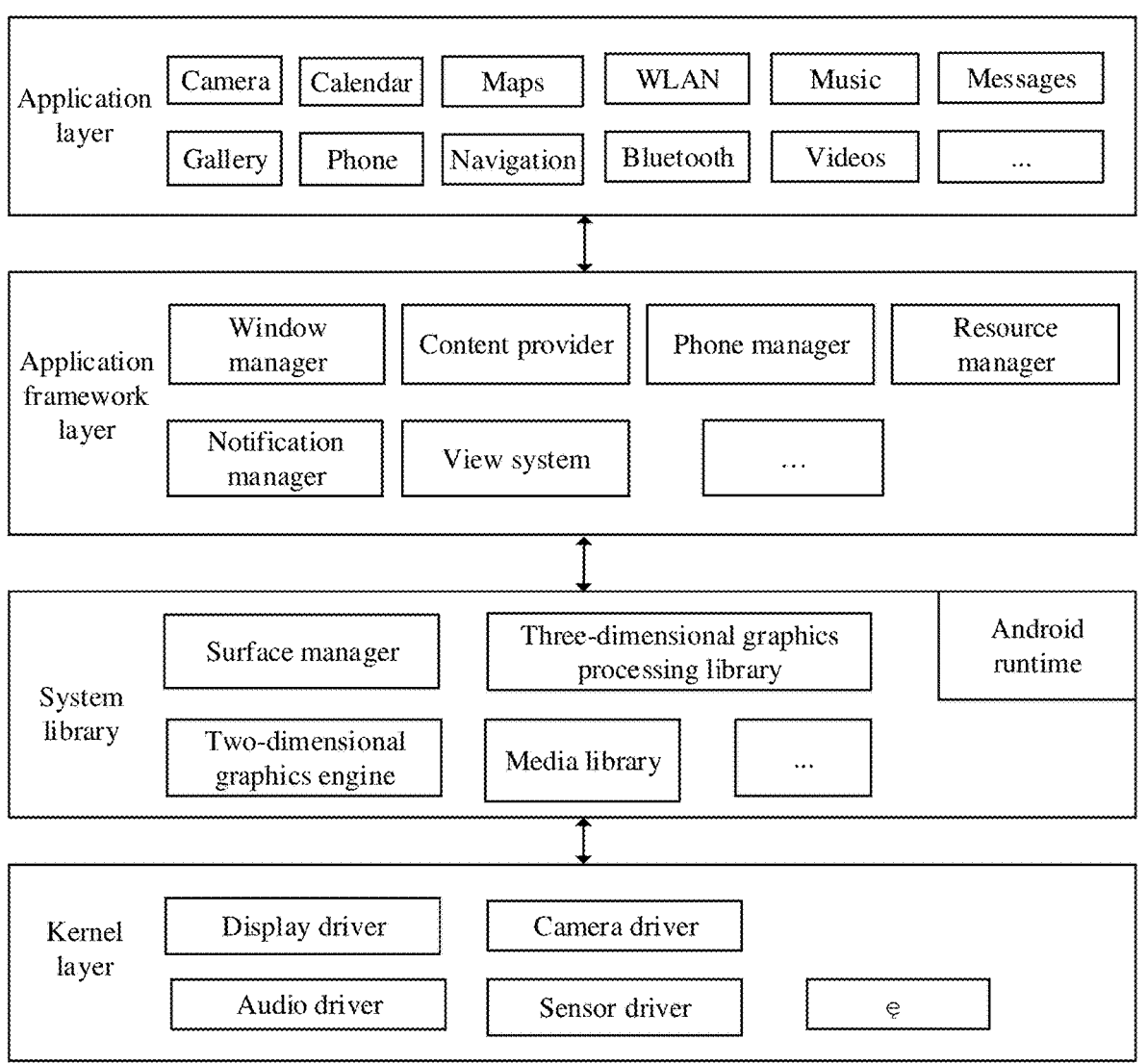
FIG. 2 is a schematic diagram 1 of a software structure of an electronic device according to an embodiment of this application.

FIG. 2 is a block diagram of a software structure of an electronic device according to an embodiment of this application.

In the layered architecture, software is divided into several layers, and each layer has a clear role and task. The layers communicate with each other through software interfaces. In some embodiments, the Android® system is divided into four layers, which are respectively an application layer, an application framework layer (also referred to as a system framework java layer), Android® runtime (Android® runtime) and a system library (also referred to as a Native layer), and a kernel layer from top to bottom.

The application layer may include a series of application packages. As shown in FIG. 2, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for applications at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether a status bar exists, lock a screen, take a screenshot, and the like.

The content provider is configured to store and obtain data, and enable the data to be accessible by an application. The data may include a video, an image, audio, calls that are made and answered, a browsing history and bookmarks, a phone book, and the like.

The view system includes visual controls, for example, a control for displaying a text and a control for displaying a picture. The view system may be configured to build an application. A display interface may include one or more views. For example, a display interface including an SMS message notification icon may include a view for displaying a text and a view for displaying a picture.

The phone manager is configured to provide a communication function of the electronic device, for example, call status management (including answering, hanging up, or the like).

The resource manager provides various resources for the application, for example, a localized string, an icon, a picture, a layout file, and a video file.

The notification manager enables an application to display notification information in the status bar, and the notification information may be used to convey a notification-type message and may automatically disappear after a short stay without requiring user interaction. For example, the notification manager is configured to notify download completion, provide a message notification, and the like. The notification manager may alternatively be a notification that appears in the status bar at the top of the system in a form of a graph or scroll bar text, for example, a notification of an application running in the background, or a notification that appears on the screen in a form of a dialog window. For example, text information is prompted in the status bar, an alert sound is made, the electronic device vibrates, or an indicator light blinks.

The Android® runtime Android® runtime includes a kernel library and a virtual machine. The Android® runtime Android® runtime is responsible for scheduling and managing the Android® system.

The kernel library includes two parts: One part is a functional function that needs to be invoked by a java language, and the other part is a kernel library of Android®.

The application layer and the application framework layer are run in the virtual machine. The virtual machine executes java files at the application layer and the application framework layer as binary files. The virtual machine is used to perform functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a two-dimensional graphics engine (for example, SGL).

The surface manager is configured to manage a display subsystem, and provide fusion of two-dimensional and three-dimensional layers for a plurality of applications.

The media library supports playback and recording in a plurality of common audio and video formats, a still image file, and the like. The media library may support a plurality of audio and video coding formats.

The three-dimensional graphics processing library is used to implement three-dimensional graphics drawing, image rendering, composition, layer processing, and the like.

The two-dimensional graphics engine is a drawing engine for two-dimensional drawing.

The kernel layer is a layer between hardware and software. The kernel layer includes at least a display driver, a camera driver, an audio driver, and a sensor driver.

Because the interface of the electronic device may simultaneously display a plurality of elements, and the elements may be application icons, images, notes, or the like, the interface of the electronic device may be an interface corresponding to an application included in the electronic device, for example, an interface corresponding to a home screen application of the electronic device (that is, a home screen of the electronic device), an interface corresponding to a Gallery application included in the electronic device, or an interface corresponding to a Notepad application included in the electronic device. In embodiments of this application, an example in which the interface of the electronic device is the home screen of the electronic device and the elements displayed by the electronic device are application icons is used for description.

When the interface of the electronic device is the home screen of the electronic device and the elements displayed by the electronic device are application icons, and when the electronic device enters the home screen, to enable a plurality of application icons included in the home screen to enter the home screen of the electronic device circle by circle based on different element circles, that is, to enable the electronic device to display the plurality of application icons circle by circle, the hardware shown in FIG. 1 and the software shown in FIG. 2 need to provide support and cooperation of different functional modules is further required.

Figure 3:
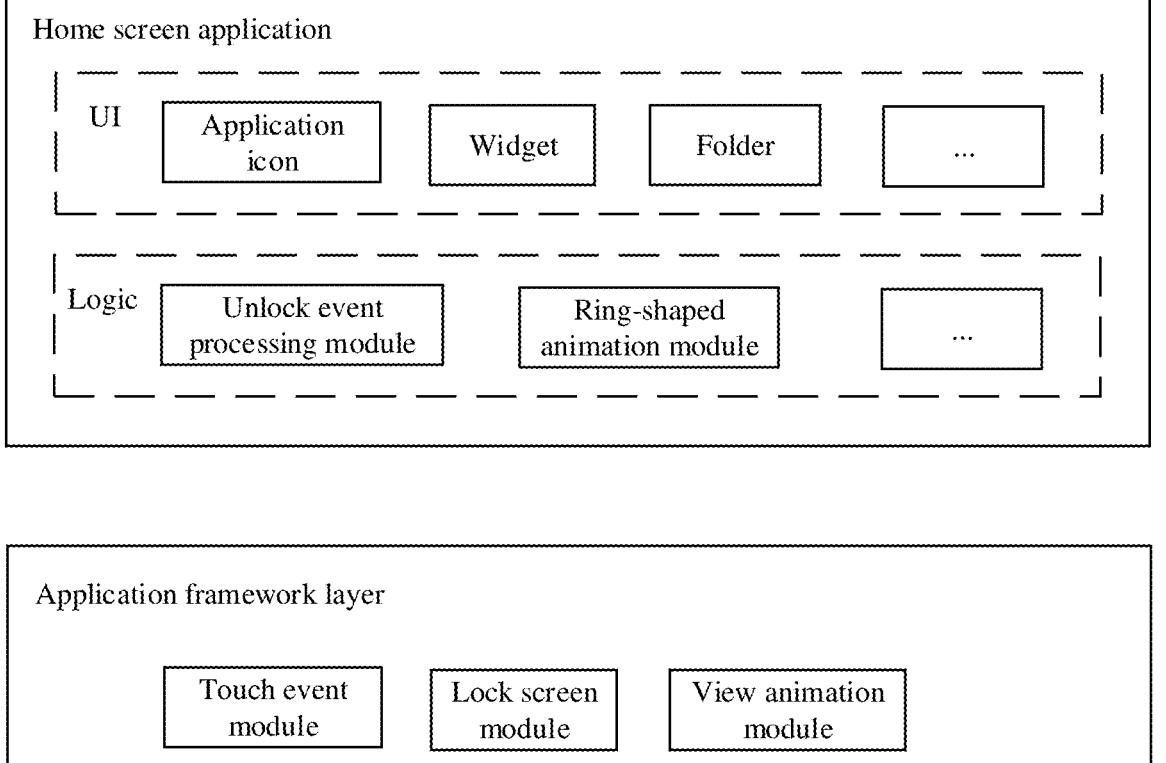
FIG. 3 is a schematic diagram 2 of a software structure of an electronic device according to an embodiment of this application.

For example, as shown in FIG. 3, the application layer of the electronic device may include a home screen application, and the application framework layer of the electronic device may include an event processing module, a lock screen module, a view animation module, and the like.

The event processing module included in the application framework layer may be configured to receive an unlock operation of a user, so that the electronic device can display the plurality of application icons included in the home screen application.

The electronic device may be unlocked through sliding, or may be unlocked by using a password, a fingerprint, or a face (that is, face unlock). Therefore, the event processing module may include a sliding event module, a password entering module, a fingerprint recognition module, and a face recognition module.

When the user does not set a lock screen password in the electronic device, the sliding event module may receive the unlock operation of the user, for example, an operation performed by the user to slide, for example, slide upward, on a lock screen interface. When the sliding event module receives upward sliding performed by the user on the lock screen interface, the sliding event module may determine whether upward sliding performed by the user on the lock screen interface reaches a sliding threshold. When the sliding event module determines that upward sliding performed by the user on the lock screen interface reaches the sliding threshold, the sliding event module may determine that an unlock operation of the user is received, that is, the sliding event module may trigger an unlock event. After the sliding event module triggers the unlock event, the sliding event module may notify the home screen, that is, the sliding event module may notify the lock screen module included in the application framework layer, so that the lock screen module can notify a ring-shaped scale animation module included in the application framework layer to collect views (that is, views) on the home screen of the electronic device and enter a reference point location.

When the user sets the lock screen password in the electronic device, the password entering module may receive the unlock operation of the user, for example, an operation performed by the user to enter the lock screen password on the lock screen interface. When the password entering module receives the lock screen password entered by the user on the lock screen interface, the password entering module may determine whether the lock screen password entered by the user on the lock screen interface is a correct password stored in the electronic device. When the password entering module determines that the lock screen password entered by the user on the lock screen interface is the correct password stored in the electronic device, that is, when the lock screen password entered by the user on the lock screen interface matches the correct password stored in the electronic device, the password entering module may determine that an unlock operation of the user is received, that is, the password entering module may trigger an unlock event. After the password entering module triggers the unlock event, the password entering module may notify the home screen, that is, the password entering module may notify the lock screen module included in the application framework layer, so that the lock screen module can notify the ring-shaped scale animation module included in the application framework layer to collect the views on the home screen of the electronic device and enter the reference point location.

When the user sets fingerprint recognition on the electronic device, the fingerprint recognition module may receive the unlock operation of the user, for example, an operation performed by the user to enter a fingerprint on the lock screen interface. When the fingerprint recognition module receives the fingerprint entered by the user on the lock screen interface, the fingerprint recognition module may determine whether the fingerprint entered by the user on the lock screen interface is correct fingerprint data stored in the electronic device. When the fingerprint recognition module determines that the fingerprint entered by the user on the lock screen interface is a correct fingerprint data password stored in the electronic device, that is, when a lock screen password entered by the user on the lock screen interface matches the correct fingerprint data stored in the electronic device, the fingerprint recognition module may determine that an unlock operation of the user is received, that is, the fingerprint recognition module may trigger an unlock event. After the fingerprint recognition module triggers the unlock event, the fingerprint recognition module may notify the home screen, that is, the fingerprint recognition module may notify the lock screen module included in the application framework layer, so that the lock screen module can notify the ring-shaped scale animation module included in the application framework layer to collect the views on the home screen of the electronic device and enter the reference point location.

When the user sets face recognition on the electronic device, the face recognition module may receive the unlock operation of the user, for example, an operation performed by the user to perform face scan on the lock screen interface. When the face recognition module receives the operation performed by the user to perform face scan on the lock screen interface, the face recognition module may receive face data of the user. Then, the face recognition module may determine whether the received face data of the user is correct face data stored in the electronic device. When the face recognition module determines that the received face data of the user is the correct face data stored in the electronic device, that is, when the face data obtained after the user performs scan on the lock screen interface is the correct face data stored in the electronic device, the face recognition module may determine that an unlock operation of the user is received, that is, the face recognition module may trigger an unlock event. After the face recognition module triggers the unlock event, the face recognition module may notify the home screen, that is, the face recognition module may notify the lock screen module included in the application framework layer, so that the lock screen module can notify the ring-shaped scale animation module included in the application framework layer to collect the views on the home screen of the electronic device and enter the reference point location.

The lock screen module included in the application framework layer may be configured to: when the event processing module (that is, the sliding event module, the password entering module, the fingerprint recognition module, and the face recognition module) is configured to receive the unlock operation of the user, notify the ring-shaped scale animation module included in the application framework layer to collect the views on the home screen of the electronic device and enter the reference point location.

The ring-shaped scale animation module included in the application framework layer may be configured to receive the lock screen module included in the application framework layer, collect the views on the home screen of the electronic device, and enter the reference point location. The views on the home screen of the electronic device are elements that can be displayed on the home screen of the electronic device, for example, application icons, images, or notes. The reference point location is a center point of an element circle when the electronic device displays the element circles. It should be noted that different element circles may have a same reference point location.

The ring-shaped scale animation module included in the application framework layer may be further configured to send the views on the home screen and the reference point location to an unlock event processing module included in the home screen application.

The home screen application may include a user interface (user interface, UI) and logic (that is, a logic module). The user interface UI is a medium for interaction and information exchange between an operating system of the electronic device and the user, and implements conversion between an internal form of information about the electronic device and a form acceptable to the user. For example, the user interface UI may include content such as an application icon, a widget, and a folder. That is, the home screen of the electronic device may display content such as an application icon, a widget, and a folder. The logic module of the home screen application may include the unlock event processing module, a ring-shaped animation module, and the like.

The unlock event processing module included in the home screen application may be configured to receive the views on the home screen and the reference point location that are sent by the ring-shaped scale animation module included in the application framework layer.

The unlock event processing module included in the home screen application may be further configured to find a smallest view based on the views on the home screen and the reference point location, and classify all the views into circles. That the unlock event processing module classifies all the views into circles refers to classifying the views on the home screen into different element circles, where different element circles include different elements (that is, application icons), which may also be referred to as views.

After the unlock event processing module classifies the views on the home screen into different element circles, the unlock event processing module may start animations at a fixed interval, that is, the unlock event processing module may allocate a fixed interval for different element circles, that is, every two element circles may be separated by a fixed interval when the electronic device displays a plurality of element circles.

After the unlock event processing module allocates the fixed interval for different element circles, the unlock event processing module may notify the view animation module included in the home screen application, so that the view animation module can display elements corresponding to the plurality of element circles circle by circle at the fixed interval.

The view animation module included in the home screen application may be configured to receive the plurality of element circles and the fixed interval between the element circles that are sent by the unlock event processing module included in the home screen application. After the view animation module receives the plurality of element circles and the fixed interval between the element circles that are sent by the unlock event processing module included in the home screen application, the view animation module may display the elements corresponding to the plurality of element circles circle by circle at the fixed interval.

A method in the following embodiments may be implemented in an electronic device having the foregoing hardware structure or software structure.

With reference to FIG. 4, the following describes in detail the display method provided in embodiments of this application. FIG. 4 is a schematic flowchart of a display method according to an embodiment of this application. As shown in FIG. 4, the display method may include S401-S405.

S401: An electronic device receives a first operation performed by a user to trigger the electronic device to display a first interface, where the first interface includes a plurality of elements.

The first interface may be an interface corresponding to a first application included in the electronic device. The first application may be a home screen application of the electronic device, or the first application may be a Gallery application, a Notepad application, or the like included in the electronic device. This is not limited in this embodiment of this application.

The first interface may include a plurality of elements. The elements may be application icons, images, notes, or the like. For example, when the first interface is the home screen application of the electronic device, the elements included in the first interface may be icons corresponding to applications (that is, application icons) included in the electronic device. When the first interface is the Gallery application of the electronic device, the elements included in the first interface may be images included in the Gallery application. When the first interface is the Notepad application of the electronic device, the elements included in the first interface may be notes included in the Notepad application.

It should be noted that the elements included in the first interface may alternatively be content that can be displayed by the electronic device, for example, folders (for example, large folders or small folders), widgets, or videos. This is not limited in this embodiment of this application.

In some examples, the plurality of elements included in the first interface may be mutually independent elements, that is, each element included in the first interface may be a moving unit, and may be moved on the first interface. For example, when the first interface is the home screen application of the electronic device, the elements included in the first interface are the icons corresponding to the applications included in the electronic device, and each application icon is an independent element, and may be moved on the home screen of the electronic device. That is, in a rectangle-grid arrangement display scenario, display content corresponding to each rectangular grid on the electronic device is an element.

When the user needs to display, by using the electronic device, the plurality of elements included in the first interface, the user may trigger the electronic device to display the first interface, and display the plurality of elements included in the first interface. That is, the electronic device may receive the first operation performed by the user to trigger the electronic device to display the first interface. The first operation may be an operation of opening the first application, an operation of unlocking the electronic device, or an operation of returning to a main interface of the first application. A specific type of the first operation is not limited in this embodiment of this application.

For example, when the first interface is the home screen application of the electronic device, and the elements included in the first interface are the icons corresponding to the applications (that is, application icons) included in the electronic device, the first operation that is received by the electronic device and that is performed by the user to trigger the electronic device to display the first interface may be the operation of unlocking the electronic device by the user. That is, when the electronic device is in a lock screen state, after the electronic device receives the unlock operation performed by the user, the electronic device may display the home screen and display the application icons included in the home screen.

The first operation may alternatively be an operation performed by the user to trigger the electronic device to return to the home screen of the electronic device from another interface. For example, when the electronic device displays an interface of another application, after the electronic device receives an operation (that is, the first operation) performed by the user to return to the home screen of the electronic device, the electronic device may display the home screen and display the application icons included in the home screen.

It should be noted that, when the first operation is the operation of unlocking the electronic device, the electronic device may be unlocked through sliding, or by using a password, a fingerprint, or a face. Therefore, the first operation may be specifically an operation performed by the user to slide, for example, slide upward, on a lock screen interface, the first operation may be specifically an operation performed by the user to enter a lock screen password on the lock screen interface, the first operation may be specifically an operation performed by the user to enter a fingerprint on the lock screen interface, or the first operation may be specifically an operation performed by the user to perform face scan on the lock screen interface. This is not limited in this embodiment of this application.

For another example, when the first interface is the Gallery application of the electronic device, and the elements included in the first interface are the plurality of images included in the Gallery application, the first operation that is received by the electronic device and that is performed by the user to trigger the electronic device to display the first interface may be the operation of opening the Gallery application by the user. For example, the first operation may be an operation performed by the user to trigger the Gallery application. That is, when the electronic device receives the operation performed by the user to open the Gallery application, the electronic device may display the plurality of images included in the Gallery application.

It should be noted that, when the first interface is the Gallery application of the electronic device, and the elements included in the first interface are the plurality of images included in the Gallery application, the first operation that is received by the electronic device and that is performed by the user to trigger the electronic device to display the first interface may alternatively be the operation of returning to the main interface of the first application, that is, an operation of returning to a main interface of the Gallery application. For example, after the user opens the Gallery application, the user may select a specific image for viewing. After the electronic device receives an operation performed by the user to select the specific image for viewing, the electronic device may display an interface corresponding to the image. Then, the electronic device receives the operation performed by the user to return to the main interface of the Gallery application (that is, the first operation), and the electronic device may display the plurality of images included in the Gallery application.

For another example, when the first interface is the Notepad application of the electronic device, and the elements included in the first interface are the plurality of notes included in the Notepad application, the first operation that is received by the electronic device and that is performed by the user to trigger the electronic device to display the first interface may be the operation of opening the Notepad application by the user. For example, the first operation may be an operation performed by the user to trigger the Notepad application. That is, when the electronic device receives the operation performed by the user to open the Notepad application, the electronic device may display the plurality of notes included in the Notepad application.

It should be noted that, when the first interface is the Notepad application of the electronic device, and the elements included in the first interface are the plurality of notes included in the Notepad application, the first operation that is received by the electronic device and that is performed by the user to trigger the electronic device to display the first interface may alternatively be the operation of returning to the main interface of the first application, that is, an operation of returning to a main interface of the Notepad application. For example, after the user opens the Notepad application, the user may select a specific note for viewing. After the electronic device receives an operation performed by the user to select the specific note for viewing, the electronic device may display an interface corresponding to the note. Then, the electronic device receives the operation performed by the user to return to the main interface of the Notepad application (that is, the first operation), and the electronic device may display the plurality of notes included in the Notepad application.

In some examples, when the plurality of elements are simultaneously displayed on the first interface, the electronic device may display the plurality of application icons in a rectangle-grid arrangement manner, for example, each rectangular grid may correspond to an icon of one application. For example, the electronic device may include a plurality of applications, and the home screen of the electronic device may include a plurality of application icons, that is, a plurality of elements. The user may open different applications by using different application icons. When the electronic device displays the plurality of application icons included in the home screen, the electronic device may display the plurality of application icons in the rectangle-grid arrangement manner, that is, each rectangular grid may correspond to an icon of one application.

Figure 5A:
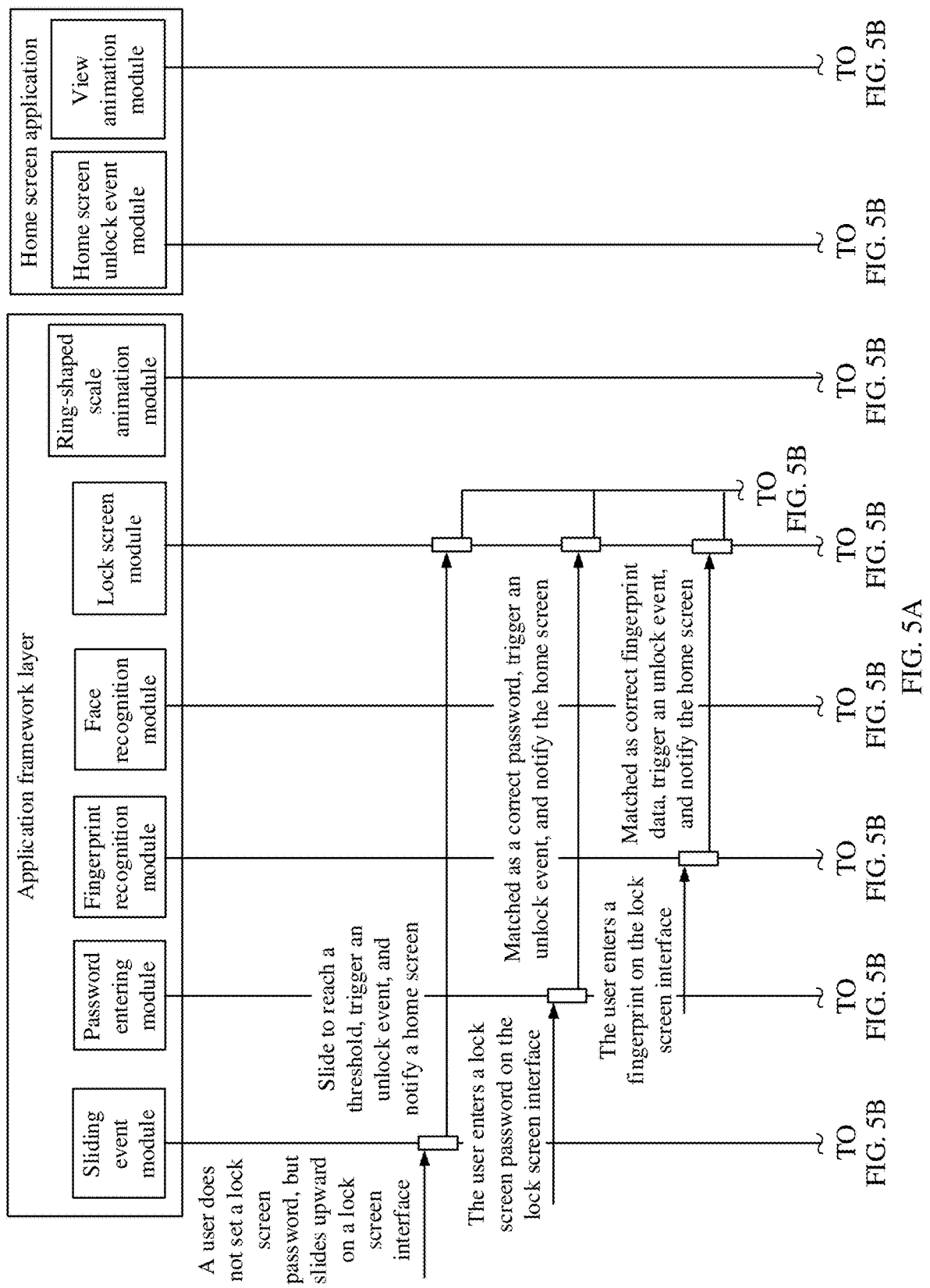
FIG. 5A and FIG. 5B are a schematic flowchart 2 of a display method according to an embodiment of this application.
Figure 5B:
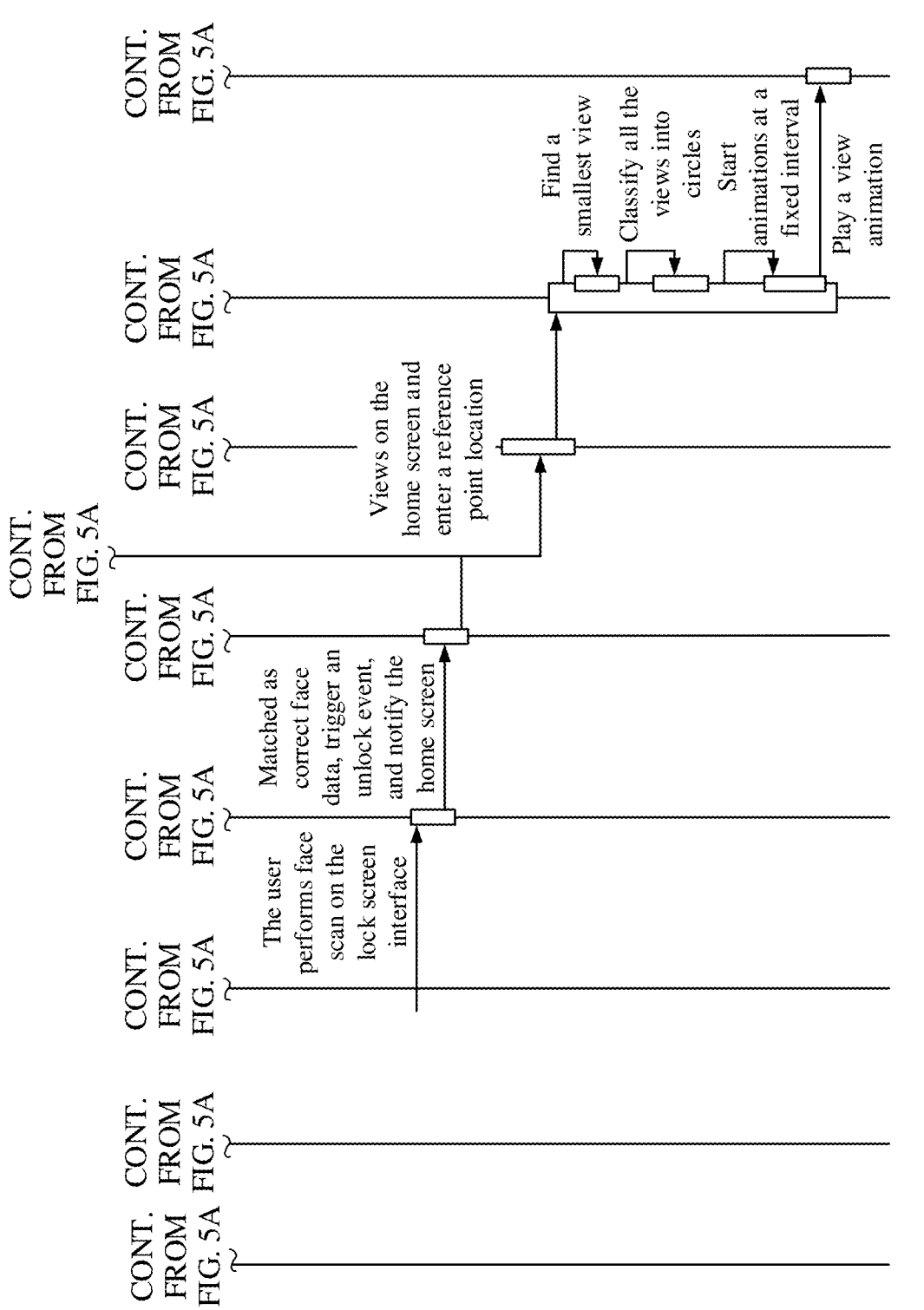

For example, the first interface is the home screen of the electronic device, and the plurality of elements included in the first interface are a plurality of application icons. As shown in FIG. 5A and FIG. 5B, that an electronic device receives a first operation performed by a user to trigger the electronic device to display a first interface may include: The electronic device, for example, a sliding event module of the electronic device, may receive the unlock operation of the user, that is, the sliding event module may receive the operation performed by the user to slide upward on the lock screen interface. When the sliding event module receives the operation performed by the user to slide upward on the lock screen interface, the sliding event module may determine whether upward sliding performed by the user on the lock screen interface reaches a sliding threshold. When the sliding event module determines that upward sliding performed by the user on the lock screen interface reaches the sliding threshold, the sliding event module may determine that an unlock operation of the user is received, that is, the first operation is received.

Alternatively, that an electronic device receives a first operation performed by a user to trigger the electronic device to display a first interface may include: The electronic device, for example, a password entering module of the electronic device, may receive the unlock operation of the user, that is, the password entering module may receive the operation performed by the user to enter the lock screen password on the lock screen interface. When the password entering module receives the lock screen password entered by the user on the lock screen interface, the password entering module may determine whether the lock screen password entered by the user on the lock screen interface is a correct password stored in the electronic device. When the password entering module determines that the lock screen password entered by the user on the lock screen interface is the correct password stored in the electronic device, the password entering module may determine that an unlock operation of the user is received, that is, the first operation is received.

Alternatively, that an electronic device receives a first operation performed by a user to trigger the electronic device to display a first interface may include: The electronic device, for example, a fingerprint recognition module of the electronic device, may receive the unlock operation of the user, that is, the fingerprint recognition module may receive the operation performed by the user to enter the fingerprint on the lock screen interface. When the fingerprint recognition module receives the fingerprint entered by the user on the lock screen interface, the fingerprint recognition module may determine whether the fingerprint entered by the user on the lock screen interface is correct fingerprint data stored in the electronic device. When the fingerprint recognition module determines that the fingerprint entered by the user on the lock screen interface is a correct fingerprint data password stored in the electronic device, the fingerprint recognition module may determine that an unlock operation of the user is received, that is, the first operation is received.

Alternatively, that an electronic device receives a first operation performed by a user to trigger the electronic device to display a first interface may include: The electronic device, for example, a face recognition module of the electronic device, may receive the unlock operation of the user, that is, the face recognition module may receive the operation performed by the user to perform face scan on the lock screen interface. When the face recognition module receives the operation performed by the user to perform face scan on the lock screen interface, the face recognition module may receive face data of the user. Then, the face recognition module may determine whether the received face data of the user is correct face data stored in the electronic device. When the face recognition module determines that the received face data of the user is the correct face data stored in the electronic device, the face recognition module may determine that an unlock operation of the user is received, that is, the first operation is received.

S402: In response to the first operation, the electronic device determines a reference element from the plurality of elements, and determines a reference point.

When the electronic device receives the first operation performed by the user to trigger the electronic device to display the first interface, in response to the first operation, the electronic device determines the reference element from the plurality of elements and determines the reference point, so that the electronic device can determine a plurality of element circles based on the reference element and the reference point.

The reference element may be an element with a smallest area in the plurality of elements. To be specific, that the electronic device determines a reference element from the plurality of elements may include: The electronic device determines the element with the smallest area in the plurality of elements as the reference element.

In some examples, after the electronic device receives the first operation performed by the user to trigger the electronic device to display the first interface, the electronic device may determine each element included in the first interface, that is, collect each view included in the first interface. After collecting each element included in the first interface, the electronic device may obtain data corresponding to each element, for example, the electronic device may obtain the data corresponding to each element by using the home screen application, so that the electronic device can determine an area corresponding to each element based on the data corresponding to each element, and determine the element with the smallest area, that is, the reference element, based on the area corresponding to each element.

The data corresponding to each element may include a length and a width that correspond to each element, or a radius corresponding to each element. To be specific, when the element is rectangular, the data corresponding to the element may be the length and the width that correspond to the element; or when the element is circular, the data corresponding to the element may be the radius corresponding to the element.

In some examples, after the electronic device determines each element included in the first interface, that is, collects each view included in the first interface, the electronic device determines elements of a first type based on a type of each element, where the first type may be icons of applications that can be moved independently on the first interface, or the first type may be images or notes that can be moved independently on the first interface. This is not limited in this embodiment of this application. After the elements of the first type are determined, the electronic device may determine the element with the smallest area from a plurality of elements of the first type as the reference element.

Figure 6A:
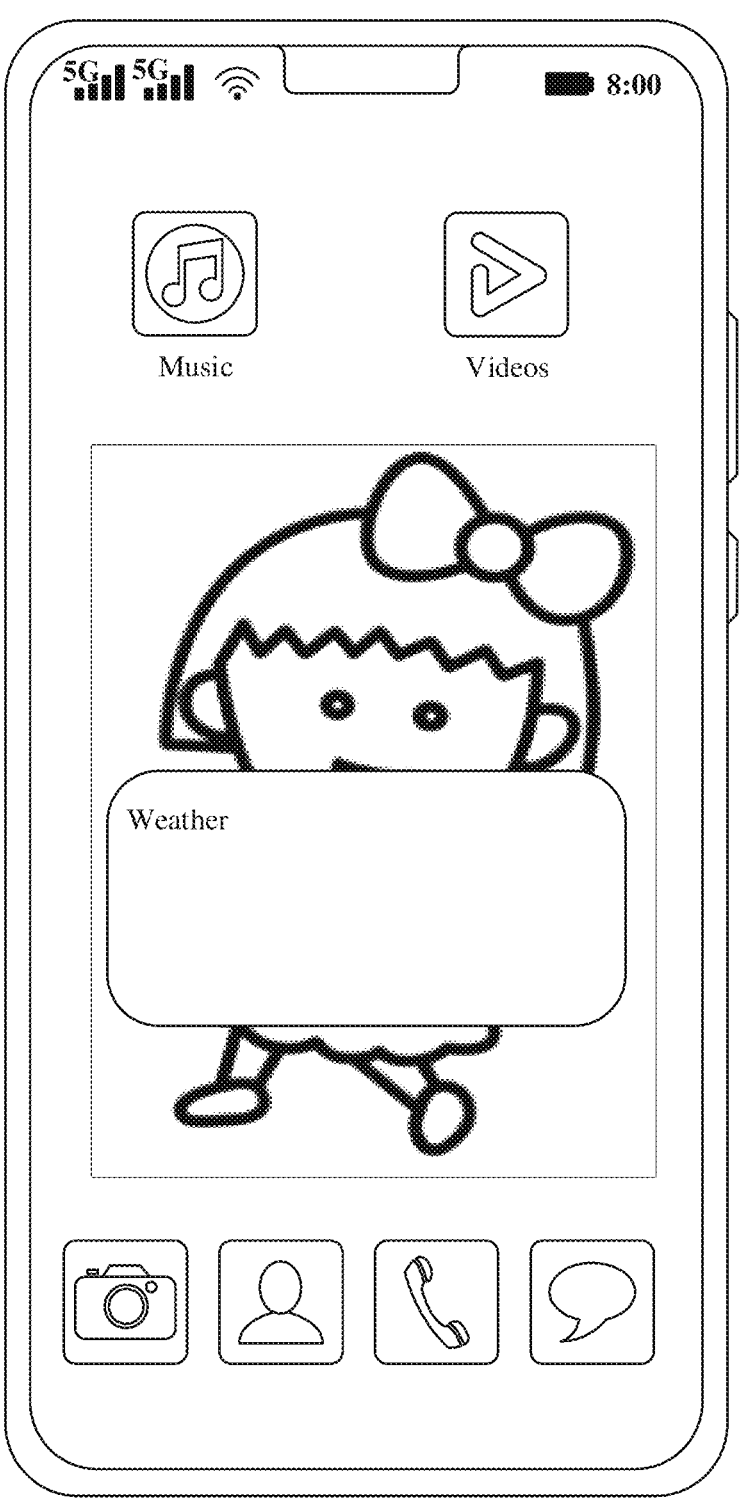
FIG. 6A, FIG. 6B, and FIG. 6C are a schematic diagram 1 of a display interface of an electronic device according to an embodiment of this application.

For example, the first interface is the home screen of the electronic device. As shown in FIG. 6A, the home screen of the electronic device may include a background image, a Music application, a Videos application, a Weather application, a Camera application, a Contacts application, a Phone application, and a Messages application.

Figure 6B:
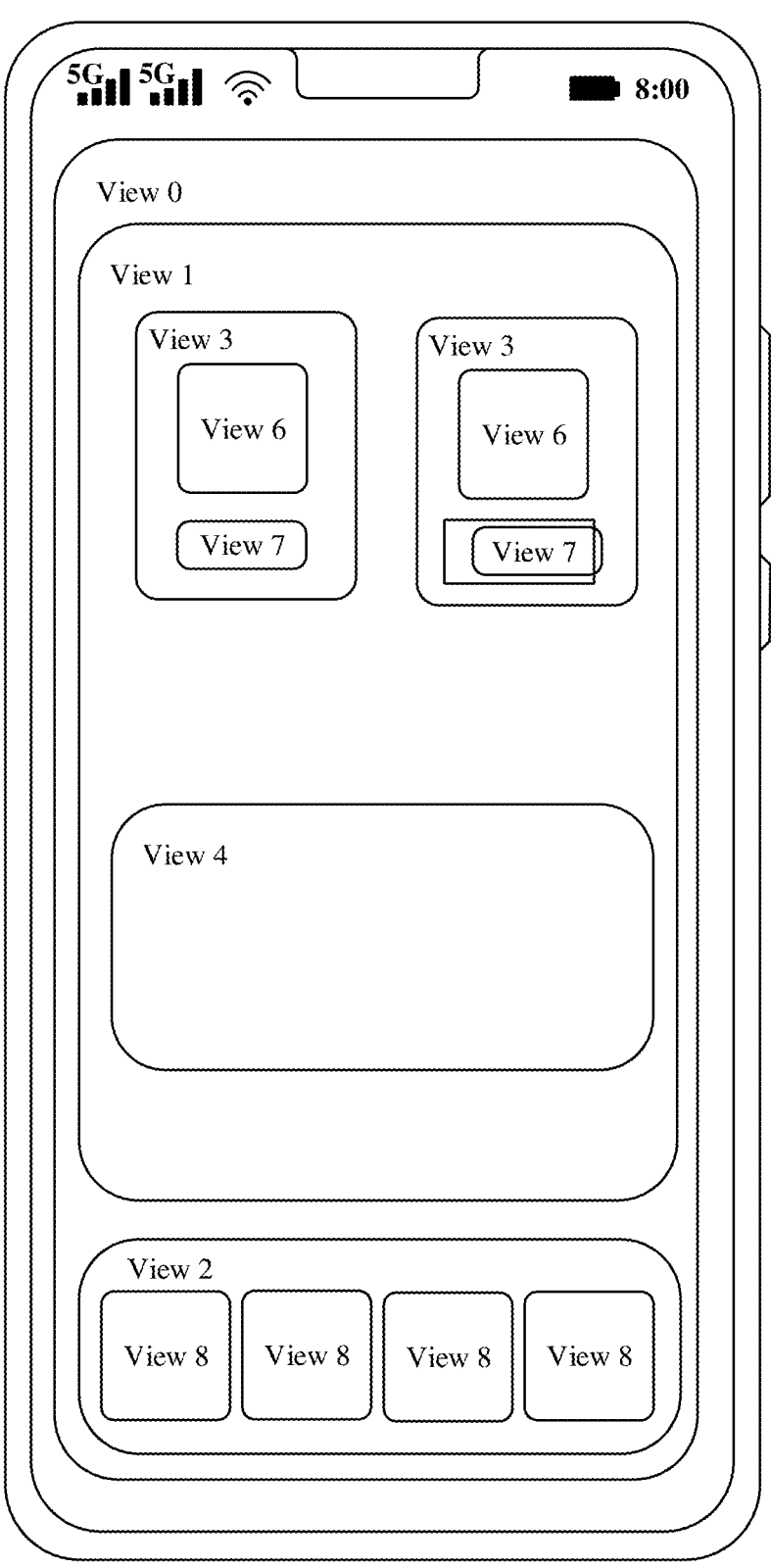

As shown in FIG. 6B, views corresponding to the home screen of the electronic device may include a view 0, a view 1, a view 2, a view 3, a view 4, a view 6, a view 7, and a view 8. The view 0 may be a view corresponding to the home screen application of the electronic device, that is, the view 0 is a bottom-most view corresponding to the home screen application. The view 1 may be a view corresponding to the background image of the home screen of the electronic device, that is, the view 1 may be used to display the background image of the home screen. The view 2 may be a view corresponding to four applications: the Camera application, the Contacts application, the Phone application, and the Messages application, that is, the view 2 may be used to display application icons corresponding to the four applications: the Camera application, the Contacts application, the Phone application, and the Messages application.

The view 3 may be a view corresponding to the Music application, that is, the view 3 may be used to display an application icon of the Music application and a name of the Music application. The view 3 may alternatively be a view corresponding to the Videos application, that is, the view 3 may be used to display an application icon of the Videos application and a name of the Videos application. The view 4 may be a view corresponding to the Weather application, that is, the view 4 may be used to display content corresponding to the Weather application.

The view 6 may be a view corresponding to the application icon of the Music application, that is, the view 6 may be used to display the application icon corresponding to the Music application. The view 6 may alternatively be a view corresponding to the application icon of the Videos application, that is, the view 6 may alternatively be used to display the application icon corresponding to the Videos application.

The view 7 may be a view corresponding to the name of the Music application, that is, the view 7 may be used to display the name corresponding to the Videos application. The view 7 may alternatively be a view corresponding to the name of the Videos application, that is, the view 7 may alternatively be used to display the name corresponding to the Videos application.

The view 8 may be a view corresponding to the application icon of the Camera application, that is, the view 8 may be used to display the application icon corresponding to the Camera application. The view 8 may alternatively be a view corresponding to the application icon of the Contacts application, that is, the view 8 may alternatively be used to display the application icon corresponding to the Contacts application. The view 8 may alternatively be a view corresponding to the application icon of the Phone application, that is, the view 8 may alternatively be used to display the application icon corresponding to the Phone application. The view 8 may alternatively be a view corresponding to the application icon of the Messages application, that is, the view 8 may alternatively be used to display the application icon corresponding to the Messages application.

Figure 6C:
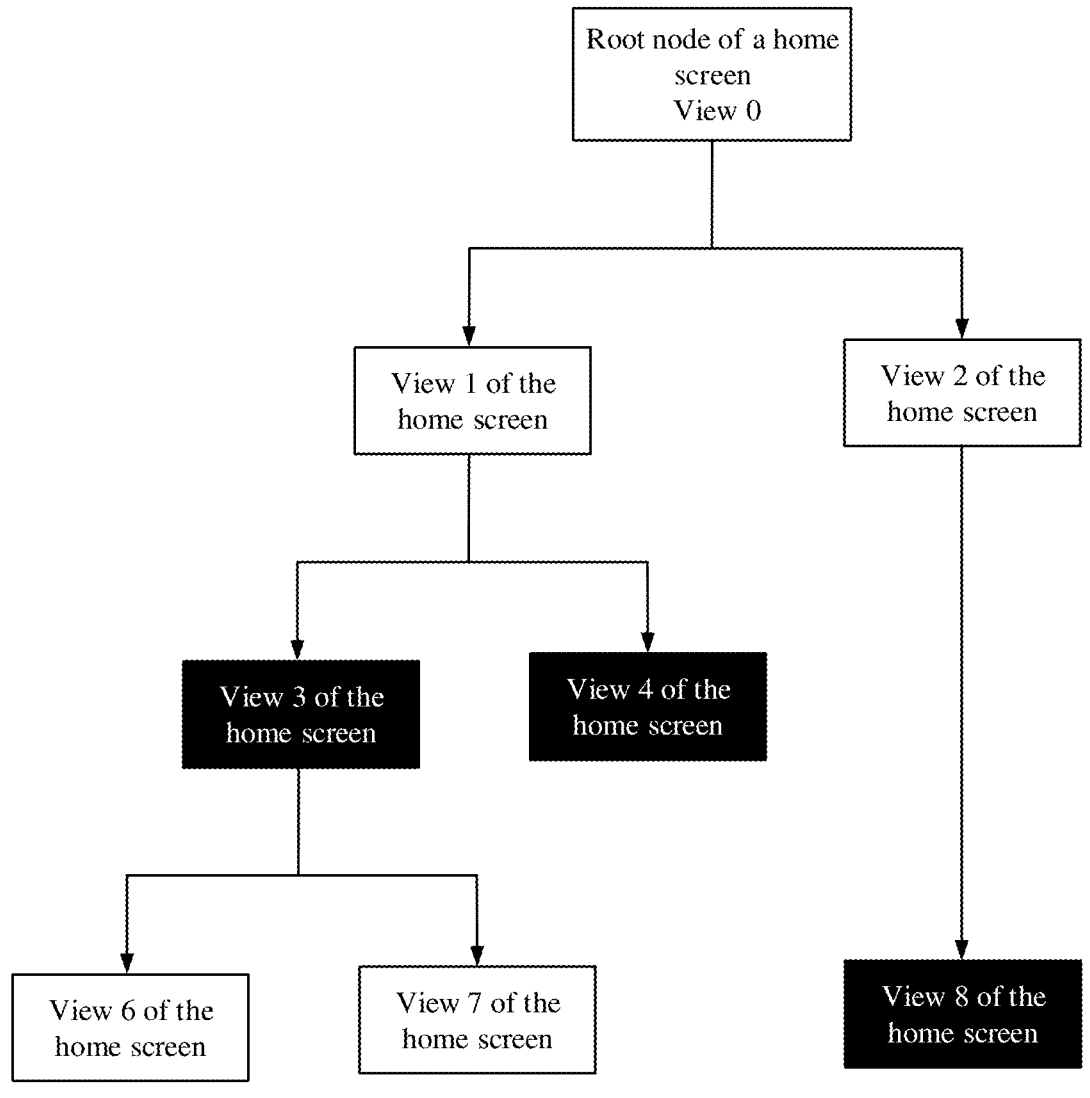

As shown in FIG. 6C, the electronic device may store, based on a tree-shaped structure, the views corresponding to the home screen of the electronic device, that is, a root node of the tree-shaped structure may be a root node of the home screen, that is, the view 0. Nodes below the root node may be views that each can display a plurality of views, that is, the view 1 (the view 1 may display a plurality of views 3 and a plurality of views 4) and the view 2 (the view 2 may display a plurality of views 8). Nodes below the view 1 indicate the view 3 and the view 4. Nodes below the view 3 indicate the view 6 and the view 7. A node below the view 2 indicates the view 8.

After the electronic device receives the unlock operation of the user, that is, after the first operation is received, in response to the first operation, the electronic device may collect, by using the tree-shaped structure corresponding to the views that are on the home screen and that are stored in the electronic device, each view included in the first interface and data corresponding to each view. Based on the tree-shaped structure shown in FIG. 6A, FIG. 6B, and FIG. 6C, because the view 3, the view 4, and the view 8 are views that can be independently moved on the home screen of the electronic device, the view 3, the view 4, and the view 8 may be views of the first type. That is, the view 3, the view 4, and the view 8 may be elements of the first type.

After determining the elements of the first type, that is, the view 3, the view 4, and the view 8, the electronic device may determine, based on data corresponding to each element of the first type, an area corresponding to each element of the first type. The electronic device determines the element that is of the first type and that has the smallest area as the reference element. Because an area of the view 8 is the smallest, the electronic device may determine that the view 8 is the reference element.

After the electronic device determines the reference element from the plurality of elements, the electronic device may determine the reference point. The reference point may be used to determine an element circle, for example, the reference point may be a center point of the element circle determined by the electronic device. That is, different element circles may have a same reference point.

In some examples, after the electronic device determines the reference element from the plurality of elements, the user may enter the reference point, that is, enter a reference point location, by using the electronic device. The user may alternatively preset the reference point in the electronic device. For example, the electronic device may preset the reference point as a center point of a display interface of the electronic device. The reference point location and a manner of determining the reference point are not limited in this embodiment of this application.

It should be noted that, after the electronic device receives the first operation performed by the user to trigger the electronic device to display the first interface, the electronic device may determine the reference element from the plurality of elements, and then the electronic device determines the reference point. The electronic device may alternatively determine the reference element from the plurality of elements and determine the reference point simultaneously. The electronic device may alternatively determine the reference element from the plurality of elements after determining the reference point. In this embodiment of this application, a sequence of determining the reference element from the plurality of elements by the electronic device and determining the reference point by the electronic device is not limited.

For example, the first interface is still the home screen of the electronic device, and the plurality of elements included in the first interface are a plurality of application icons. As shown in FIG. 5A and FIG. 5B, that the electronic device determines a reference element from the plurality of elements and determines a reference point may include: After the electronic device, for example, the sliding event module of the electronic device, determines that the unlock operation of the user is received, the sliding event module may notify a lock screen module included in an application framework layer of the electronic device. After the lock screen module receives a notification of the sliding event module, the lock screen module may notify a ring-shaped scale animation module of the electronic device. After the ring-shaped scale animation module receives the notification sent by the lock screen module, the ring-shaped scale animation module may collect the views on the home screen of the electronic device and enter the reference point location. After the ring-shaped scale animation module collects the views on the home screen of the electronic device and enters the reference point location, the ring-shaped scale animation module may notify a home screen unlock event module included in the home screen application of the electronic device, and send the collected views on the home screen of the electronic device and the reference point location to the home screen unlock event module. After the home screen unlock event module receives the views on the home screen of the electronic device and the reference point location that are sent by the ring-shaped scale animation module, the home screen unlock event module may determine the view with the smallest area from the plurality of views (that is, the elements), that is, determine the view with the smallest area as the reference element.

Alternatively, after the electronic device, for example, the password entering module of the electronic device, determines that the unlock operation of the user is received, the password entering module may notify the lock screen module included in the application framework layer of the electronic device. After the lock screen module receives a notification of the password entering module, the lock screen module may notify the ring-shaped scale animation module of the electronic device. After the ring-shaped scale animation module receives the notification sent by the lock screen module, the ring-shaped scale animation module may collect the views on the home screen of the electronic device and enter the reference point location. After the ring-shaped scale animation module collects the views on the home screen of the electronic device and enters the reference point location, the ring-shaped scale animation module may notify the home screen unlock event module included in the home screen application of the electronic device, and send the collected views on the home screen of the electronic device and the reference point location to the home screen unlock event module. After the home screen unlock event module receives the views on the home screen of the electronic device and the reference point location that are sent by the ring-shaped scale animation module, the home screen unlock event module may determine the view with the smallest area from the plurality of views (that is, the elements), that is, determine the view with the smallest area as the reference element.

Alternatively, after the electronic device, for example, the fingerprint recognition module of the electronic device, determines that the unlock operation of the user is received, the fingerprint recognition module may notify the lock screen module included in the application framework layer of the electronic device. After the lock screen module receives a notification of the fingerprint recognition module, the lock screen module may notify the ring-shaped scale animation module of the electronic device. After the ring-shaped scale animation module receives the notification sent by the lock screen module, the ring-shaped scale animation module may collect the views on the home screen of the electronic device and enter the reference point location. After the ring-shaped scale animation module collects the views on the home screen of the electronic device and enters the reference point location, the ring-shaped scale animation module may notify the home screen unlock event module included in the home screen application of the electronic device, and send the collected views on the home screen of the electronic device and the reference point location to the home screen unlock event module. After the home screen unlock event module receives the views on the home screen of the electronic device and the reference point location that are sent by the ring-shaped scale animation module, the home screen unlock event module may determine the view with the smallest area from the plurality of views (that is, the elements), that is, determine the view with the smallest area as the reference element.

Alternatively, after the electronic device, for example, the face recognition module of the electronic device, determines that the unlock operation of the user is received, the face recognition module may notify the lock screen module included in the application framework layer of the electronic device. After the lock screen module receives a notification of the face recognition module, the lock screen module may notify the ring-shaped scale animation module of the electronic device. After the ring-shaped scale animation module receives the notification sent by the lock screen module, the ring-shaped scale animation module may collect the views on the home screen of the electronic device and enter the reference point location. After the ring-shaped scale animation module collects the views on the home screen of the electronic device and enters the reference point location, the ring-shaped scale animation module may notify the home screen unlock event module included in the home screen application of the electronic device, and send the collected views on the home screen of the electronic device and the reference point location to the home screen unlock event module. After the home screen unlock event module receives the views on the home screen of the electronic device and the reference point location that are sent by the ring-shaped scale animation module, the home screen unlock event module may determine the view with the smallest area from the plurality of views (that is, the elements), that is, determine the view with the smallest area as the reference element.

S403: The electronic device determines a plurality of element circles based on the reference element and the reference point, where each element circle includes at least one element.

After the electronic device determines the reference element from the plurality of elements and determines the reference point, the electronic device may determine the plurality of element circles based on the reference element and the reference point. Each element circle may include a plurality of elements, that is, each element circle includes at least one element. The plurality of elements included in each element circle may collectively enter an interface of the electronic device, that is, the first interface may simultaneously display a plurality of elements included in one element circle, and display different element circles based on an interval time.

In some examples, the plurality of element circles may include a first element circle and a second element circle, the first element circle includes at least one first element, the second element circle includes at least one second element, and the first element is an element in a range of the first element circle.

The element circle may be rectangular, the element circle may be circular, or the element circle may be in another shape. This is not limited in this embodiment of this application. For example, when the element circle is rectangular, the range of the element circle, that is, a size of the element circle, is determined based on a length and a width of the element circle. When the element circle is circular, the range of the element circle, that is, the size of the element circle, is determined based on a radius of the element circle. In this embodiment of this application, an example in which the element circle is rectangular, that is, the size of the element circle is determined based on the length and the width of the element circle, is used for description.

In some examples, when the element circle is rectangular, that the electronic device determines a plurality of element circles based on the reference element and the reference point may include: The electronic device first determines a length and a width of the reference element. Then, the electronic device may separately determine a length and a width of each element circle based on the length and the width of the reference element. Then, the electronic device may determine each element circle based on the length and the width of each element circle by using the reference point as a center, that is, determine the range of each element circle. After the range of each element circle is determined, elements in the range of each element circle are a plurality of elements included in the element circle.

It should be noted that each element can belong to only one element circle, that is, when one element is in ranges of a plurality of element circles, the element belongs to an element circle with a small range. That is, an element that has been involved in element circle classification does not involve in subsequent element circle classification.

In some examples, when a range of one element circle includes a partial range of one element, the element belongs to the element circle. To be specific, when an element spans across circles, that is, when a part of the element is in an element circle, and the other part of the element is in another element circle, the element belongs to an element circle with a smaller range, that is, a small circle is preferably responded to. To be specific, the plurality of element circles may include the first element circle and the second element circle, the first element circle includes at least one first element, the second element circle includes at least one second element, the first element is an element in the range of the first element circle, and the second element is an element in the range of the second element circle; and when a third element is both an element in the range of the first element circle and an element in the range of the second element circle, the third element is the first element, and the third element is any element included in the first interface.

In some examples, when the element circle is rectangular, that the electronic device determines a plurality of element circles based on the reference element and the reference point may include: The electronic device determines a length and a width of the reference element; and the electronic device determines the first element circle and the second element circle based on the length and the width of the reference element by using the reference point as a center, where a length of the first element circle is N times the length of the reference element, a width of the first element circle is N times the width of the reference element, N is an integer greater than or equal to 1, a length of the second element circle is M times the length of the reference element, a width of the second element circle is M times the width of the reference element, and M is an integer greater than N.

That is, when the element circle is rectangular, that the electronic device determines a plurality of element circles based on the reference element and the reference point may be determining an element circle with a small range based on the length and the width of the reference element, and sequentially determining an element circle with a large range based on the length and the width of the reference element, until all the elements included in the first interface are classified into different element circles. That is, the length of the element circle may be N times the length of the reference element, and the width of the element circle may be N times the width of the reference element. N may be set based on a specific situation.

Figure 7:
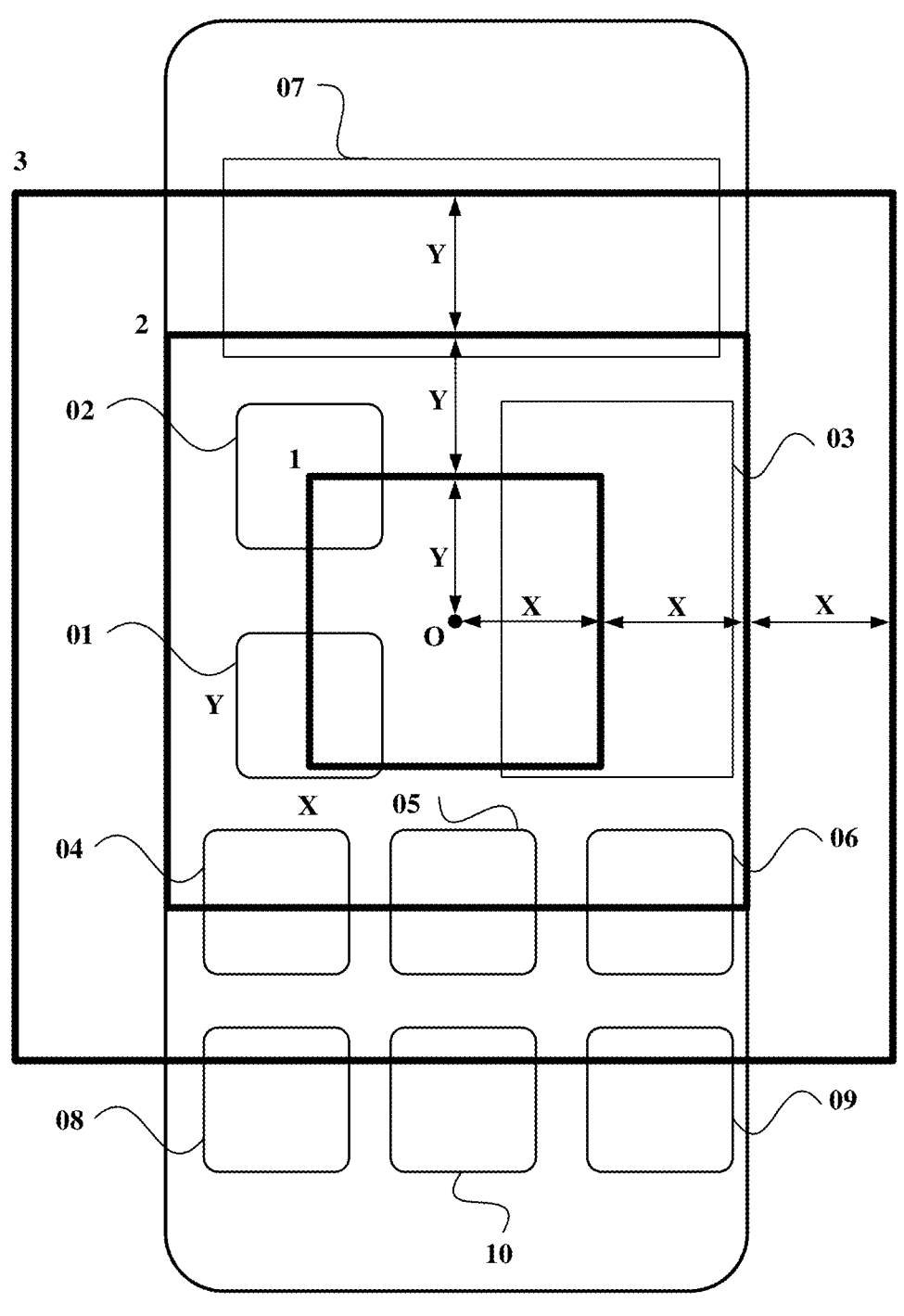
FIG. 7 is a schematic flowchart of an element circle classification process according to an embodiment of this application.

For example, the first interface is still the home screen of the electronic device, the plurality of elements included in the first interface are a plurality of application icons, and the element circle is rectangular. After the electronic device receives the unlock operation of the user, as shown in FIG. 7, the electronic device may determine the plurality of elements included in the home screen, that is, the plurality of application icons included in the home screen, for example, an application icon 01, an application icon 02, an application icon 03, an application icon 04, an application icon 05, an application icon 06, an application icon 07, an application icon 08, an application icon 09, and an application icon 10.

After the electronic device determines the plurality of application icons included in the home screen, the electronic device may determine, from the plurality of application icons based on data corresponding to the plurality of application icons, an application icon with a smallest area as a first application icon (that is, the reference element), and the electronic device may simultaneously determine that the reference point is a center of the home screen of the electronic device. As shown in FIG. 7, the electronic device determines that the reference point is a center O of the home screen of the electronic device, and the first application icon is the application icon 01 included in the home screen. The electronic device may determine, based on data corresponding to the application icon 01, that a length and a width that correspond to the application icon 01 are X and Y, respectively.

Then, the electronic device may determine the first element circle, that is, an element circle with a smallest range, that is, an element circle 1, based on the reference element and the reference point. The electronic device may determine a range of the element circle 1 by using the reference point O as the center, using two times X as a length of the element circle 1, and using two times Y as a width of the element circle 1. As shown in FIG. 7, the range of the element circle 1 includes a part of the application icon 01, a part of the application icon 02, and a part of the application icon 03. The electronic device may determine that the application icon 01, the application icon 02, and the application icon 03 are elements included in the element circle 1.

Then, the electronic device may determine the second element circle, that is, an element circle 2, based on the reference element and the reference point, and the range of the second element circle is greater than the range of the first element circle. The electronic device may determine a range of the element circle 2 by using the reference point O as the center, using four times X as a length of the element circle 2, and using four times Y as a width of the element circle 2. As shown in FIG. 7, the range of the element circle 2 includes the application icon 01, the application icon 02, the application icon 03, a part of the application icon 04, a part of the application icon 05, a part of the application program 06, and a part of the application icon 07. Because the application icon 01, the application icon 02, and the application icon 03 are already classified as the elements included in the element circle 1, the application icon 01, the application icon 02, and the application icon 03 are no longer classified as elements included in the element circle 2. The electronic device may determine that the application icon 04, the application icon 05, the application icon 06, and the application icon 07 are elements included in the element circle 2.

Then, the electronic device may determine the third element circle, that is, an element circle 3, based on the reference element and the reference point, and a range of the third element circle is greater than the range of the second element circle. The electronic device may determine a range of the element circle 3 by using the reference point O as the center, using six times X as a length of the element circle 3, and using six times Y as a width of the element circle 3. As shown in FIG. 7, the range of the element circle 3 includes the application icon 01, the application icon 02, the application icon 03, a part of the application icon 04, the application icon 05, the application icon 06, a part of the application icon 07, a part of the application icon 08, a part of the application icon 09, and a part of the application icon 10. Because the application icon 01, the application icon 02, and the application icon 03 are already classified as the elements included in the element circle 1, and the application icon 04, the application icon 05, the application icon 06, and the application icon 07 are already classified as the elements included in the element circle 2, the application icon 01, the application icon 02, the application icon 03, the application icon 04, the application icon 05, the application icon 06, and the application icon 07 are no longer classified as elements included in the element circle 3. The electronic device may determine that the application icon 08, the application icon 09, and the application icon 10 are elements included in the element circle 3.

Because the elements, that is, the application icons, included in the element circle 1, the element circle 2, and the element circle 3 already include all the application icons included in the home screen, the electronic device can determine three element circles, that is, the element circle 1, the element circle 2, and the element circle 3, based on the reference element and the reference point.

For example, the first interface is still the home screen of the electronic device, and the plurality of elements included in the first interface are a plurality of application icons. As shown in FIG. 5A and FIG. 5B, that the electronic device determines a plurality of element circles based on the reference element and the reference point may include: When the electronic device, for example, the home screen unlock event module included in the home screen application of the electronic device, receives the views on the home screen of the electronic device and the reference point location that are sent by the ring-shaped scale animation module included in the application framework layer of the electronic device, the home screen unlock event module may determine the view with the smallest area from the plurality of views (that is, the elements), to determine the view with the smallest area as the reference element. The home screen unlock event module classifies all the views on the home screen into circles based on the smallest view and the reference point, that is, the home screen unlock event module determines the plurality of element circles based on the reference element and the reference point.

S404: The electronic device determines a display interval between the element circles.

After the electronic device determines the plurality of element circles, the electronic device may determine the display interval between the element circles, so that the electronic device can sequentially display each element circle based on the display interval, thereby achieving an effect of displaying the element circles circle by circle, and increasing transition animation effects. Therefore, the electronic device is enabled to more vividly enter a rectangle-grid arrangement scenario, that is, more vividly display the plurality of elements simultaneously, thereby improving user experience.

In some examples, the user may alternatively preset the display interval in the electronic device, so that after determining the plurality of element circles, the electronic device can sequentially display each element circle based on the preset display interval. For example, the user may preset the display interval in the electronic device to be 30 milliseconds or 50 milliseconds. To be specific, after the electronic device determines the plurality of element circles, the electronic device may sequentially display each element circle based on the display interval of 30 milliseconds, or the electronic device may sequentially display each element circle based on the display interval of 50 milliseconds.

It should be noted that after the electronic device determines the plurality of element circles based on the reference element and the reference point, the electronic device may determine the display interval between the element circles. The electronic device may alternatively determine the display interval between the element circles while determining the plurality of element circles based on the reference element and the reference point. The electronic device may alternatively determine the display interval between the element circles first, and then determine the plurality of element circles based on the reference element and the reference point. A sequence of determining the element circles by the electronic device and determining the display interval between the element circles by the electronic device is not limited in this embodiment of this application. In this embodiment of this application, an example in which the electronic device determines the plurality of element circles based on the reference element and the reference point before determining the display interval between the element circles is used for description.

It should be noted that the plurality of element circles may be displayed at a same display interval or different display intervals. This is not limited in this embodiment of this application.

For example, the first interface is still the home screen of the electronic device, and the plurality of elements included in the first interface are a plurality of application icons. As shown in FIG. 5A and FIG. 5B, that the electronic device determines a display interval between the element circles may include: After the electronic device, for example, the home screen unlock event module included in the home screen application of the electronic device, determines the plurality of element circles based on the reference element and the reference point, the home screen unlock event module may start animations at a fixed interval, that is, the home screen unlock event module may determine the display interval between the element circles.

S405: The electronic device sequentially displays each element circle based on the display interval.

After the electronic device determines the plurality of element circles and the display interval between the element circles, the electronic device may separately display each element circle based on the display interval (which may be referred to as a first interval time in this embodiment of this application) between the element circles, that is, separately display the elements corresponding to each element circle. In some examples, that the electronic device sequentially displays each element circle based on the display interval is that the electronic device may display each element circle in a specific sequence. It should be noted that the electronic device may alternatively separately display each element circle based on the display interval between the element circles, and does not need to display each element circle in a specific sequence.

In some examples, when the electronic device sequentially displays each element circle based on the display interval between the element circles, the electronic device may sequentially display each element circle from small to large based on sizes of ranges of the element circles, for example, first display an element circle with a small range, and then display an element circle with a large range. The element circle with the small range is an element circle including less elements, and the element circle with the large range is an element circle including more elements.

That is, the plurality of element circles determined by the electronic device may include the first element circle and the second element circle, the first element circle includes at least one first element, and the second element circle includes at least one second element. That the electronic device separately displays the plurality of element circles based on the first interval time, that is, that the electronic device sequentially displays each element circle based on the display interval, may include: The electronic device displays the first element, that is, the electronic device simultaneously displays a plurality of first elements corresponding to the first element circle; and after the electronic device displays the first element, the electronic device may simultaneously display a plurality of second elements corresponding to the second element circle after the first interval time.

For example, the electronic device determines that the first interface includes three element circles, that is, the element circle 1, the element circle 2, and the element circle 3, and the element circle is rectangular. The range of the element circle 1 is less than the range of the element circle 2 (that is, the length of the element circle 1 is less than the length of the element circle 2, and the width of the element circle 1 is less than the width of the element circle 2), and the range of the element circle 2 is less than the range of the element circle 3 (that is, the length of the element circle 2 is less than the length of the element circle 3, and the width of the element circle 2 is less than the width of the element circle 3). The element circle 1 may include four elements, the element circle 2 may include 12 elements, and the element circle 3 may include eight elements.

Figure 8:
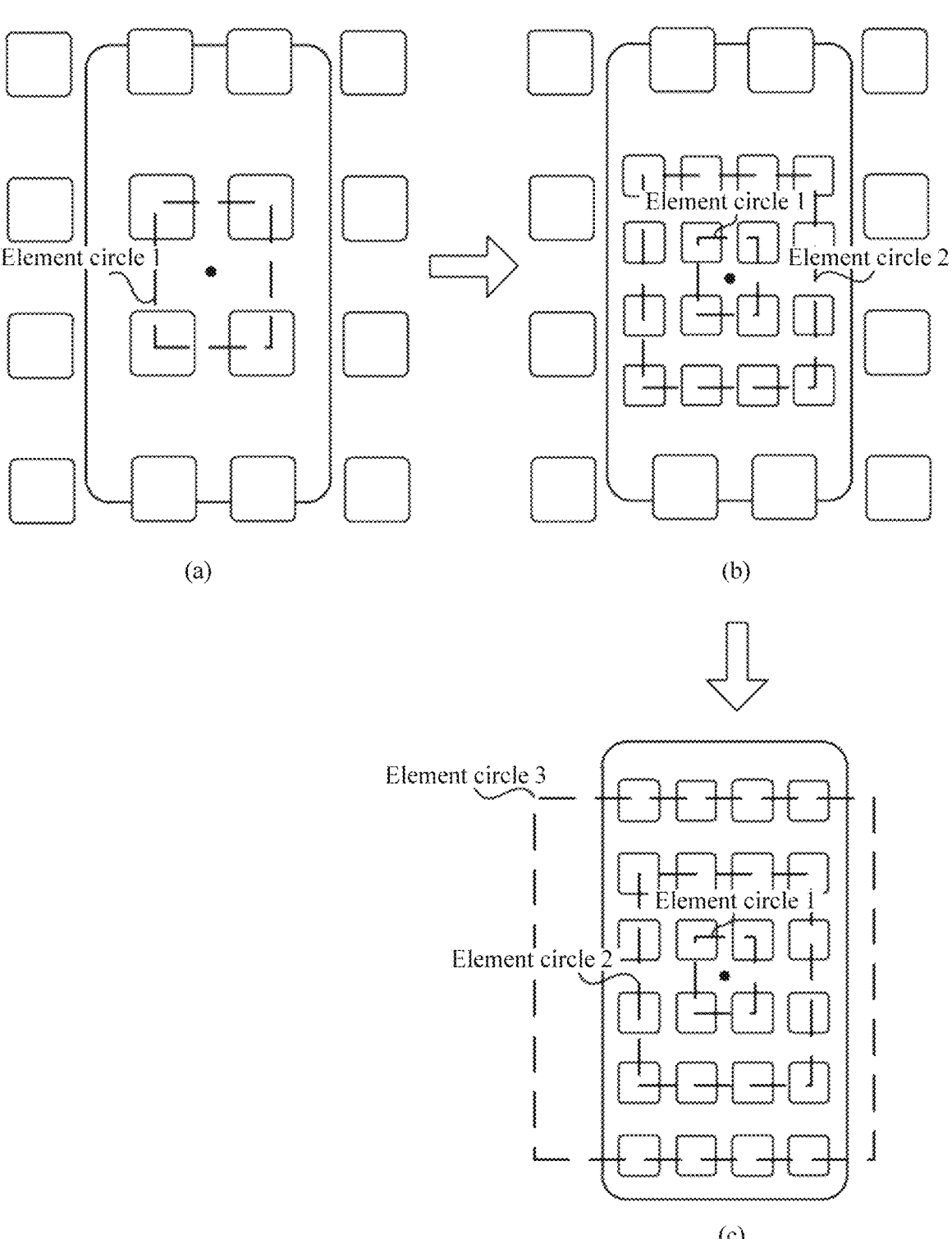
FIG. 8 is a schematic diagram 1 of an element circle display process according to an embodiment of this application.

After the electronic device determines that the first interface includes three element circles, as shown in (a) of FIG. 8, the electronic device may first display the four elements included in the element circle 1. After the electronic device displays the four elements included in the element circle 1, as shown in (b) of FIG. 8, the electronic device may display the 12 elements included in the element circle 2 after the display interval. After the electronic device displays the four elements included in the element circle 1 and the 12 elements included in the element circle 2, as shown in (c) of FIG. 8, the electronic device may display the eight elements included in the element circle 3 after the display interval.

In some other examples, when the electronic device sequentially displays each element circle based on the sizes of the ranges of the element circles, the electronic device may scale up the elements included in each element circle for display, and then restore, to a normal size for display, the elements that are scaled up, so that an effect of scaling and displaying the plurality of elements included in the plurality of element circles circle by circle in a ring shape in a time-lapse manner can be achieved.

That is, after the electronic device determines that the element circles include the first element circle and the second element circle, the first element circle includes at least one first element, and the second element circle includes at least one second element, that the electronic device displays a plurality of first elements included in the first element circle, that is, that the electronic device displays the first element, may include: The electronic device may scale up the first element based on a first scale-up factor, and the electronic device displays the first element obtained after scaling up.

That the electronic device displays a plurality of second elements included in the second element circle, that is, that the electronic device displays the second element, may include: After the first interval time, the electronic device may scale up the second element based on the first scale-up factor and scale up the first element based on a second scale-up factor, and the electronic device simultaneously displays the second element scaled up based on the first scale-up factor and the first element scaled up based on the second scale-up factor, where the first scale-up factor is greater than the second scale-up factor.

After the electronic device simultaneously displays the second element scaled up based on the first scale-up factor and the first element scaled up based on the second scale-up factor, and after the first interval time, the electronic device may further scale up the second element based on the second scale-up factor, and the electronic device simultaneously displays the second element scaled up based on the second scale-up factor and the first element scaled up based on the second scale-up factor.

For example, when the electronic device determines that the plurality of element circles include the first element circle and the second element circle, the first element circle and the second element circle each include a plurality of elements, and the range of the first element circle is less than the range of the second element circle. That the electronic device sequentially displays each element circle based on the display interval may include: The electronic device first displays the plurality of elements included in the first element circle. When the electronic device displays the plurality of elements (that is, the first elements) included in the first element circle, the electronic device may scale up the plurality of elements included in the first element circle by A times for display. A may be an integer greater than or equal to 1, for example, A may be 3.

When the electronic device scales up the plurality of elements included in the first element circle by A times for display, the electronic device may display the plurality of elements included in the second element circle after the display interval. When the electronic device displays the plurality of elements included in the second element circle, the electronic device may scale up the plurality of elements included in the second element circle by B times for display. B may be an integer greater than or equal to 1, for example, B may be 3. That is, A and B may be the same or different.

When the electronic device scales up the plurality of elements included in the second element circle by B times for display, the electronic device may scale up the plurality of elements included in the first element circle by 1 time for display, that is, display the plurality of elements included in the first element circle in the normal size. Alternatively, when the electronic device scales up the plurality of elements included in the second element circle by B times for display, the electronic device may scale up the plurality of elements included in the first element circle by C times for display, where C may be an integer greater than 0, and C is less than B. For example, when B is 3, C may be 2.

After the electronic device displays the plurality of elements included in the second element circle, the electronic device displays the elements included in the first element circle and the second element circle in the normal size after the display interval, that is, the electronic device may scale up the elements included in the first element circle and the second element circle by 1 time for display after the display interval.

For example, the electronic device determines that the first interface includes four element circles, that is, the element circle 1, the element circle 2, the element circle 3, and the element circle 4. The range of the element circle 1 is less than the range of the element circle 2 (that is, the length of the element circle 1 is less than the length of the element circle 2, and the width of the element circle 1 is less than the width of the element circle 2); the range of the element circle 2 is less than the range of the element circle 3 (that is, the length of the element circle 2 is less than the length of the element circle 3, and the width of the element circle 2 is less than the width of the element circle 3); and the range of the element circle 3 is less than a range of the element circle 4 (that is, the length of the element circle 3 is less than a length of the element circle 4, and the width of the element circle 3 is less than a width of the element circle

4). The element circle 1 may include four elements, the element circle 2 may include 12 elements, the element circle 3 may include four elements, and the element circle 4 may include eight elements.

Figure 9A:
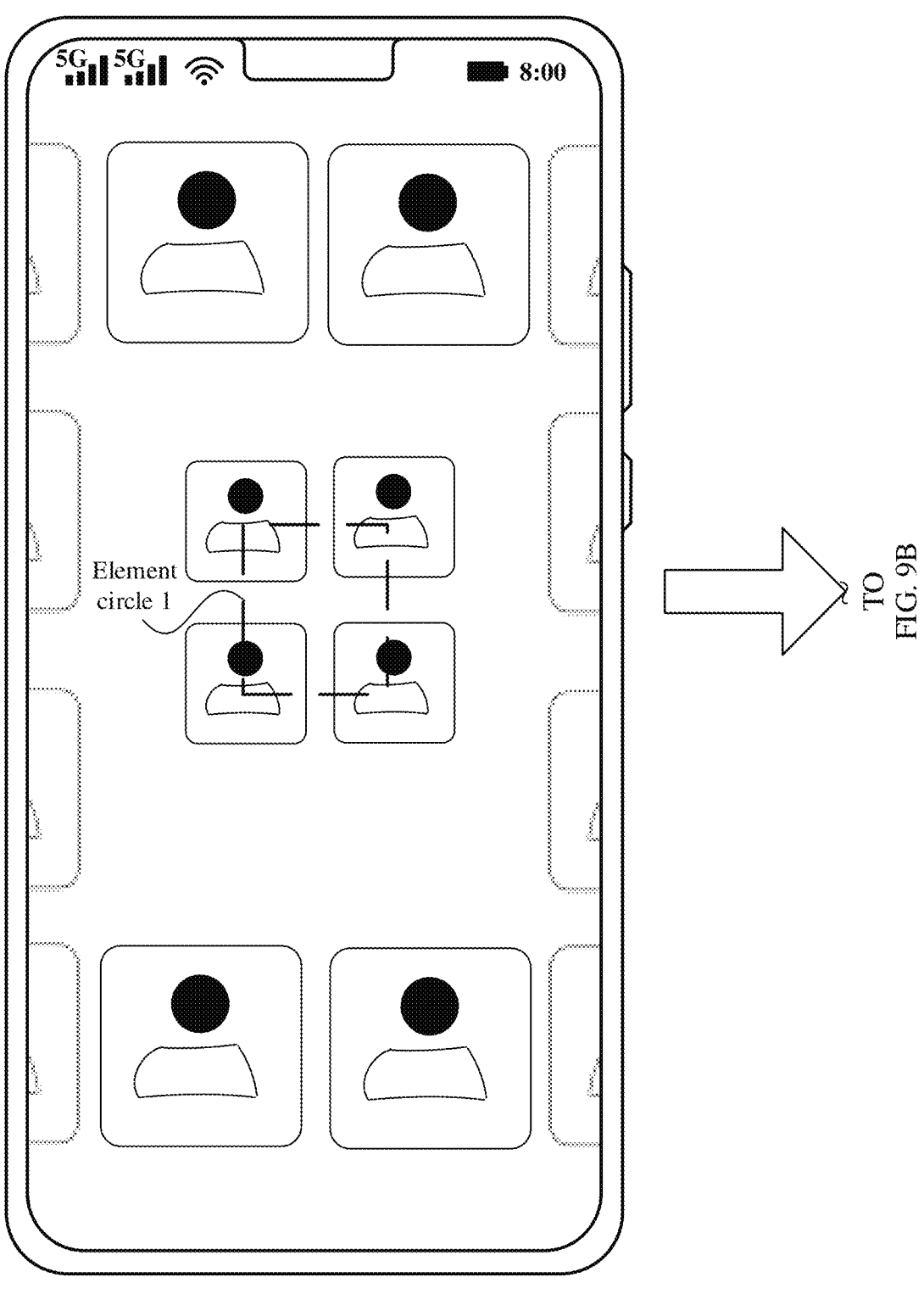
FIG. 9A, FIG. 9B, FIG. 9C, FIG. 9D, and FIG. 9E are a schematic diagram 2 of an element circle display process according to an embodiment of this application.

After the electronic device determines that the first interface includes four element circles, as shown in FIG. 9A, the electronic device may first display the four elements included in the element circle 1. When the electronic device displays the four elements included in the element circle 1, the electronic device may scale up the four elements included in the element circle 1 by 3 times for display.

It should be noted that, as shown in FIG. 9A, when the electronic device scales up the four elements included in the element circle 1 for display, if the interface of the electronic device may further display the elements included in the element circle 2, the interface of the electronic device may further scale up (for example, scale up by 4 times) the 12 elements included in the element circle 2 for display. When the interface of the electronic device cannot completely display the 12 scaled-up elements included in the element circle 2, the electronic device may display parts of the 12 scaled-up elements included in the element circle 2.

Figure 9B:
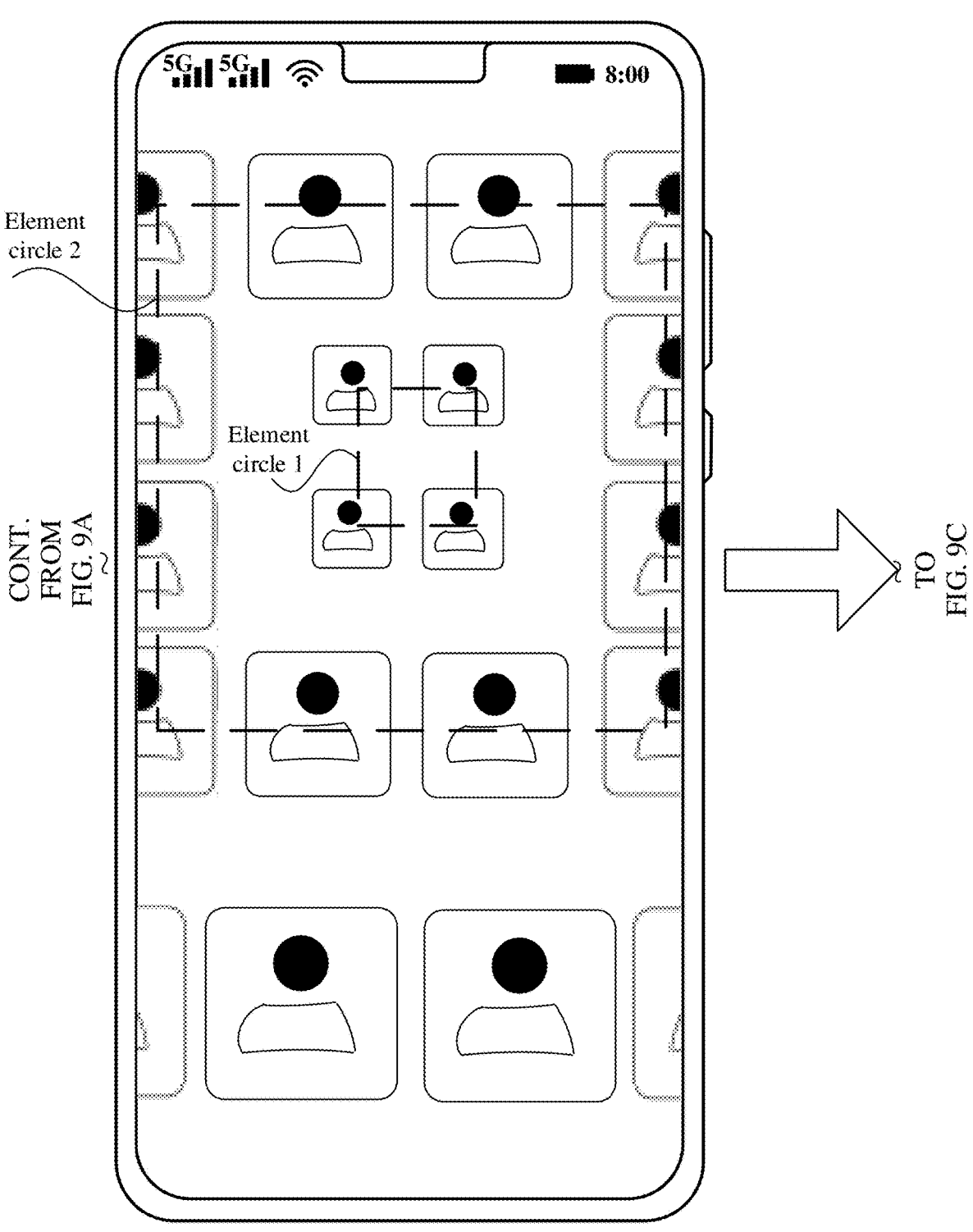

After the electronic device displays the four elements included in the element circle 1, as shown in FIG. 9B, the electronic device may display the 12 elements included in the element circle 2 after the display interval. When the electronic device displays the 12 elements included in the element circle 2, the electronic device may scale up the 12 elements included in the element circle 2 by 3 times for display. In addition, the electronic device may display the four elements included in the element circle 1 in the normal size, that is, scale up the four elements included in the element circle 1 by 1 time for display. Alternatively, when the electronic device scales up the 12 elements included in the element circle 2 by 3 times, the electronic device may also scale up the four elements included in the element circle 1 by 2 times for display.

It should be noted that, as shown in FIG. 9B, when the electronic device scales up the 12 elements included in the element circle 2 for display, if the interface of the electronic device may further display the elements included in the element circle 3, the interface of the electronic device may further scale up (for example, scale up by 4 times) the four elements included in the element circle 3 for display. When the interface of the electronic device cannot completely display the four scaled-up elements included in the element circle 3, the electronic device may display parts of the four scaled-up elements included in the element circle 3.

Figure 9C:
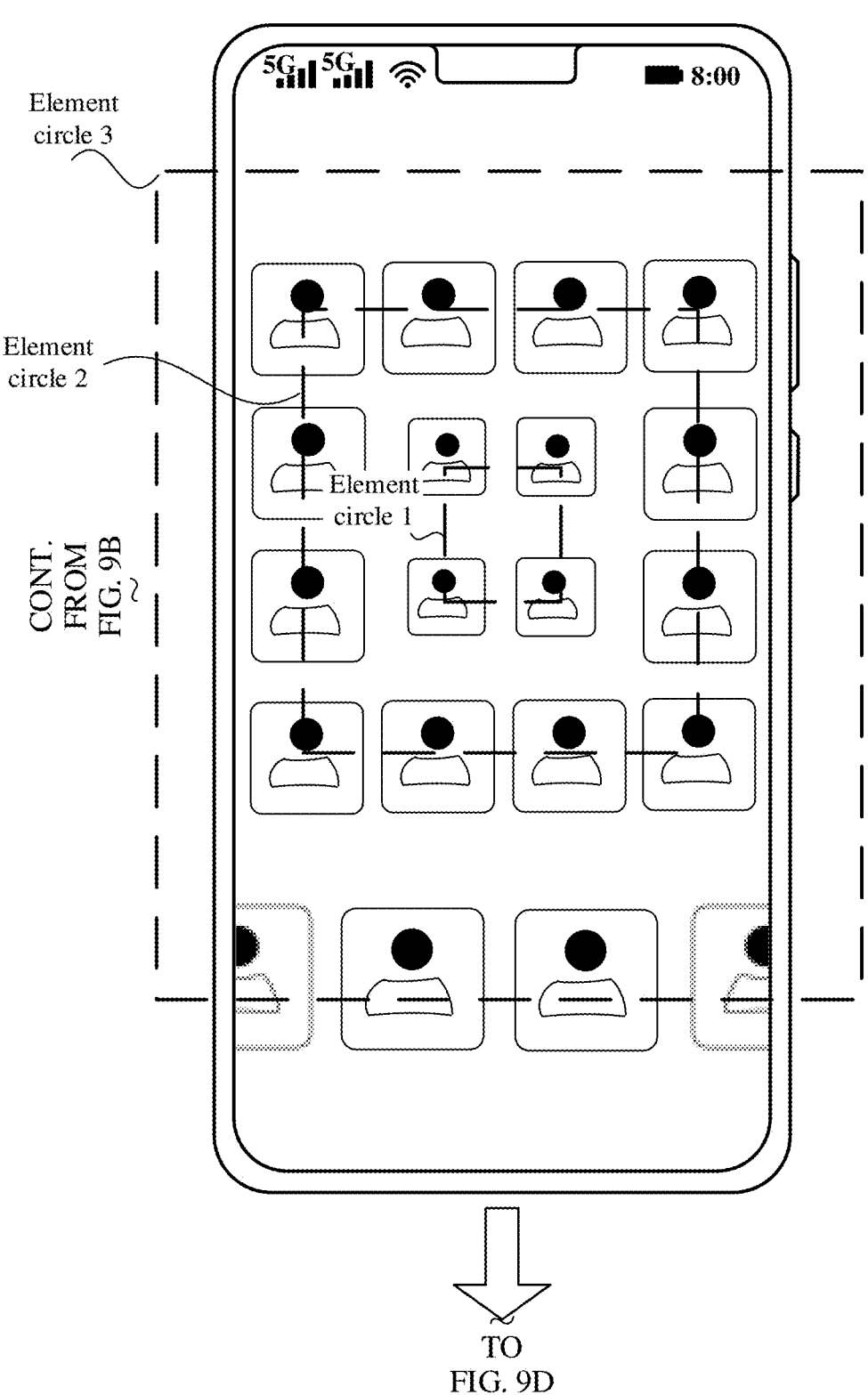

After the electronic device displays the 12 elements included in the element circle 2, as shown in FIG. 9C, the electronic device may display the four elements included in the element circle 3 after the display interval. When the electronic device displays the four elements included in the element circle 3, the electronic device may scale up the four elements included in the element circle 3 by 3 times for display. In addition, the electronic device may display the 12 elements included in the element circle 2 in the normal size, that is, scale up the 12 elements included in the element circle 2 by 1 time for display. Alternatively, when the electronic device scales up the four elements included in the element circle 3 by 3 times, the electronic device may also scale up the 12 elements included in the element circle 2 by 2 times for display, and the electronic device may also scale up the four elements included in the element circle 1 by 1 time for display.

It should be noted that, when the electronic device scales up the four elements included in the element circle 3 for display, if the interface of the electronic device may further display the elements included in the element circle 4, the interface of the electronic device may further scale up (for example, scale up by 4 times) the eight elements included in the element circle 4 for display. When the interface of the electronic device cannot completely display the eight scaled-up elements included in the element circle 4, the electronic device may display parts of the eight scaled-up elements included in the element circle 4.

Figure 9D:
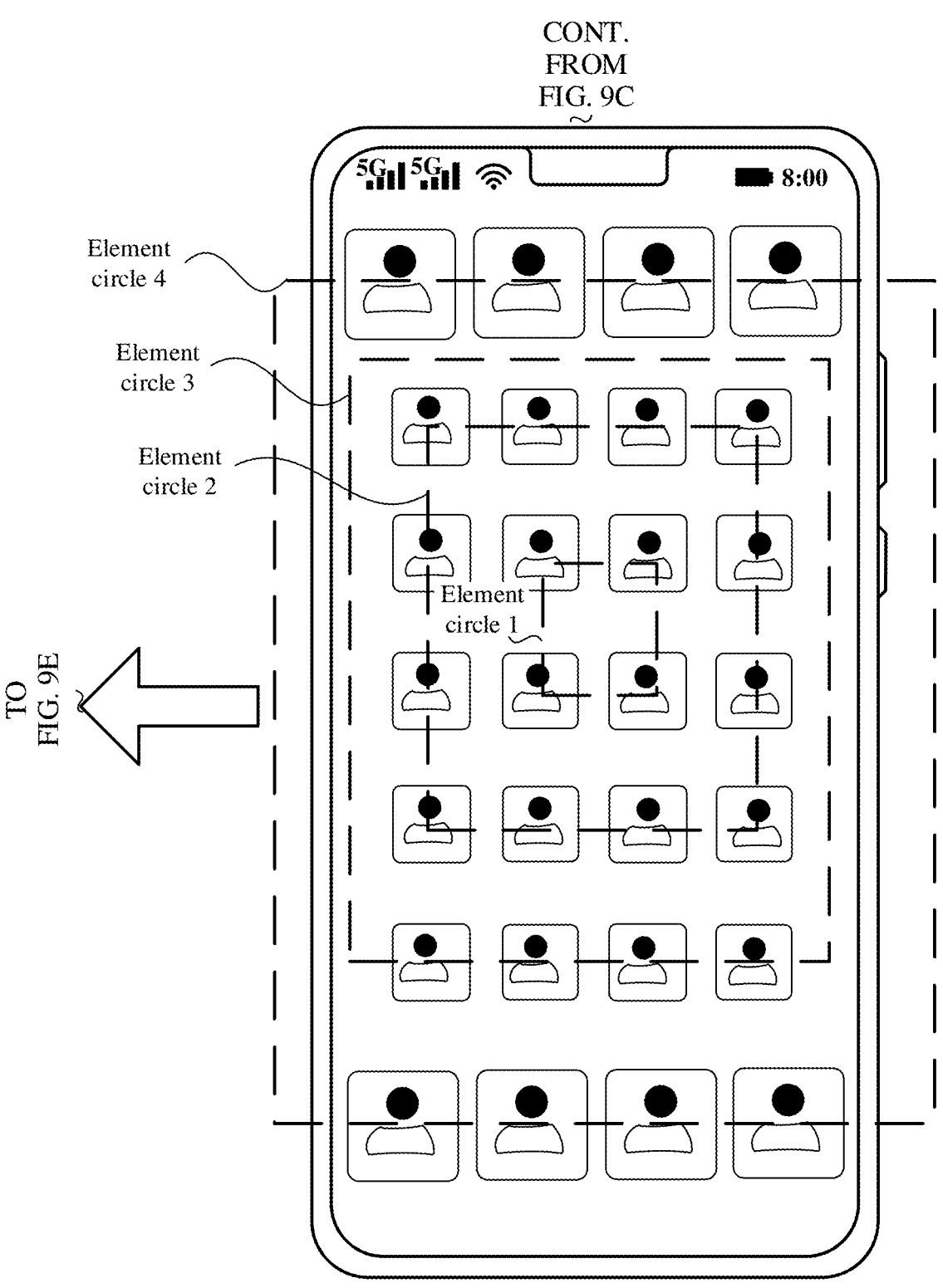

After the electronic device displays the four elements included in the element circle 3, as shown in FIG. 9D, the electronic device may display the eight elements included in the element circle 4 after the display interval. When the electronic device displays the eight elements included in the element circle 4, the electronic device may scale up the eight elements included in the element circle 4 by 3 times for display. In addition, the electronic device may display the four elements included in the element circle 3 in the normal size, that is, scale up the four elements included in the element circle 3 by 1 time for display. Alternatively, when the electronic device scales up the eight elements included in the element circle 4 by 3 times, the electronic device may also scale up the four elements included in the element circle 3 by 2 times for display, and the electronic device may also scale up the 12 elements included in the element circle 2 and the four elements included in the element circle 1 by 1 time for display.

Figure 9E:
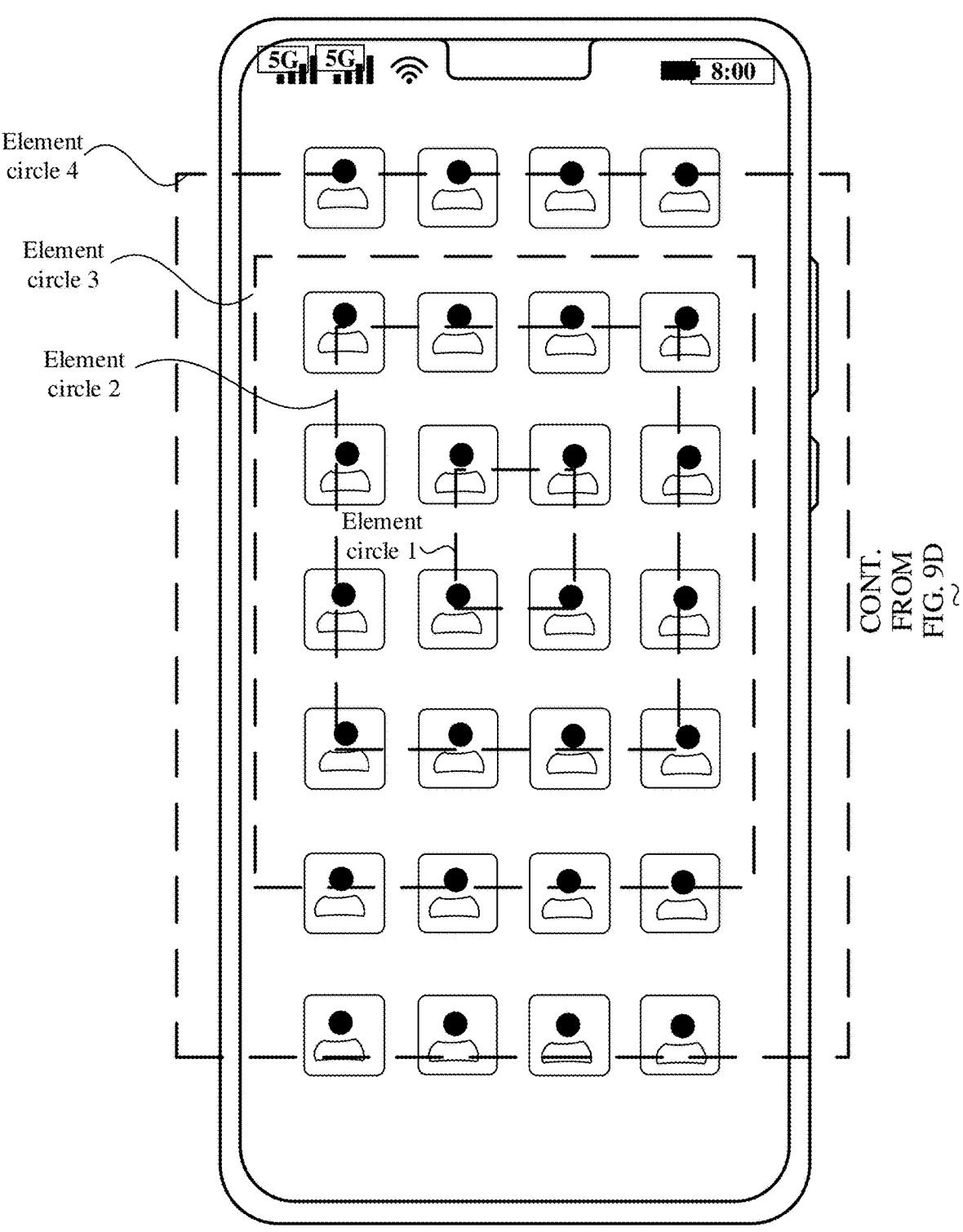

After the electronic device displays the eight elements included in the element circle 4, as shown in FIG. 9E, the electronic device may display the elements included in the element circle 1, the element circle 2, the element circle 3, and the element circle 4 in the normal size after the display interval, that is, the electronic device may scale up the element circle 1, the element circle 2, the element circle 3, and the element circle 4 by 1 time for display after the display interval.

For example, the first interface is still the home screen of the electronic device, and the plurality of elements included in the first interface are a plurality of application icons. As shown in FIG. 5A and FIG. 5B, that the electronic device sequentially displays each element circle based on the display interval may include: After the electronic device, for example, the home screen unlock event module included in the home screen application of the electronic device, determines the plurality of element circles based on the reference element and the reference point, the home screen unlock event module may notify a view animation module included in the home screen application of the electronic device to play a view animation. That is, after the view animation module receives a notification sent by the home screen unlock event module (the notification may include the plurality of element circles and the display interval that are determined by the electronic device), the view animation module may sequentially display each element circle based on the display interval.

In the solution of this application, when the electronic device simultaneously displays the plurality of elements, the electronic device may classify the plurality of elements into different element circles. The electronic device may simultaneously display a plurality of elements included in a same element circle, and separately display different element circles, so that the electronic device can sequentially display the plurality of elements included in each element circle when simultaneously displaying the plurality of elements, that is, display the plurality of elements circle by circle, thereby increasing transition animation effects. Therefore, the electronic device is enabled to more vividly enter a rectangle-grid arrangement scenario, that is, more vividly display the plurality of elements simultaneously, thereby improving user experience.

For ease of understanding, the following describes, with reference to FIG. 10A, FIG. 10B, FIG. 10C, FIG. 10D, and FIG. 10E, a solution of this application by using an example in which the first interface of the electronic device is the home screen of the electronic device, and the plurality of elements included in the first interface are a plurality of application icons.

After the electronic device receives the unlock operation performed by the user to display the home screen of the electronic device, the electronic device may determine the application icon with the smallest area from the plurality of application icons included in the home screen and a reference point for element circle classification. The electronic device determines the plurality of element circles based on the application icon with the smallest area and the reference point, where each element circle includes at least one application icon.

For example, the electronic device determines that the home screen includes four element circles, that is, the element circle 1, the element circle 2, the element circle 3, and the element circle 4. The range of the element circle 1 is less than the range of the element circle 2 (that is, the length of the element circle 1 is less than the length of the element circle 2, and the width of the element circle 1 is less than the width of the element circle 2); the range of the element circle 2 is less than the range of the element circle 3 (that is, the length of the element circle 2 is less than the length of the element circle 3, and the width of the element circle 2 is less than the width of the element circle 3); and the range of the element circle 3 is less than the range of the element circle 4 (that is, the length of the element circle 3 is less than the length of the element circle 4, and the width of the element circle 3 is less than the width of the element circle 4). The element circle 1 may include four elements, the element circle 2 may include 12 elements, the element circle 3 may include four elements, and the element circle 4 may include eight elements.

Figure 10A:
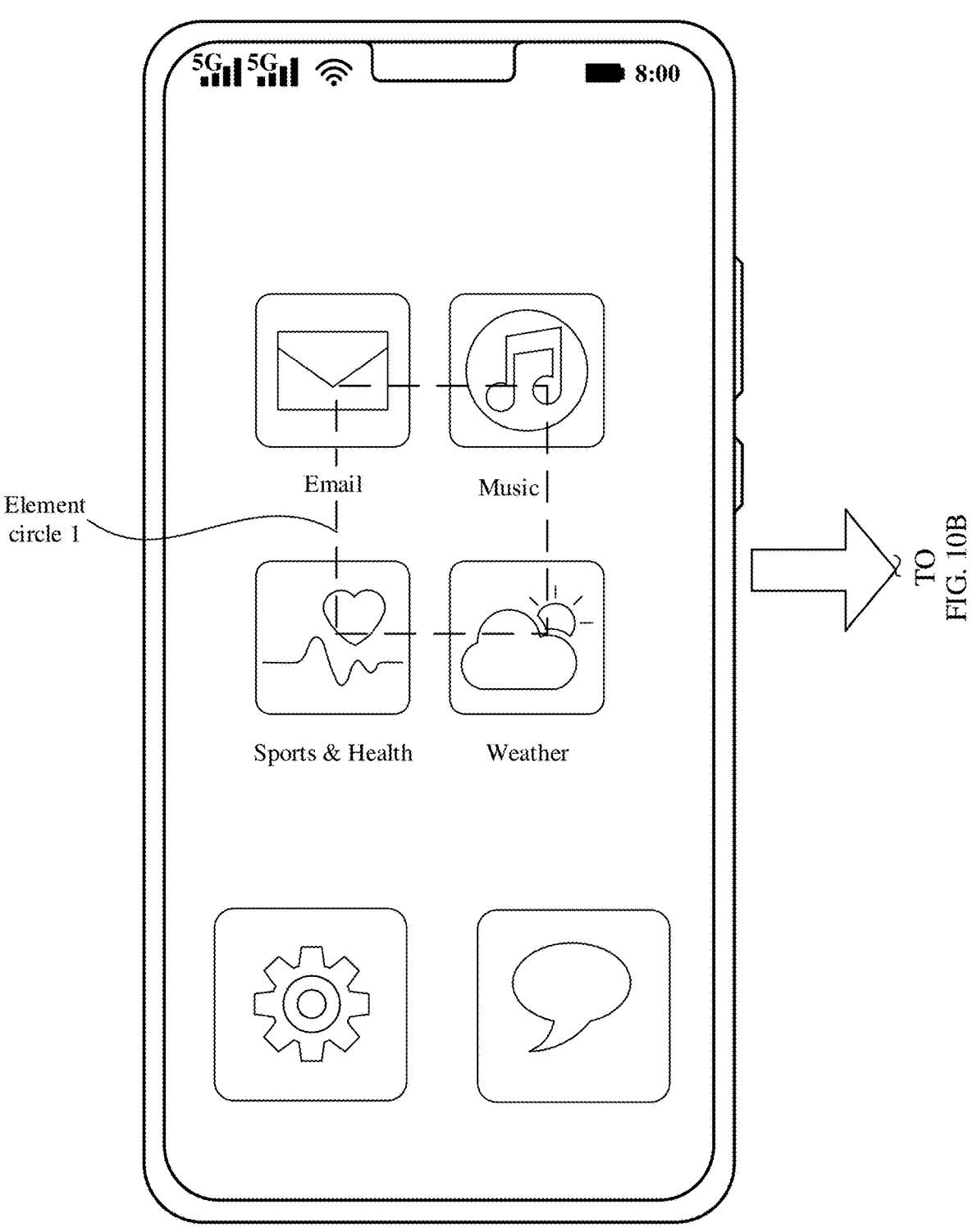
FIG. 10A, FIG. 10B, FIG. 10C, FIG. 10D, and FIG. 10E are a schematic diagram 2 of a display interface of an electronic device according to an embodiment of this application.

After the electronic device determines that the home screen includes four element circles, as shown in FIG. 10A, the electronic device may first display the four elements included in the element circle 1, that is, an icon corresponding to an Email application, an icon corresponding to a Music 1 application, an icon corresponding to a Sports & Health application, and an icon corresponding to a Weather application. When the electronic device displays the four elements (that is, the application icons) included in the element circle 1, the electronic device may scale up the four elements included in the element circle 1 by 3 times for display.

It should be noted that, as shown in FIG. 10A, when the electronic device scales up the four application icons included in the element circle 1 for display, if the interface of the electronic device may further display application icons included in the element circle 2, the interface of the electronic device may further scale up (for example, scale up by 4 times) 12 application icons included in the element circle 2 for display. When the interface of the electronic device cannot completely display the 12 scaled-up application icons included in the element circle 2, the electronic device may display parts of the 12 scaled-up application icons included in the element circle 2.

Figure 10B:
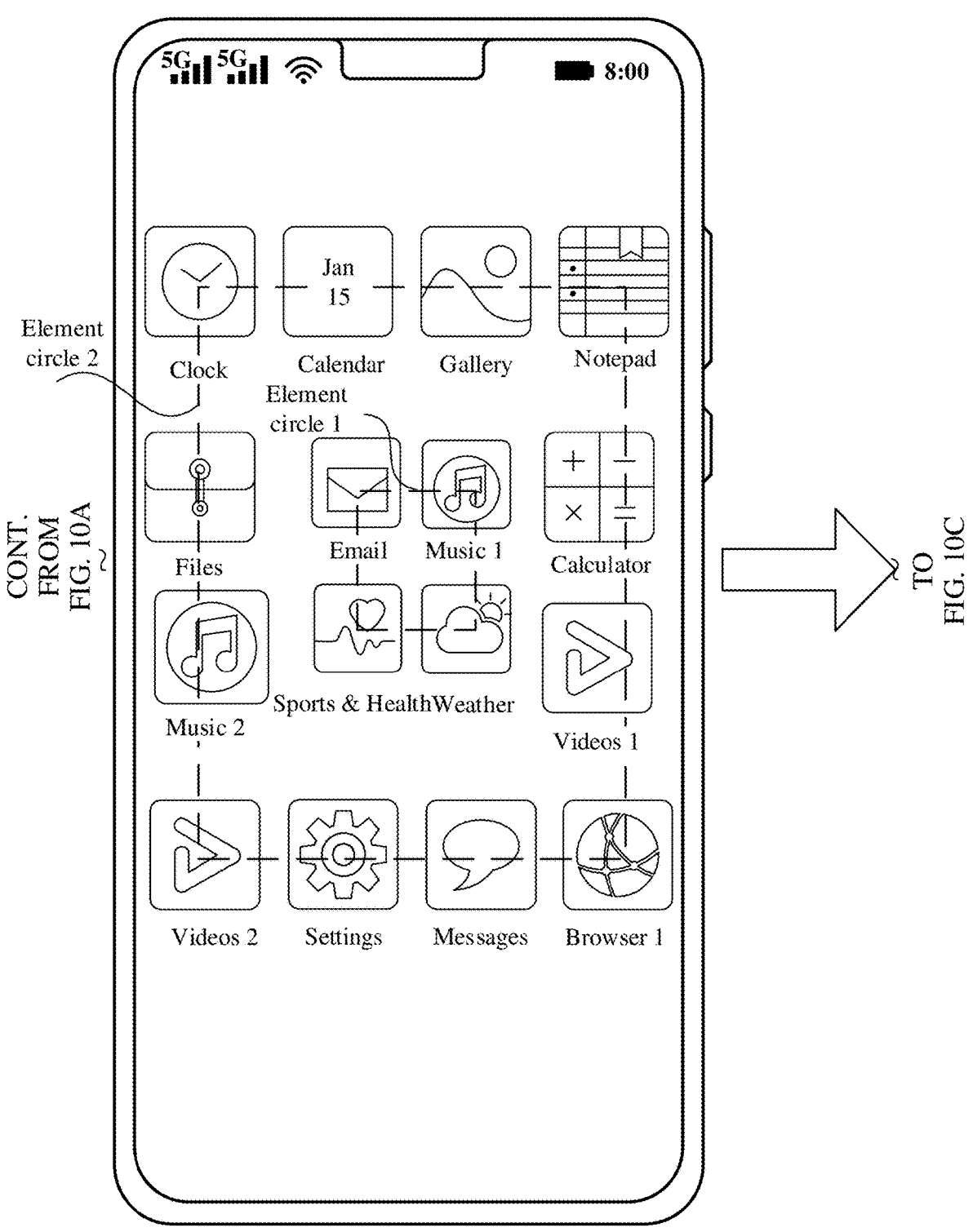

After the electronic device displays the four application icons included in the element circle 1, as shown in FIG. 10B, the electronic device may display the 12 application icons included in the element circle 2 after the display interval (for example, 50 milliseconds). When the electronic device displays the 12 application icons included in the element circle 2, the electronic device may scale up the 12 application icons included in the element circle 2 by 3 times for display. In addition, the electronic device may display the four application icons included in the element circle 1 in the normal size. Alternatively, when the electronic device scales up the 12 application icons included in the element circle 2 by 3 times, the electronic device may also scale up the four application icons included in the element circle 1 by 2 times for display.

Figure 10C:
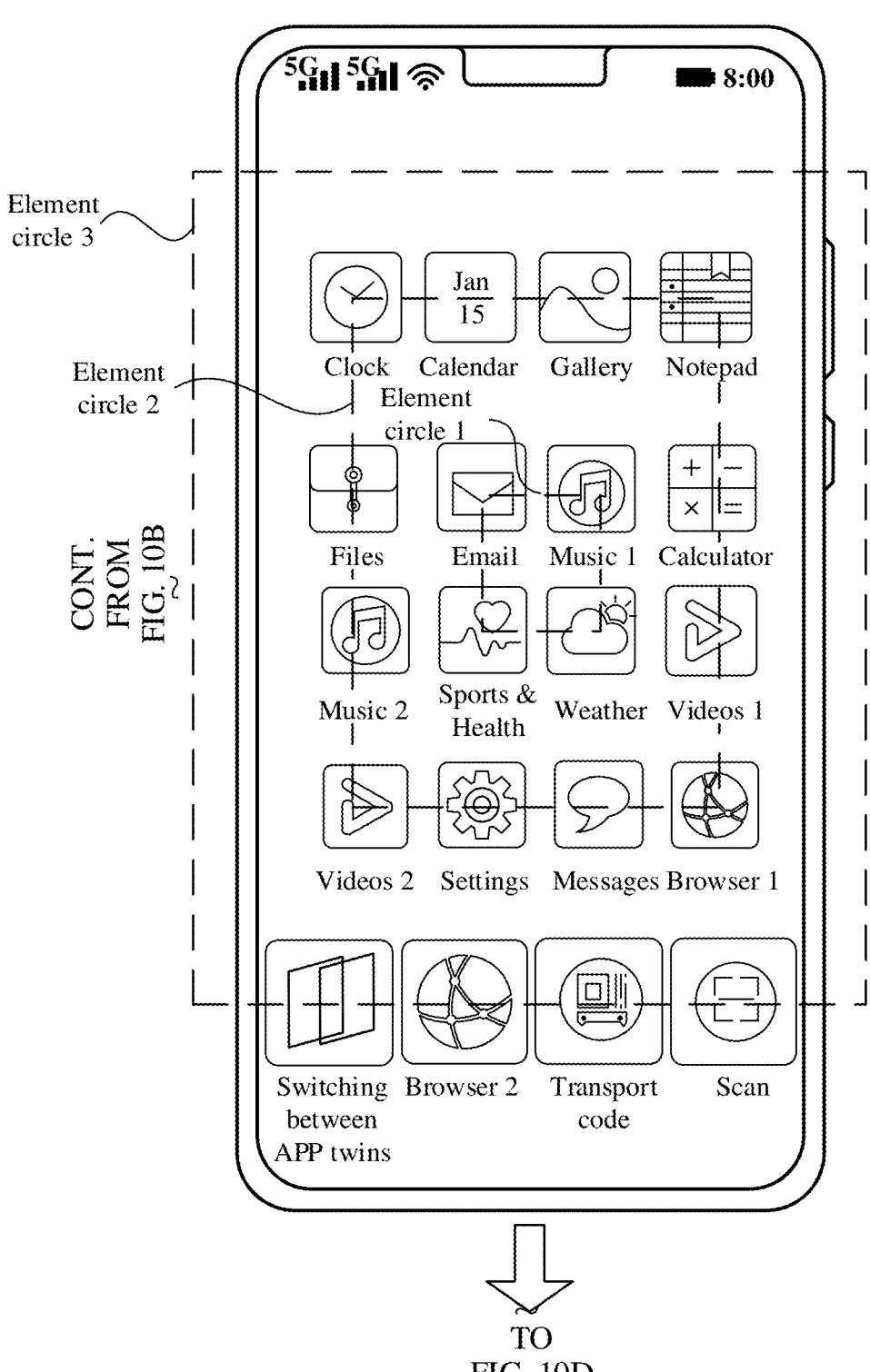

After the electronic device displays the 12 application icons included in the element circle 2, as shown in FIG. 10C, the electronic device may display four application icons included in the element circle 3 after the display interval. When the electronic device displays the four application icons included in the element circle 3, the electronic device may scale up the four elements included in the element circle 3 by 3 times for display. In addition, the electronic device may display the 12 application icons included in the element circle 2 in the normal size. Alternatively, when the electronic device scales up the four application icons included in the element circle 3 by 3 times, the electronic device may also scale up the 12 application icons included in the element circle 2 by 2 times for display, and the electronic device may also scale up the four application icons included in the element circle 1 by 1 time for display.

Figure 10D:
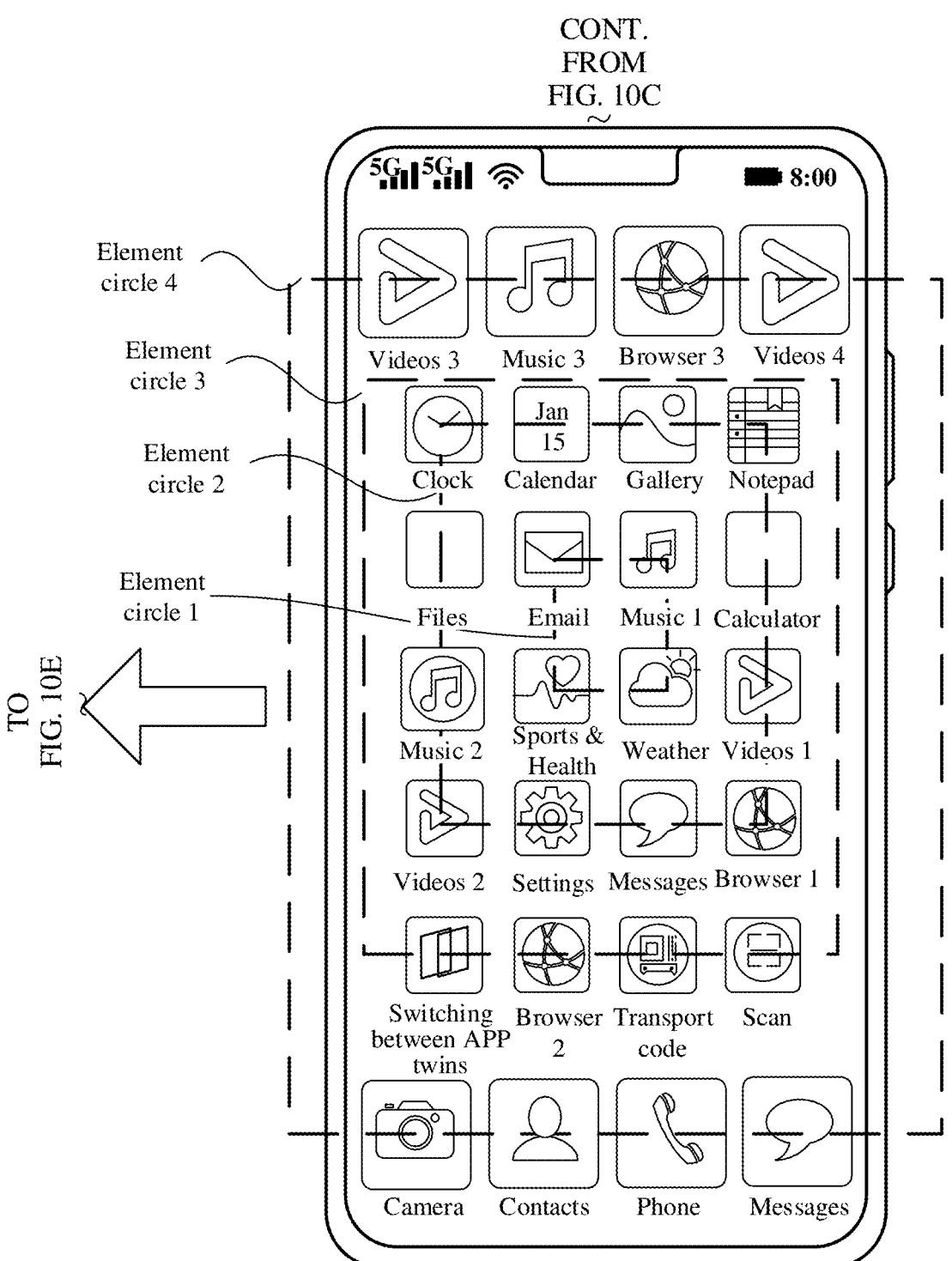

After the electronic device displays the four application icons included in the element circle 3, as shown in FIG. 10D, the electronic device may display eight application icons included in the element circle 4 after the display interval. When the electronic device displays the eight application icons included in the element circle 4, the electronic device may scale up the eight application icons included in the element circle 4 by 3 times for display. In addition, the electronic device may display the four application icons included in the element circle 3 in the normal size. Alternatively, when the electronic device scales up the eight application icons included in the element circle 4 by 3 times, the electronic device may also scale up the four application icons included in the element circle 3 by 2 times for display, and the electronic device may also scale up the 12 application icons included in the element circle 2 and the four application icons included in the element circle 1 by 1 time for display.

Figure 10E:
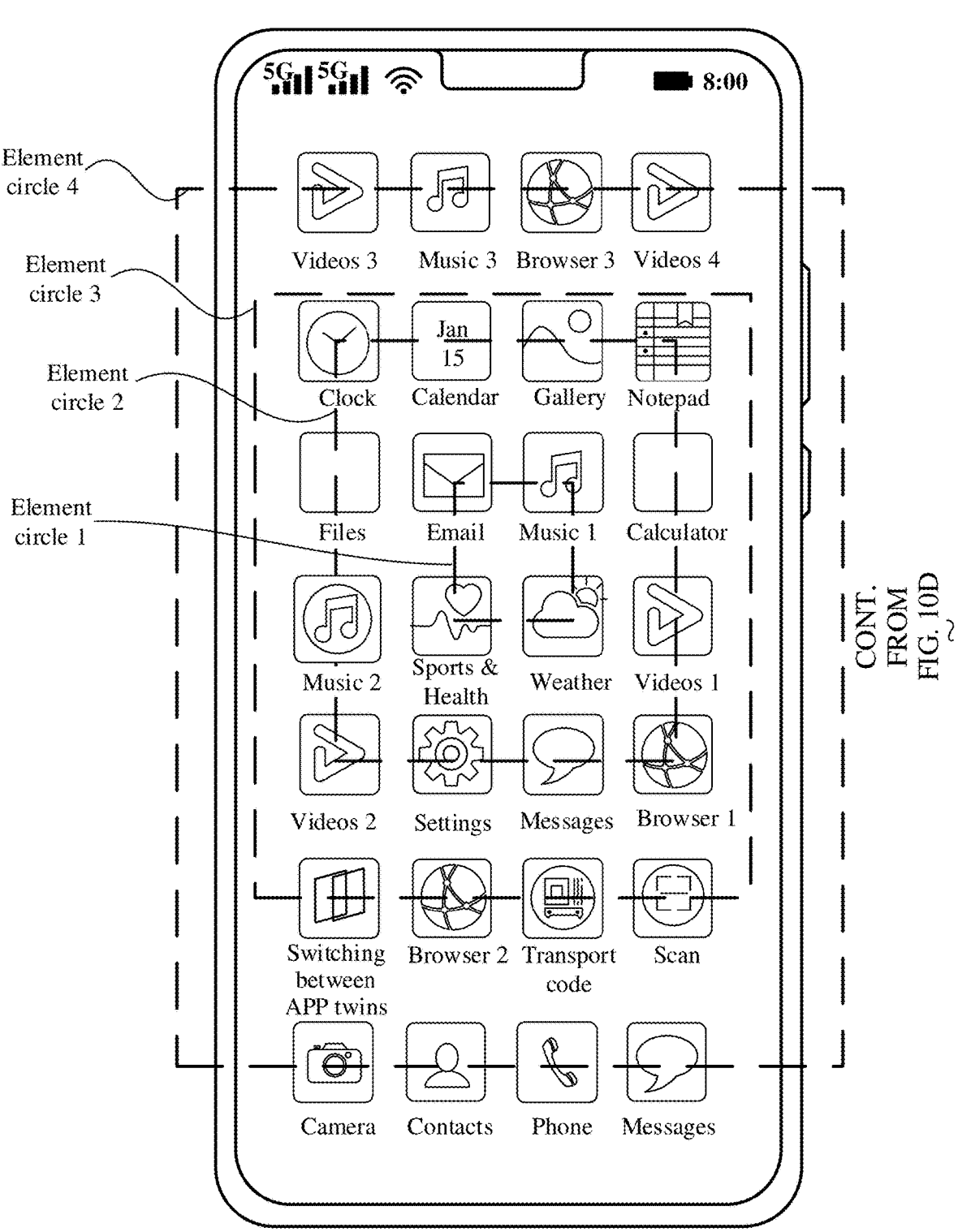

After the electronic device displays the eight application icons included in the element circle 4, as shown in FIG. 10E, the electronic device may display the application icons included in the element circle 1, the element circle 2, the element circle 3, and the element circle 4 in the normal size after the display interval.

For ease of understanding, the following describes, with reference to FIG. 11A, FIG. 11B, FIG. 11C, FIG. 11D, and FIG. 11E, a solution of this application by using an example in which the first interface of the electronic device is an interface corresponding to the Gallery application of the electronic device, and the plurality of elements included in the first interface are a plurality of images.

Figure 11A:
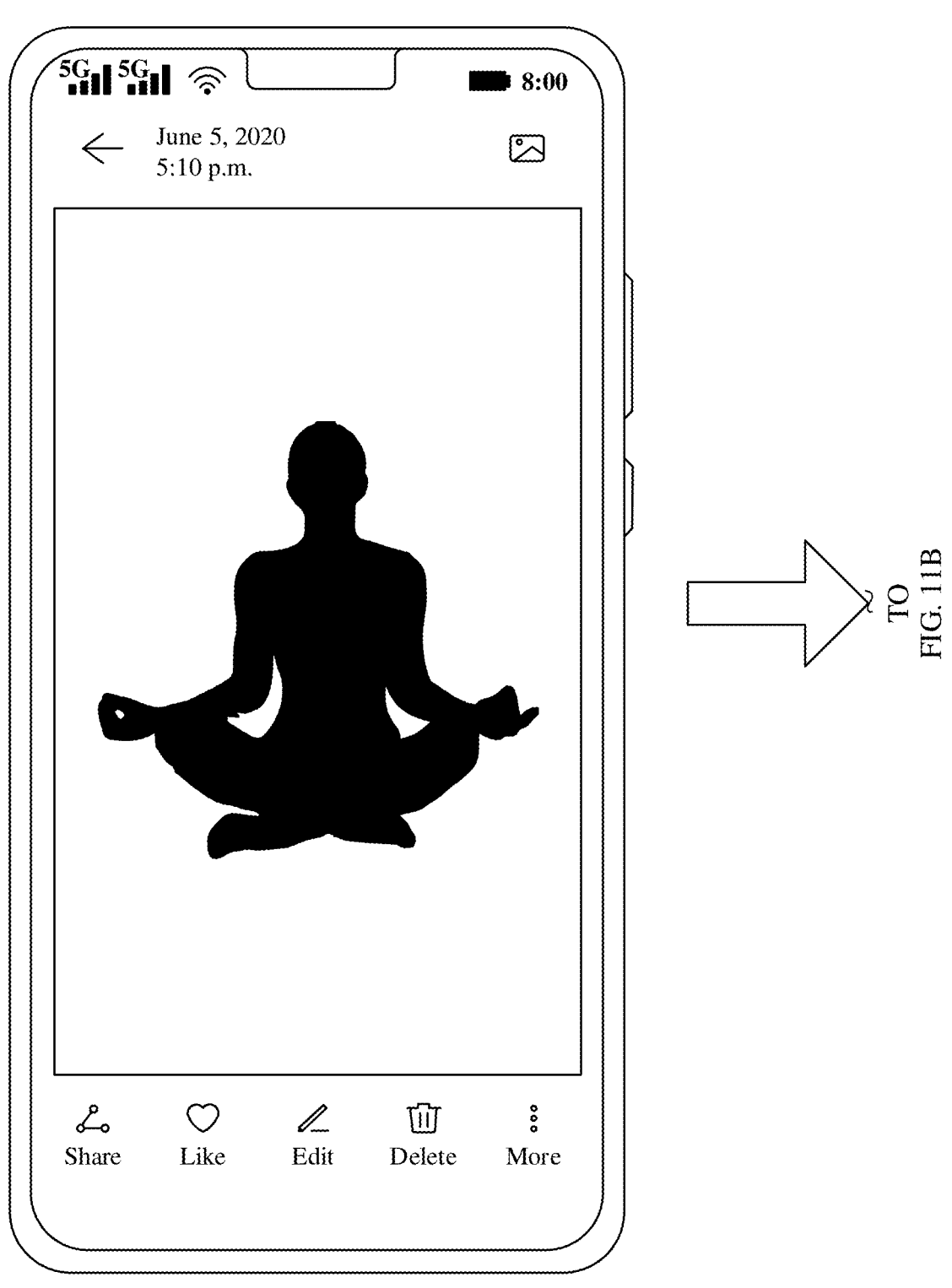
FIG. 11A, FIG. 11B, FIG. 11C, FIG. 11D, and FIG. 11E are a schematic diagram 3 of a display interface of an electronic device according to an embodiment of this application.

After the user opens the Gallery application, the user may select a specific image for viewing. After the electronic device receives an operation performed by the user to select the specific image for viewing, the electronic device may display an interface corresponding to the image. Then, the electronic device receives the operation performed by the user to return to the main interface of the Gallery application (that is, the first operation), and the electronic device may display the plurality of images included in the Gallery application. As shown in FIG. 11A, when the user select a specific image for viewing, the electronic device may receive the operation performed by the user to return to the main interface of the Gallery application.

After the electronic device receives the operation performed by the user to return to the main interface of the Gallery application, the electronic device may determine an image with a smallest area from the plurality of images included in the main interface of the Gallery application, and a reference point for element circle classification. The electronic device determines the plurality of element circles based on the image with the smallest area and the reference point, where each element circle includes at least one image.

For example, the electronic device determines that the main interface of the Gallery application includes three element circles, that is, the element circle 1, the element circle 2, and the element circle 3. The range of the element circle 1 is less than the range of the element circle 2 (that is, the length of the element circle 1 is less than the length of the element circle 2, and the width of the element circle 1 is less than the width of the element circle 2), and the range of the element circle 2 is less than the range of the element circle 3 (that is, the length of the element circle 2 is less than the length of the element circle 3, and the width of the element circle 2 is less than the width of the element circle 3). The element circle 1 may include three elements, the element circle 2 may include six elements, and the element circle 3 may include three elements.

Figure 11B:
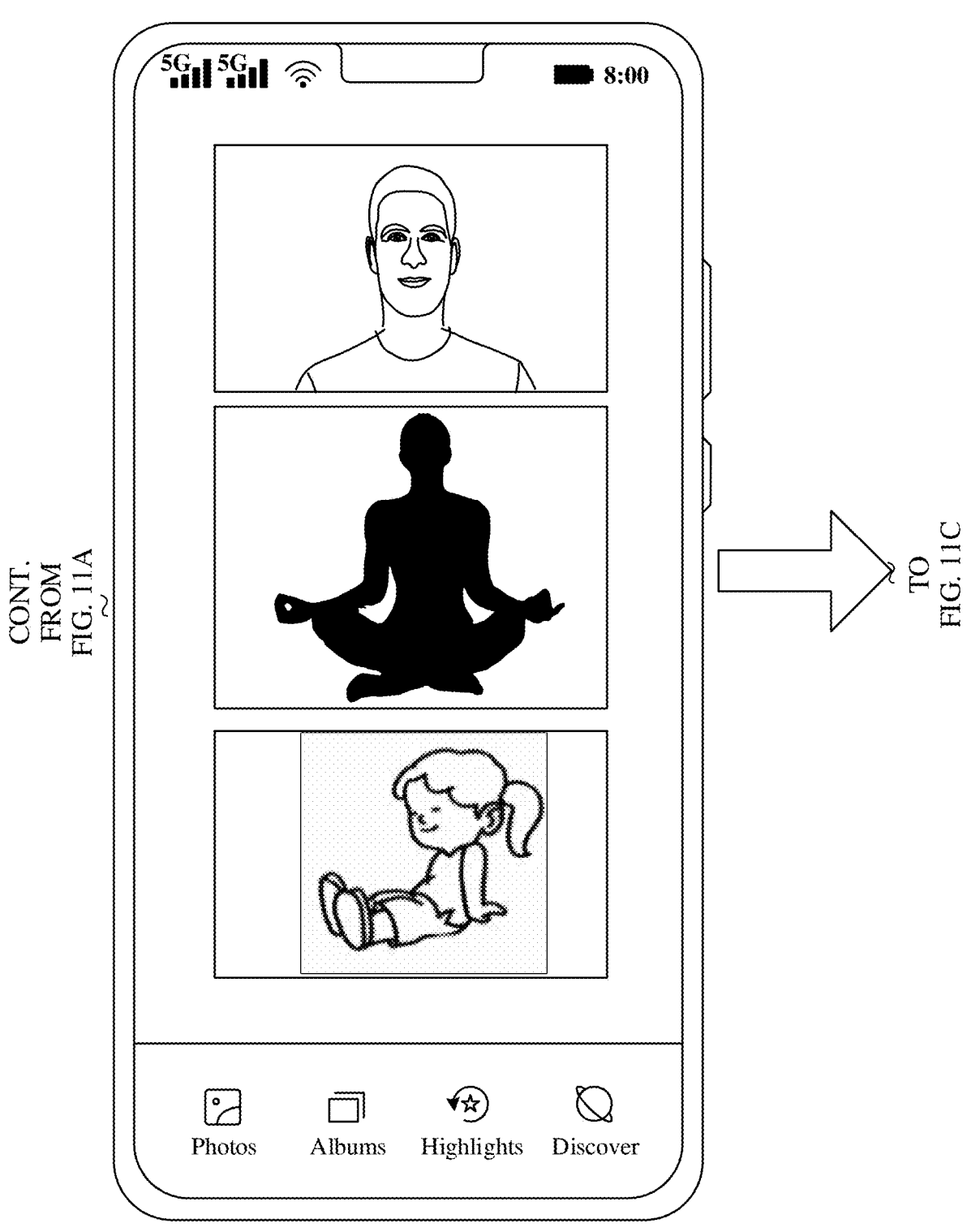

After the electronic device determines that the home screen includes three element circles, as shown in FIG. 11B, the electronic device may first display three images included in the element circle 1. When the electronic device displays the three images included in the element circle 1, the electronic device may scale up the three images included in the element circle 1 by 6 times, that is, a size of a smallest image is scaled up by 6 times for display relative to displaying the main interface of the Gallery application by the electronic device.

Figures 11B, 11C:
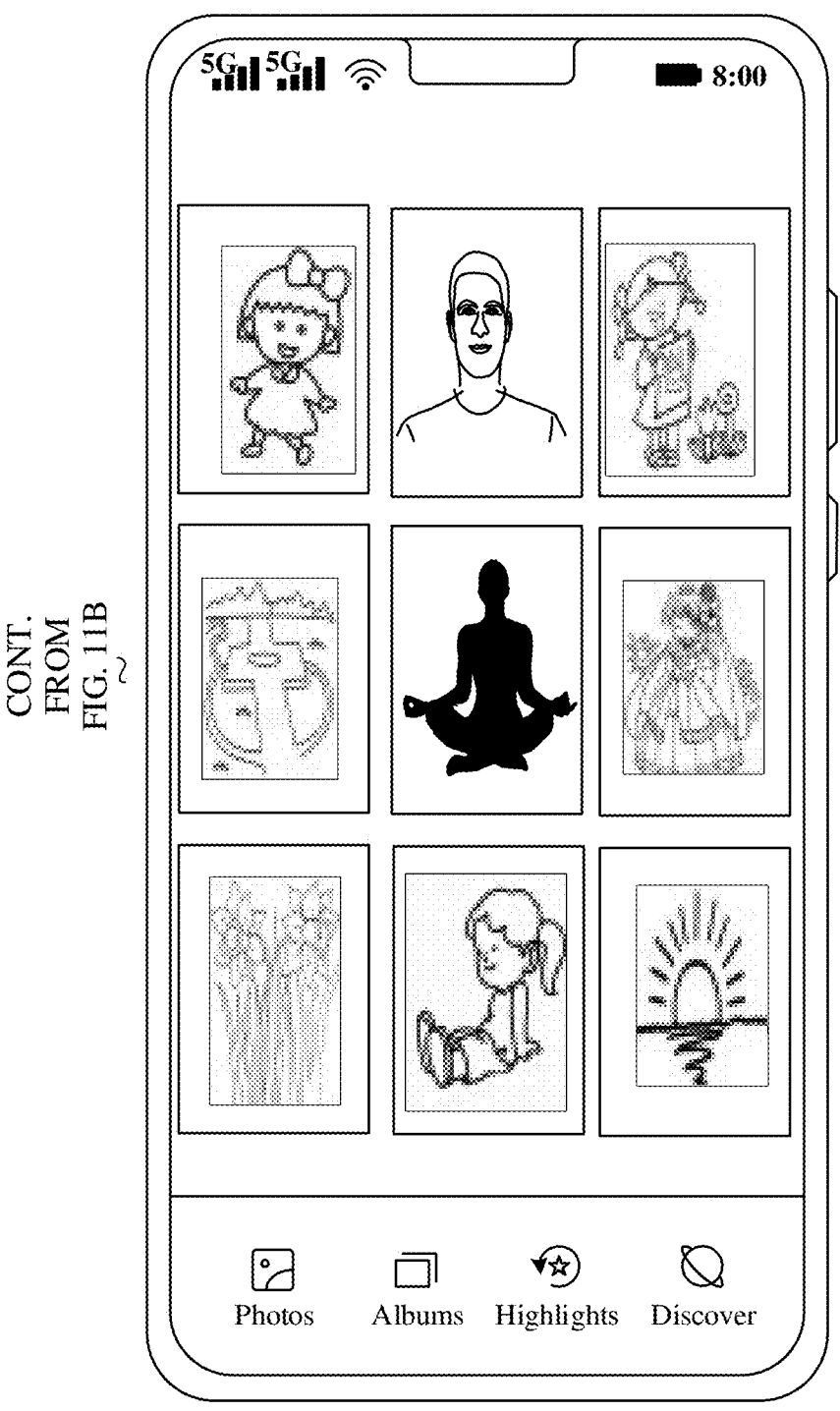

After the electronic device displays the three images included in the element circle 1, as shown in FIG. 11C, the electronic device may display six images included in the element circle 2 after the display interval (for example, 50 milliseconds). When the electronic device displays the six images included in the element circle 2, the electronic device may scale up the six images included in the element circle 2 by 3 times for display. In addition, the electronic device may scale up the three images included in the element circle 1 by 3 times for display.

Figures 11D, 11E:
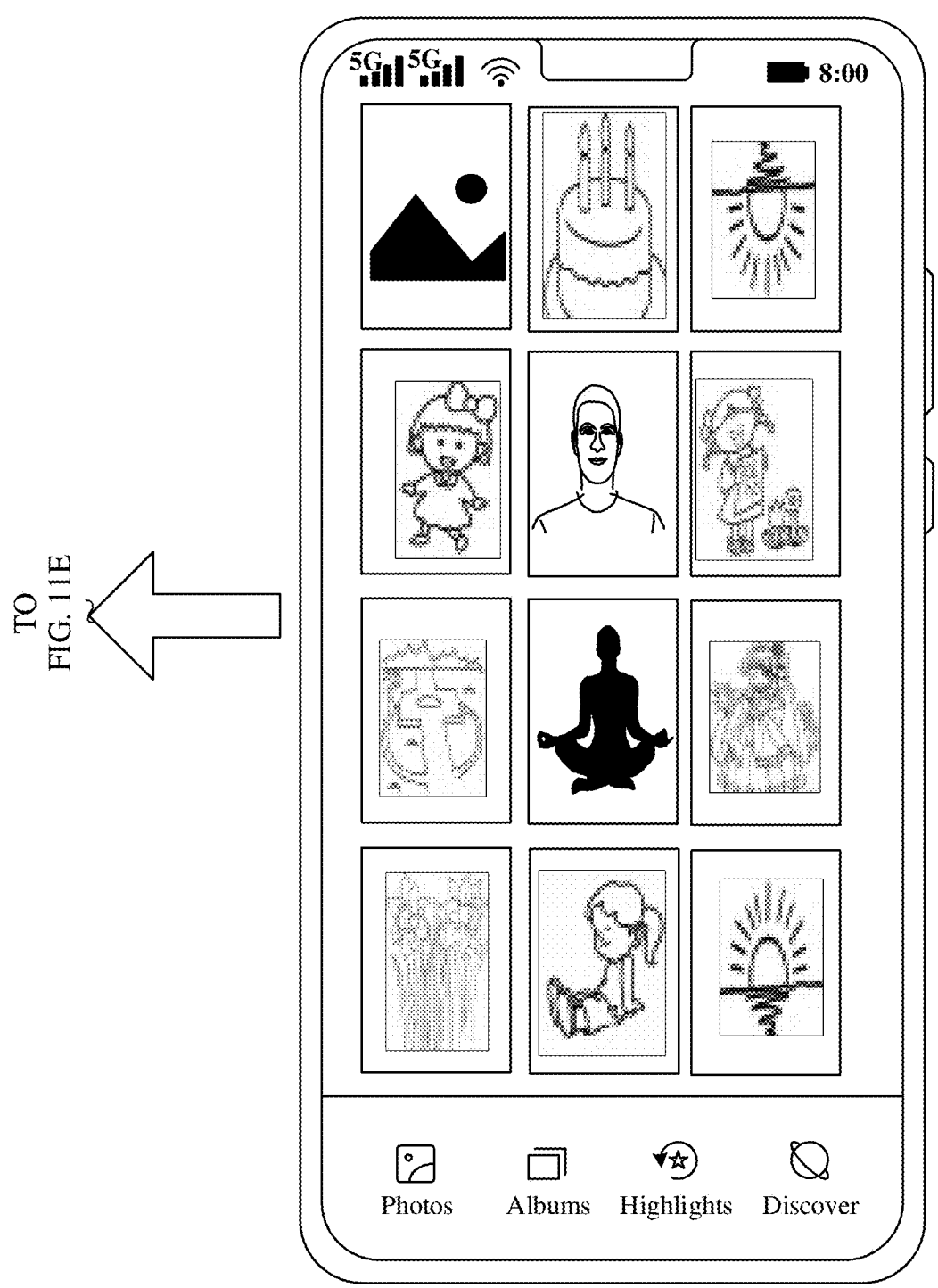
Figure 11E:
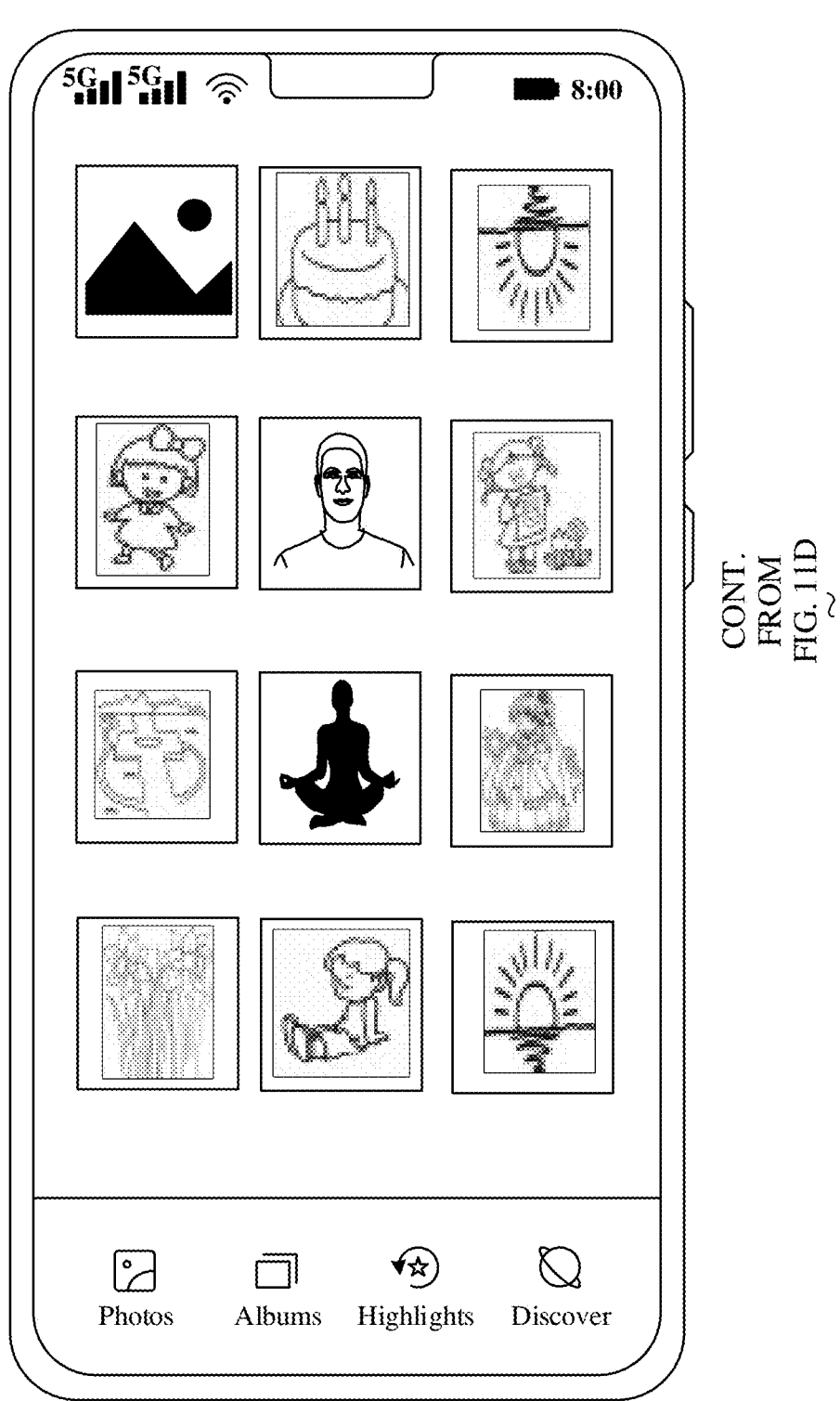

After the electronic device displays the six images included in the element circle 2, as shown in FIG. 11D, the electronic device may display three images included in the element circle 3 after the display interval. When the electronic device displays the three images included in the element circle 3, the electronic device may scale up the three images included in the element circle 3 by 2 times for display. In addition, the electronic device may scale up the six images included in the element circle 2 and the three images included in the element circle 1 by two times for display.

After the electronic device displays the three images included in the element circle 3, as shown in FIG. 11E, the electronic device may display the images included in the element circle 1, the element circle 2, the element circle 3, and the element circle 4 in the normal size after the display interval, that is, the size of the smallest image is scaled up by 1 time for display relative to displaying the main interface of the Gallery application by the electronic device.

For ease of understanding, the following describes, with reference to FIG. 12A, FIG. 12B, FIG. 12C, FIG. 12D, and FIG. 12E, a solution of this application by using an example in which the first interface of the electronic device is an interface corresponding to the Notepad application of the electronic device, and the plurality of elements included in the first interface are a plurality of notes.

Figure 12A:
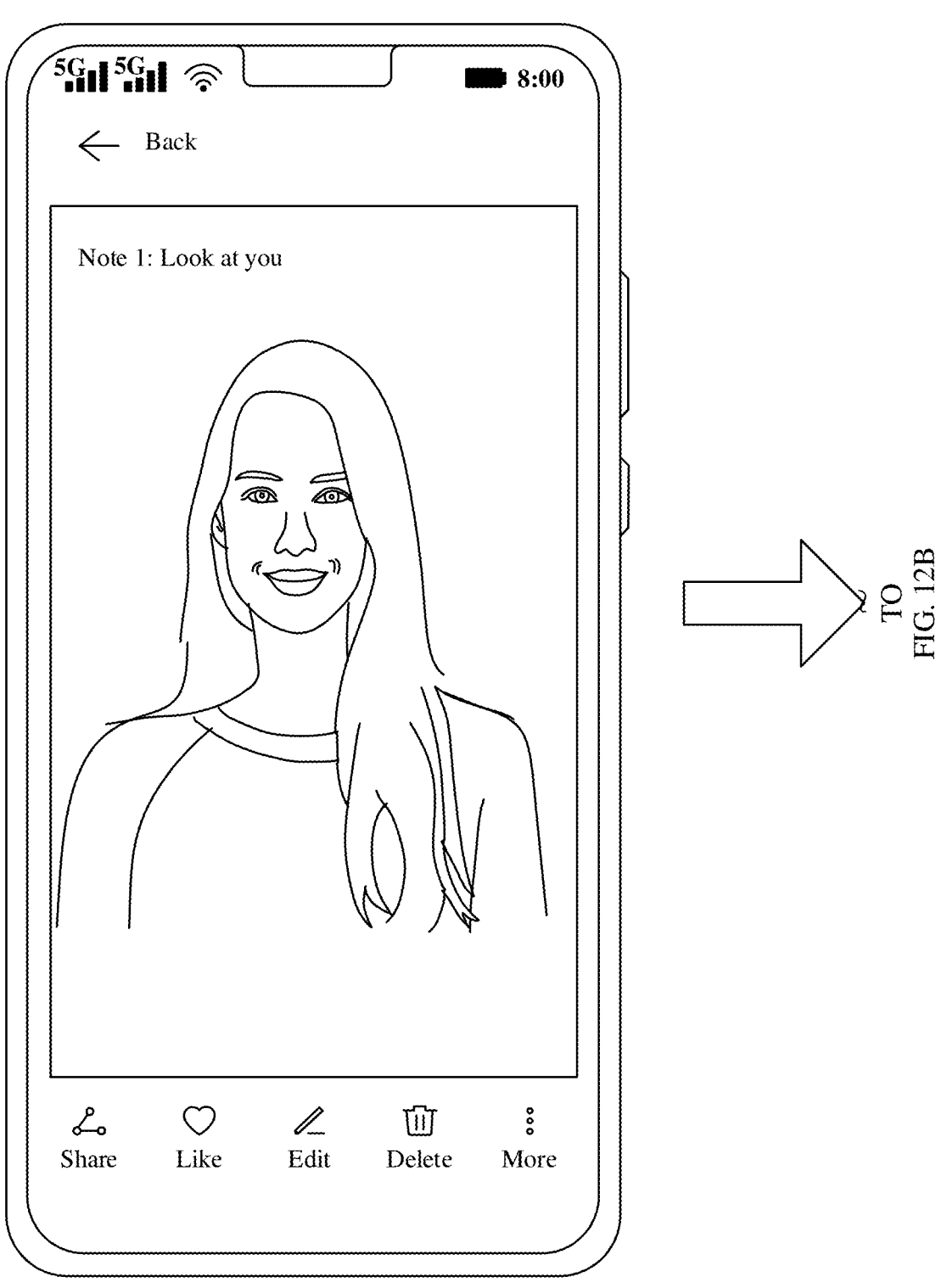
FIG. 12A, FIG. 12B, FIG. 12C, FIG. 12D, and FIG. 12E are a schematic diagram 4 of a display interface of an electronic device according to an embodiment of this application.

After the user opens the Notepad application, the user may select a specific note for viewing. After the electronic device receives an operation performed by the user to select the specific note for viewing, the electronic device may display an interface corresponding to the note. Then, the electronic device receives the operation performed by the user to return to the main interface of the Notepad application (that is, the first operation), and the electronic device may display the plurality of notes included in the Notepad application. As shown in FIG. 12A, when the user select a specific note (for example, a note 1) for viewing, the electronic device may receive the operation performed by the user to return to the main interface of the Notepad application.

After the electronic device receives the operation performed by the user to return to the main interface of the Notepad application, the electronic device may determine a note with a smallest area from the plurality of notes included in the main interface of the Notepad application, and a reference point for element circle classification. The electronic device determines the plurality of element circles based on the note with the smallest area and the reference point, where each element circle includes at least one note.

For example, the electronic device determines that the main interface of the Notepad application includes three element circles, that is, the element circle 1, the element circle 2, and the element circle 3. The range of the element circle 1 is less than the range of the element circle 2 (that is, the length of the element circle 1 is less than the length of the element circle 2, and the width of the element circle 1 is less than the width of the element circle 2), and the range of the element circle 2 is less than the range of the element circle 3 (that is, the length of the element circle 2 is less than the length of the element circle 3, and the width of the element circle 2 is less than the width of the element circle 3). The element circle 1 may include six elements (that is, a note 1, a note 2, a note 3, a note 4, a note 5, and a note 6), the element circle 2 may include two elements (that is, a note 7 and a note 8), and the element circle 3 may include two elements (that is, a note 9 and a note 10).

Figure 12B:
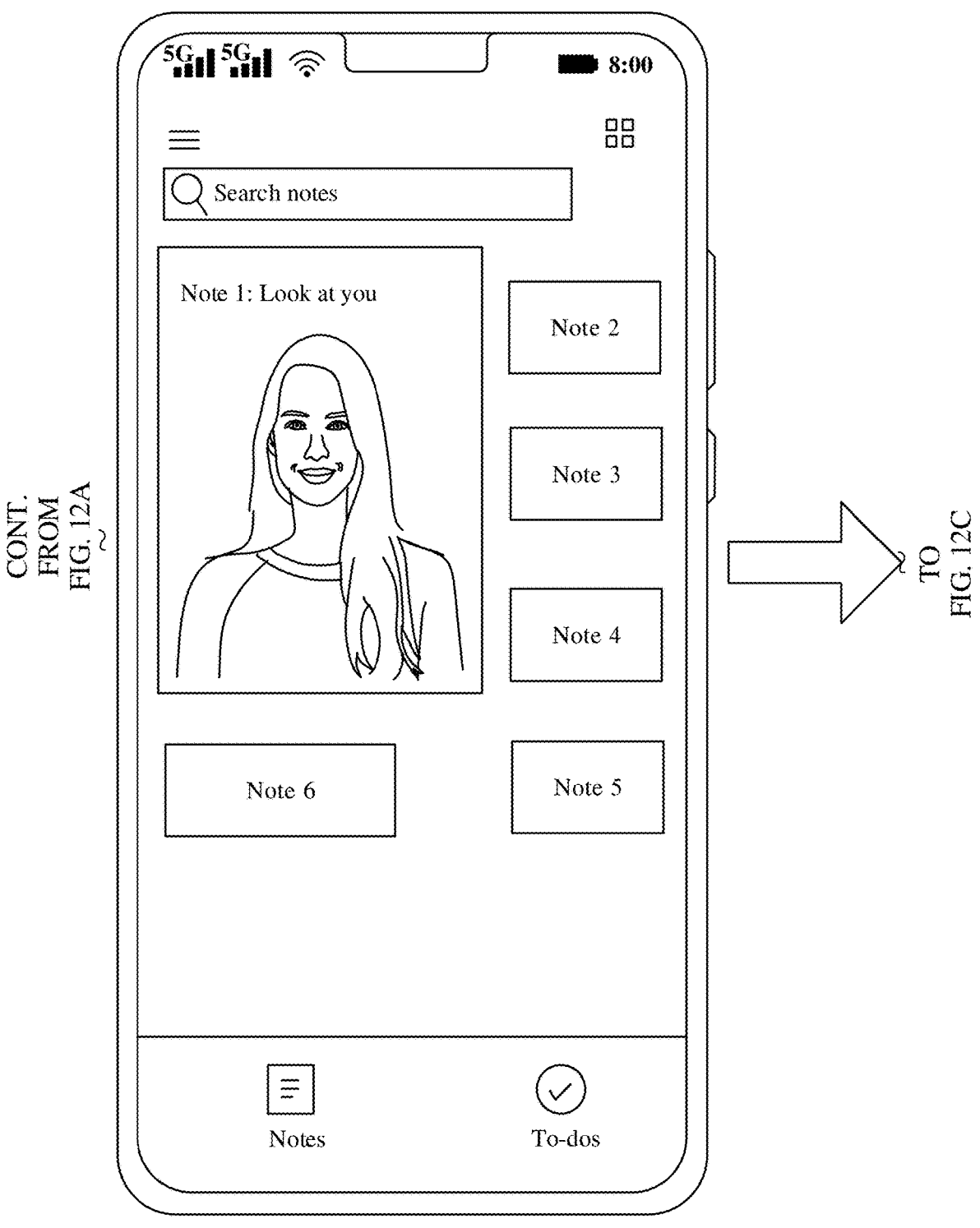

After the electronic device determines that the home screen includes three element circles, as shown in FIG. 12B, the electronic device may first display the six notes included in the element circle 1. When the electronic device displays the six notes included in the element circle 1, the electronic device may scale up the six notes included in the element circle 1 by 3 times, that is, a size of a smallest note is scaled up by 3 times for display relative to displaying the main interface of the Notepad application by the electronic device.

Figures 12B, 12C:
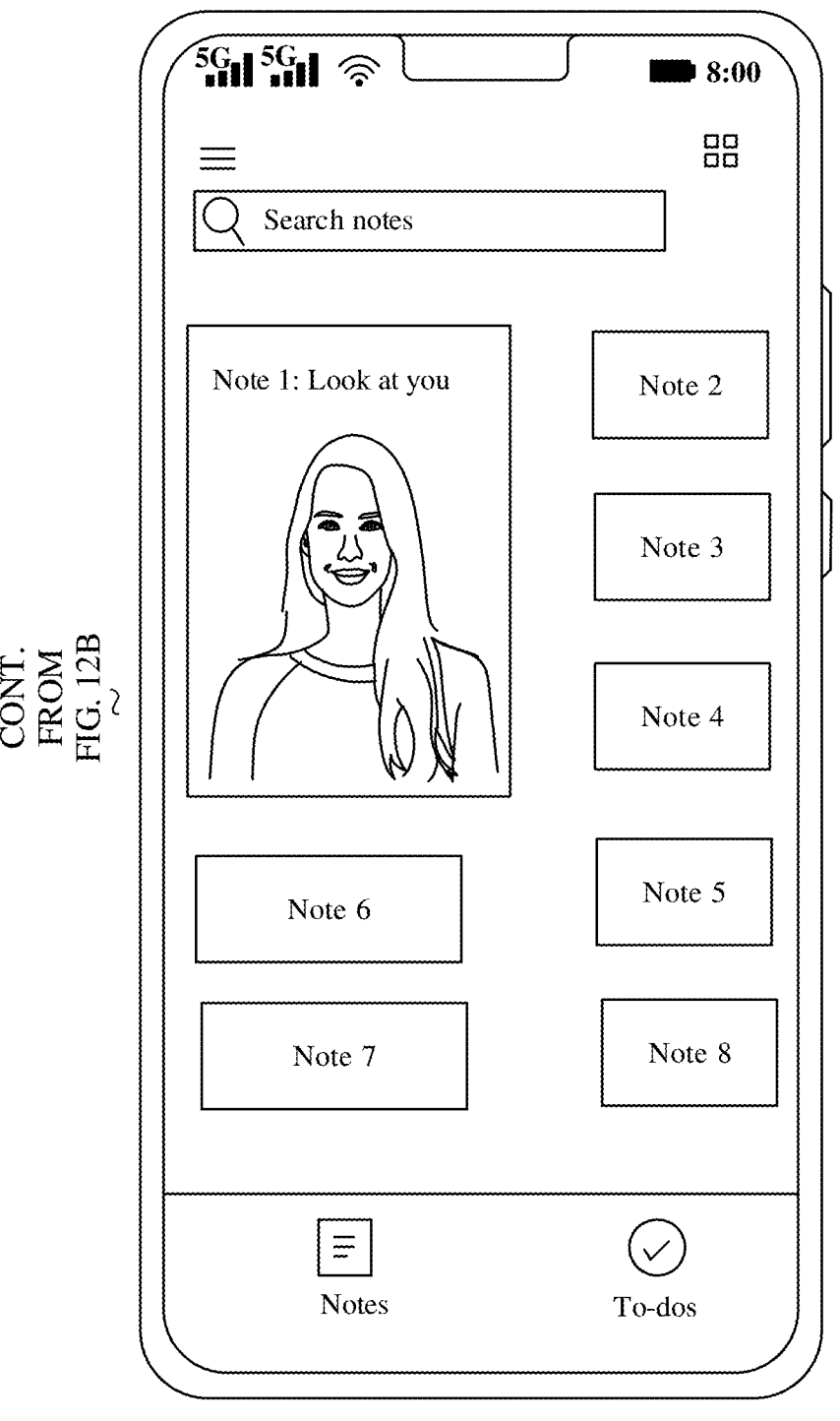

After the electronic device displays the six notes included in the element circle 1, as shown in FIG. 12C, the electronic device may display the two notes included in the element circle 2 after the display interval (for example, 50 milliseconds). When the electronic device displays the six notes included in the element circle 1, the electronic device may scale up the two notes included in the element circle 2 by 3 times for display. In addition, the electronic device may scale up the six notes included in the element circle 1 by 3 times for display.

Figure 12D:
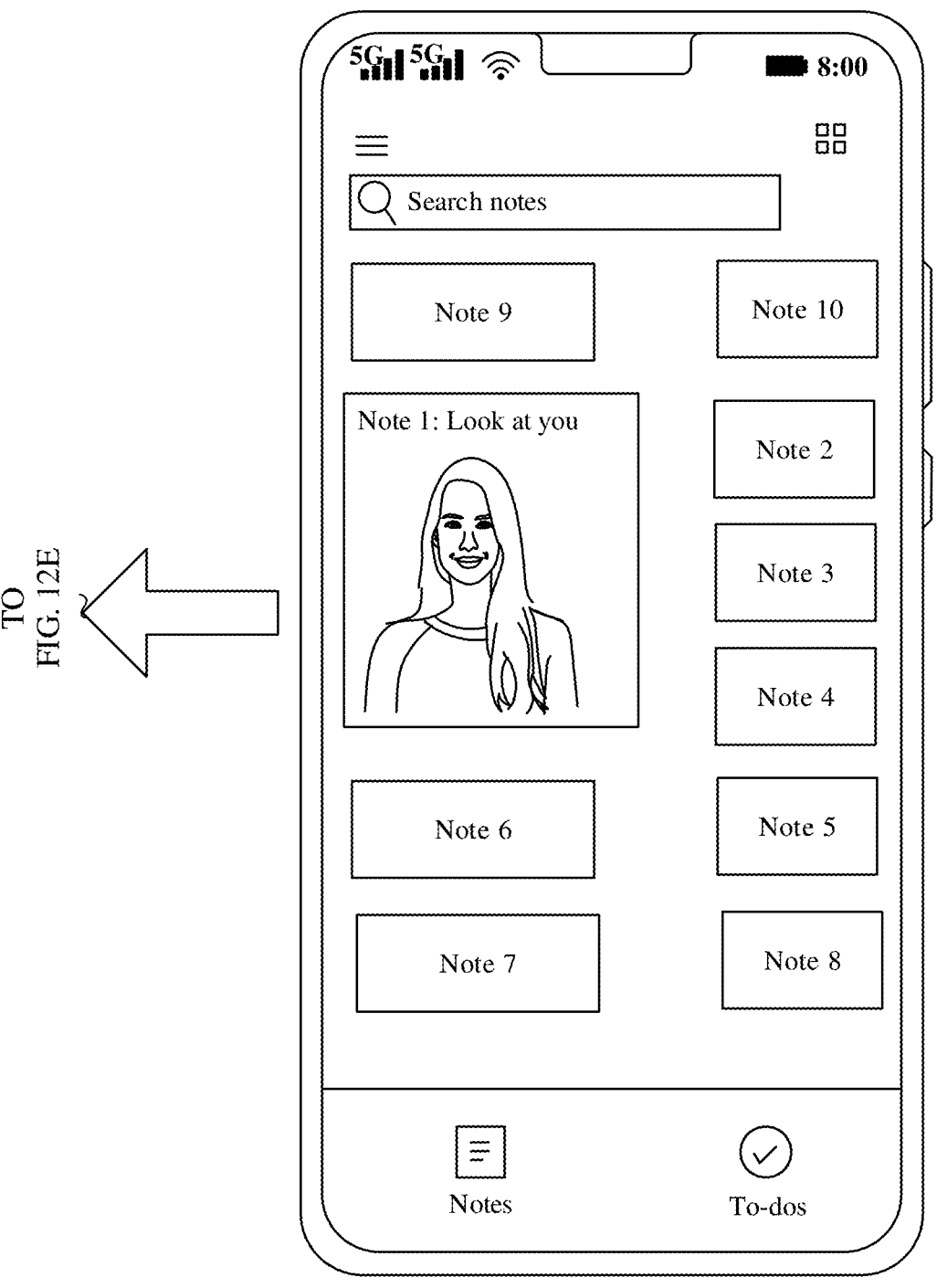

After the electronic device displays the two notes included in the element circle 2, as shown in FIG. 12D, the electronic device may display the two notes included in the element circle 3 after the display interval. When the electronic device displays the two notes included in the element circle 3, the electronic device may scale up the two notes included in the element circle 3 by 2 times for display. In addition, the electronic device may scale up the two notes included in the element circle 2 and the six notes included in the element circle 1 by two times for display.

Figure 12E:
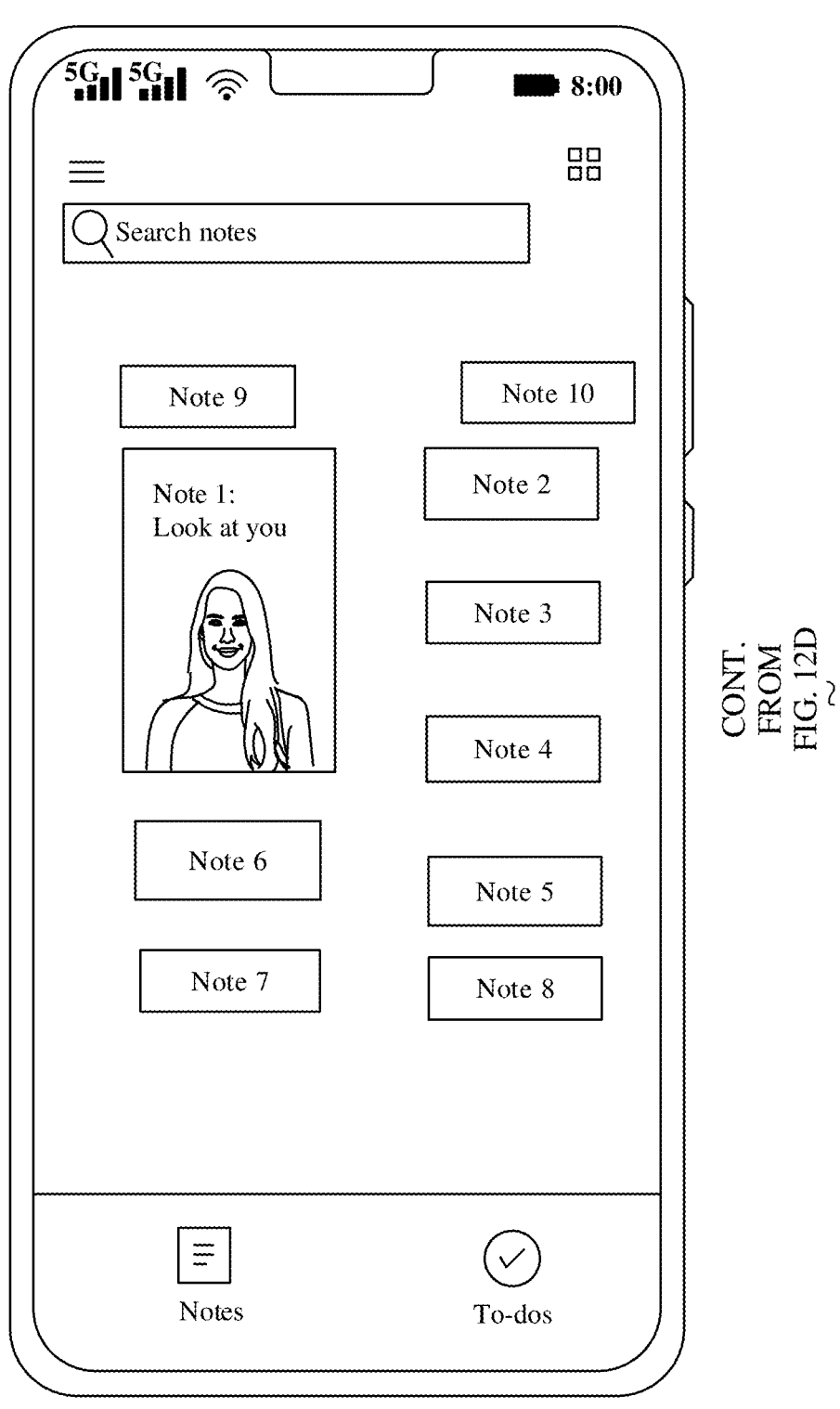

After the electronic device displays the two notes included in the element circle 3, as shown in FIG. 12E, the electronic device may display the notes included in the element circle 1, the element circle 2, and the element circle 3 in the normal size after the display interval, that is, the size of the smallest note is scaled up by 1 time for display relative to displaying the main interface of the Notepad application by the electronic device.

An embodiment of this application further provides a display apparatus corresponding to the method in the foregoing embodiment. The display apparatus may be applied to an electronic device, and is configured to implement the method in the foregoing embodiment. Functions of the display apparatus may be implemented by hardware or may be implemented by corresponding software executed by hardware. The hardware or software includes one or more modules corresponding to the foregoing functions.

Figure 13:
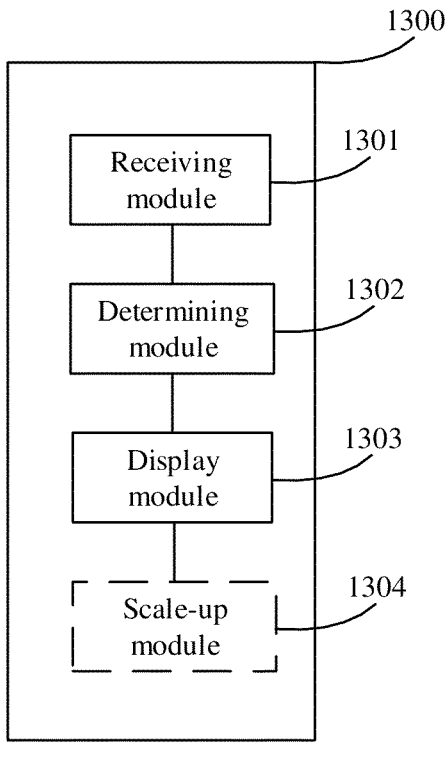
FIG. 13 is a schematic diagram of a structure of a display apparatus according to an embodiment of this application.

For example, FIG. 13 is a schematic diagram of a structure of a display apparatus 1300. As shown in FIG. 13, the display apparatus 1300 may include a receiving module 1301, a determining module 1302, a display module 1303, and the like.

The receiving module 1301 may be configured to receive a first operation performed by a user to trigger the electronic device to display a first interface, where the first interface is an interface corresponding to a first application, and the first interface includes a plurality of elements.

The determining module 1302 may be configured to: in response to the first operation, determine a reference element from the plurality of elements and a reference point, where the reference element is an element with a smallest area in the plurality of elements, and the reference point is a center of an element circle established by the electronic device.

The determining module 1302 may be further configured to determine a plurality of element circles based on the reference element and the reference point, where each element circle includes at least one element.

The display module 1303 may be configured to separately display the plurality of element circles based on a first interval time.

In a possible implementation, the display module 1303 may be further configured to display a first element.

The display module 1303 may be further configured to display a second element after the first interval time.

In a possible implementation, the display apparatus 1300 may further include a scale-up module 1304.

The scale-up module 1304 may be configured to scale up the first element based on a first scale-up factor.

The display module 1303 may be configured to display the first element obtained after scaling up.

The scale-up module 1304 may be further configured to scale up the second element based on the first scale-up factor, and scale up the first element based on a second scale-up factor. The display module 1303 may be further configured to simultaneously display the second element scaled up based on the first scale-up factor and the first element scaled up based on the second scale-up factor, where the first scale-up factor is greater than the second scale-up factor.

In a possible implementation, the scale-up module 1304 may be further configured to scale-up the second element based on the second scale-up factor after the first interval time.

The display module 1303 may be further configured to simultaneously display the second element scaled up based on the second scale-up factor and the first element scaled up based on the second scale-up factor.

In a possible implementation, a range of the first element circle is less than a range of the second element circle.

In a possible implementation, the determining module 1302 may be further configured to determine a length and a width of the reference element.

The determining module 1302 may be further configured to determine the first element circle and the second element circle based on the length and the width of the reference element by using the reference point as a center, where a length of the first element circle is N times the length of the reference element, a width of the first element circle is N times the width of the reference element, N is an integer greater than or equal to 1, a length of the second element circle is M times the length of the reference element, a width of the second element circle is M times the width of the reference element, and M is an integer greater than N.

In a possible implementation, the first element is an element in the range of the first element circle, and the second element is an element in the range of the second element circle; and when a third element is both an element in the range of the first element circle and an element in the range of the second element circle, the third element is the first element, and the third element is any element included in the first interface.

In a possible implementation, the elements included in the first interface are application icons, images, or notes.

It should be understood that division of units or modules (referred to as units in the following) in the apparatus is merely logical function division. In an actual implementation, all or some of the units or modules may be integrated into one physical entity, or may be physically separated. In addition, the units in the apparatus may be all implemented in a form of software invoked by a processing element or may be all implemented in a form of hardware, or some units may be implemented in a form of software invoked by a processing element and some units are implemented in a form of hardware.

For example, the units may be separately disposed processing elements, or may be integrated into a specific chip in the apparatus for implementation. In addition, the units may alternatively be stored in a memory in a form of a program, and invoked by a specific processing element of the apparatus to implement functions of the units. In addition, all or some of these units may be integrated together, or may be implemented independently. The processing element described herein may also be referred to as a processor, and may be an integrated circuit that has a signal processing capability. In an implementation process, the steps in the foregoing method or the foregoing units may be implemented by using a hardware integrated logic circuit in a processor element, or may be implemented by software invoked by the processing element.

In one example, the units in the foregoing apparatus may be one or more integrated circuits configured to implement the foregoing method, for example, one or more ASICs, one or more DSPs, one or more FPGAs, or a combination of at least two of these integrated circuit forms.

For another example, when the units in the apparatus may be implemented by scheduling a program by using the processing element, the processing element may be a general-purpose processor, for example, a CPU or another processor that can invoke the program. For another example, these units may be integrated together and implemented in a form of a system on chip SOC.

In an implementation, the units that are in the foregoing apparatus and that implement corresponding steps in the foregoing method may be implemented in a form of scheduling a program by using the processing element. For example, the apparatus may include a processing element and a storage element, and the processing element invokes a program stored in the storage element to perform the method described in the foregoing method embodiment. The storage element may be a storage element that is on a same chip as the processing element, that is, an on-chip storage element.

In another implementation, the program used to perform the foregoing method may be on a storage element that is located on a different chip from the processing element, namely, an off-chip storage element. In this case, the processing element invokes or loads the program from the off-chip storage element onto the on-chip storage element, to invoke and perform the method described in the foregoing method embodiment.

For example, an embodiment of this application may further provide an apparatus, for example, an electronic device. The electronic device may include a processor and a memory configured to store instructions executable by the processor. The processor is configured to enable, when executing the instructions, the electronic device to implement the display method described in the foregoing embodiment. The memory may be located inside the electronic device or may be located outside the electronic device. In addition, there are one or more processors.

In still another implementation, the units that are in the apparatus and that implement the steps in the foregoing method may be configured as one or more processing elements, and these processing elements may be disposed on the corresponding electronic device described above. The processing elements herein may be integrated circuits, for example, one or more ASICs, one or more DSPs, one or more FPGAs, or a combination of these types of integrated circuits. These integrated circuits may be integrated together to form a chip.

For example, an embodiment of this application further provides a chip, and the chip may be applied to the foregoing electronic device. The chip includes one or more interface circuits and one or more processors. The interface circuit and the processor are interconnected by using a line. The processor receives computer instructions from the memory of the electronic device through the interface circuit and executes the computer instructions, to implement the method described in the foregoing method embodiment.

An embodiment of this application further provides a computer-readable storage medium, and the computer-readable storage medium stores computer program instructions. When the computer program instructions are executed by an electronic device, the electronic device is enabled to implement the foregoing display method.

An embodiment of this application further provides a computer program product, including computer instructions that are run in the foregoing electronic device. When the computer instructions are run in the electronic device, the electronic device is enabled to implement the foregoing display method. Through the descriptions of the foregoing implementations, a person skilled in the art can clearly understand that for the purpose of convenient and brief description, only division of the foregoing functional modules is used as an example for description. In actual application, the functions may be allocated to and completed by different functional modules as required. In other words, an internal structure of the apparatus is divided into different functional modules, to complete all or some of the functions described above.

In the several embodiments provided in this application, it should be understood that the disclosed apparatus and method may be implemented in other manners. For example, the foregoing apparatus embodiment is merely an example. For example, division of the modules or the units is merely logical function division and may be another division manner in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separated, and parts displayed as units may be one or more physical units, that is, may be located in one place, or may be distributed in a plurality of different places. Some or all of the units may be selected based on actual requirements to achieve the objectives of the solutions in embodiments.

In addition, the functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product, for example, a program. The software product is stored in a program product, for example, a computer-readable storage medium, including several instructions for instructing a device (which may be a single-chip microcomputer, a chip, or the like) or a processor (processor) to perform all or some of the steps of the method in embodiments of this application. The storage medium includes any medium that can store program code, for example, a USB flash drive, a removable hard disk, a ROM, a RAM, a magnetic disk, or an optical disc.

For example, an embodiment of this application may further provide a computer-readable storage medium, and the computer-readable storage medium stores computer program instructions. When the computer program instructions are executed by an electronic device, the electronic device is enabled to implement the display method described in the foregoing method embodiment.

The foregoing descriptions are merely specific implementations of this application, but are not intended to limit the protection scope of this application. Any change or replacement made within the technical scope disclosed in this application shall fall within the protection scope of this application. Therefore, the protection scope of this application shall be subject to the protection scope of the claims.

The invention claimed is:

1. A display method, applied to an electronic device, wherein the electronic device comprises a first application, and the method comprises:

receiving, by the electronic device, a first operation performed by a user to trigger the electronic device to display a first interface, wherein the first interface is an interface corresponding to the first application, and the first interface comprises a plurality of elements;

in response to the first operation, determining, by the electronic device, a reference element from the plurality of elements and a reference point, wherein the reference element is an element with a smallest area in the plurality of elements, and the reference point is a center of an element circle established by the electronic device;

determining, by the electronic device, a plurality of element circles based on the reference element and the reference point, wherein each element circle comprises at least one element; and separately displaying, by the electronic device, the plurality of element circles based on a first interval time until the first interface is displayed, wherein the elements on each element circle are gradually displayed from outside the screen to the inside.

2. The method according to claim 1, wherein the plurality of element circles comprises a first element circle and a second element circle, the first element circle comprises at least one first element, the second element circle comprises at least one second element, and the separately displaying, by the electronic device, the plurality of element circles based on a first interval time comprises:

displaying, by the electronic device, the first element; and displaying, by the electronic device, the second element after the first interval time.

3. The method according to claim 2, wherein the displaying, by the electronic device, the first element comprises:

scaling up, by the electronic device, the first element based on a first scale-up factor, and displaying, by the electronic device, the first element obtained after scaling up; and the displaying, by the electronic device, the second element after the first interval time comprises:

scaling up, by the electronic device, the second element based on the first scale-up factor, and scaling up the first element based on a second scale-up factor, and simultaneously displaying, by the electronic device, the second element scaled up based on the first scale-up factor and the first element scaled up based on the second scale-up factor, wherein the first scale-up factor is greater than the second scale-up factor.

4. The method according to claim 3, wherein after the simultaneously displaying, by the electronic device, the second element scaled up based on the first scale-up factor and the first element scaled up based on the second scale-up factor, the method further comprises:

after the first interval time, scaling up, by the electronic device, the second element based on the second scale-up factor, and simultaneously displaying, by the electronic device, the second element scaled up based on the second scale-up factor and the first element scaled up based on the second scale-up factor.

5. The method according to claim 2, wherein a range of the first element circle is less than a range of the second element circle.

6. The method according to claim 5, wherein the first element is rectangular, and the determining, by the electronic device, a plurality of element circles based on the reference element and the reference point comprises:

determining, by the electronic device, a length and a width of the reference element; and determining, by the electronic device, the first element circle and the second element circle based on the length and the width of the reference element by using the reference point as a center, wherein a length of the first element circle is N times the length of the reference element, a width of the first element circle is N times the width of the reference element, N is an integer greater than or equal to 1, a length of the second element circle is M times the length of the reference element, a width of the second element circle is M times the width of the reference element, and M is an integer greater than N.

7. The method according to claim 5, wherein the first element is an element in the range of the first element circle, and the second element is an element in the range of the second element circle; and when a third element is both an element in the range of the first element circle and an element in the range of the second element circle, the third element is the first element, and the third element is any element comprised in the first interface.

8. The method according to claim 1, wherein the elements comprised in the first interface are application icons, images, or notes.

9. The method according to claim 1, wherein the method further comprises:

receiving, by the electronic device, a second operation performed to trigger the electronic device lock screen.

10. The method according to claim 1, wherein the first application is a home screen application.

11. An electronic device, comprising:

one or more processors;

one or more memories; and a module at which a plurality of applications are installed, wherein the memory stores one or more programs, and when the one or more programs are executed by the processor, the electronic device is enabled to perform the following steps:

receiving, by the electronic device, a first operation performed by a user to trigger the electronic device to display a first interface, wherein the first interface is an interface corresponding to the first application, and the first interface comprises a plurality of elements;

in response to the first operation, determining, by the electronic device, a reference element from the plurality of elements and a reference point, wherein the reference element is an element with a smallest area in the plurality of elements, and the reference point is a center of an element circle established by the electronic device;

determining, by the electronic device, a plurality of element circles based on the reference element and the reference point, wherein each element circle comprises at least one element; and separately displaying, by the electronic device, the plurality of element circles based on a first interval time until the first interface is displayed, wherein the elements on each element circle are gradually displayed from outside the screen to the inside.

12. A non-transitory computer-readable storage medium, comprising a computer program, which when executed by a processor, cause the processor to perform operations comprising:

receiving, by the electronic device, a first operation performed by a user to trigger the electronic device to display a first interface, wherein the first interface is an interface corresponding to the first application, and the first interface comprises a plurality of elements;

in response to the first operation, determining, by the electronic device, a reference element from the plurality of elements and a reference point, wherein the reference element is an element with a smallest area in the plurality of elements, and the reference point is a center of an element circle established by the electronic device;

determining, by the electronic device, a plurality of element circles based on the reference element and the reference point, wherein each element circle comprises at least one element; and separately displaying, by the electronic device, the plurality of element circles based on a first interval time until the first interface is displayed, wherein the elements on each element circle are gradually displayed from outside the screen to the inside.

* * * * *